United States Patent
Hayashi

(10) Patent No.: US 6,995,926 B2
(45) Date of Patent: Feb. 7, 2006

(54) LENS BARREL AND LENS BARREL SYSTEM

(75) Inventor: Shigeo Hayashi, Okaya (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/939,310

(22) Filed: Sep. 9, 2004

(65) Prior Publication Data
US 2005/0057822 A1    Mar. 17, 2005

(30) Foreign Application Priority Data
Sep. 17, 2003    (JP) .............................. 2003-325281
Oct. 1, 2003    (JP) .............................. 2003-343761

(51) Int. Cl.
*G02B 15/14* (2006.01)
*G02B 7/02* (2006.01)
(52) U.S. Cl. ...................... 359/694; 359/695; 359/698; 359/823
(58) Field of Classification Search ................ 359/694, 359/695, 697, 698, 699, 700, 701, 823, 826
See application file for complete search history.

(56) References Cited

U.S. PATENT DOCUMENTS

| | | | | |
|---|---|---|---|---|
| 4,687,297 A | * | 8/1987 | Kamata et al. ............. | 359/823 |
| 5,243,467 A | * | 9/1993 | Tanaka ....................... | 359/694 |
| 5,448,414 A | * | 9/1995 | Hamasaki et al. .......... | 359/700 |
| 5,894,372 A | * | 4/1999 | Kanno ........................ | 359/823 |
| 6,236,523 B1 | * | 5/2001 | Iikawa et al. ............... | 359/826 |
| 6,747,807 B2 | * | 6/2004 | Iikawa et al. ............... | 359/694 |
| 6,778,332 B2 | * | 8/2004 | Iikawa ....................... | 359/695 |
| 6,853,500 B2 | * | 2/2005 | Nomura et al. ............. | 359/695 |
| 6,888,685 B2 | * | 5/2005 | Nomura et al. ............. | 359/701 |
| 2004/0156123 A1 | * | 8/2004 | Nomura et al. ............. | 359/699 |

FOREIGN PATENT DOCUMENTS

| | | |
|---|---|---|
| JP | 8-3571 B2 | 1/1996 |
| JP | 2001-083565 A | 3/2001 |

* cited by examiner

*Primary Examiner*—Loha Ben
(74) *Attorney, Agent, or Firm*—Frishauf, Holtz, Goodman & Chick, P.C.

(57) ABSTRACT

The lens barrel with an adjustable focus comprises an external mounting unit, an optical unit and a control unit including a focusing motor and the like. The external mounting unit comprises a fixed frame covering the optical unit, a distance ring, an outer circumferential cover, a zoom ring, a back end cover. The optical unit contains a plurality of frame member units that respectively support a plurality of lens groups. Furthermore, after the unitized optical unit is inserted into the fixed frame, the distance ring, outer circumferential cover, zoom ring, back end cover and the like are successively engaged with the outer circumferential part of the fixed frame from the rear side, so that these parts are easily assembled.

17 Claims, 23 Drawing Sheets

LENS BARREL AND LENS BARREL SYSTEM

This application claims benefit of Japanese Applications No. 2003-325281 filed in Japan on Sep. 17, 2003 and No. 2003-343761 filed in Japan on Oct. 1, 2003, the contents of which are incorporated by this reference.

BACKGROUND OF THE INVENTION

1. Field of the Invention

The present invention relates to the assembled structure of the respective constituent members of a lens barrel with an adjustable focus, and the common design of constituent members between lens barrels.

2. Description of the Related Art

The system proposed in Japanese Patent Application Laid-Open No. 2001-83565 regarding the structure of an optical device relates to the structure of an optical device provided with an optical adjustment device, e.g., the structure of a lens barrel that is replaceable in a camera main body that contains a diaphragm device. In this lens barrel, a focusing ring and a zoom ring are disposed so that these rings are fit over the outer circumferential part of the barrel.

In the case of lens barrels with an adjustable focus, which have shown an upgrading of quality in recent years, the number of constituent parts required is extremely large; furthermore, the structure is also complicated. Accordingly, sufficient attention must be given to the assembly characteristics.

Furthermore, in regard to the common design of constituent members among lens barrels, the device proposed in Japanese Patent Publication No. 8-3571 relates to a lens barrel using a novel helicoid ring in which one type of helicoid ring can be applied to a plurality of different lens barrels.

If a greater number of constituent members can be used in common in a plurality of lens barrels, then the number of different types of parts required can be reduced, so that a great effect in reducing the cost of the lens barrel and simplifying the control of parts can be expected.

SUMMARY OF THE INVENTION

The present invention provides a lens barrel with an adjustable focus which offers easy assembly and improved productivity, and a lens barrel system which allows the common use of parts for a plurality of different types of lens barrels so that a reduction in cost and an improvement in productivity can be realized.

The lens barrel with an adjustable focus that constitutes one of the inventions of the present application comprises a fixed frame that covers the lens optical system, a distance ring that can be rotated about the optical axis, and that is fit over the outer circumference of the fixed frame from one end in the direction of the optical axis, an outer circumferential cover which is fit over the outer circumference of the fixed frame from the one end in the direction of the optical axis, which is held so that this cover cannot rotate, and which prevents the distance ring from moving in the direction of the optical axis, and a back end cover which is disposed on the back end portion of the lens barrel, and retains the outer circumferential cover from the one end in the direction of the optical axis so that this outer circumferential cover does not move in the direction of the optical axis.

The lens barrel system that constitutes the other invention of the present application comprises a first fixed frame that contains the optical unit of a first lens barrel, a second fixed frame which has the same external diameter as the first fixed frame, and contains the optical unit of a second lens barrel that is different from the optical unit, and a distance ring which is a part that can be used in common in the first lens barrel and the second lens barrel, and which can be rotatably engaged with the external diameter of the first lens barrel and the external diameter of the second lens barrel, and used for the focal adjustment of the first lens barrel and the focal adjustment of the second lens barrel.

Other special features and advantages of the present invention will be clear from the following description.

DETAILED DESCRIPTION OF THE PREFERRED EMBODIMENTS

The lens barrel system constituting one embodiment of the present invention is a system comprising a first lens barrel and second lens barrel of different types (specifications). The first lens barrel and second lens barrel contain different optical units in their respective fixed frames, and the outer barrel members that are disposed on the outer circumferential parts of the fixed frames, e.g., a distance ring which is turned in order to adjust the focal point of the taking lens (focusing lens system), a scale ring which is a distance scale display ring that indicates the object focal position on the object field side corresponding to the position of the focusing lens system, an intermediate frame which is a display ring holding ring that supports the distance scale display ring so that this ring is free to rotate, and that has a display window part, back end covers that are disposed on the back end parts of the respective lens barrels and that regulate the movement of the distance ring, intermediate frame, scale ring and the like in the direction of the optical axis, can be used in common. The construction, operation and the like of the first and second lens barrels will be described below.

First, a first lens barrel constituting a part of a lens barrel system that constitutes one embodiment of the present invention will be described with reference to FIGS. 1 through 14.

Figure 1:
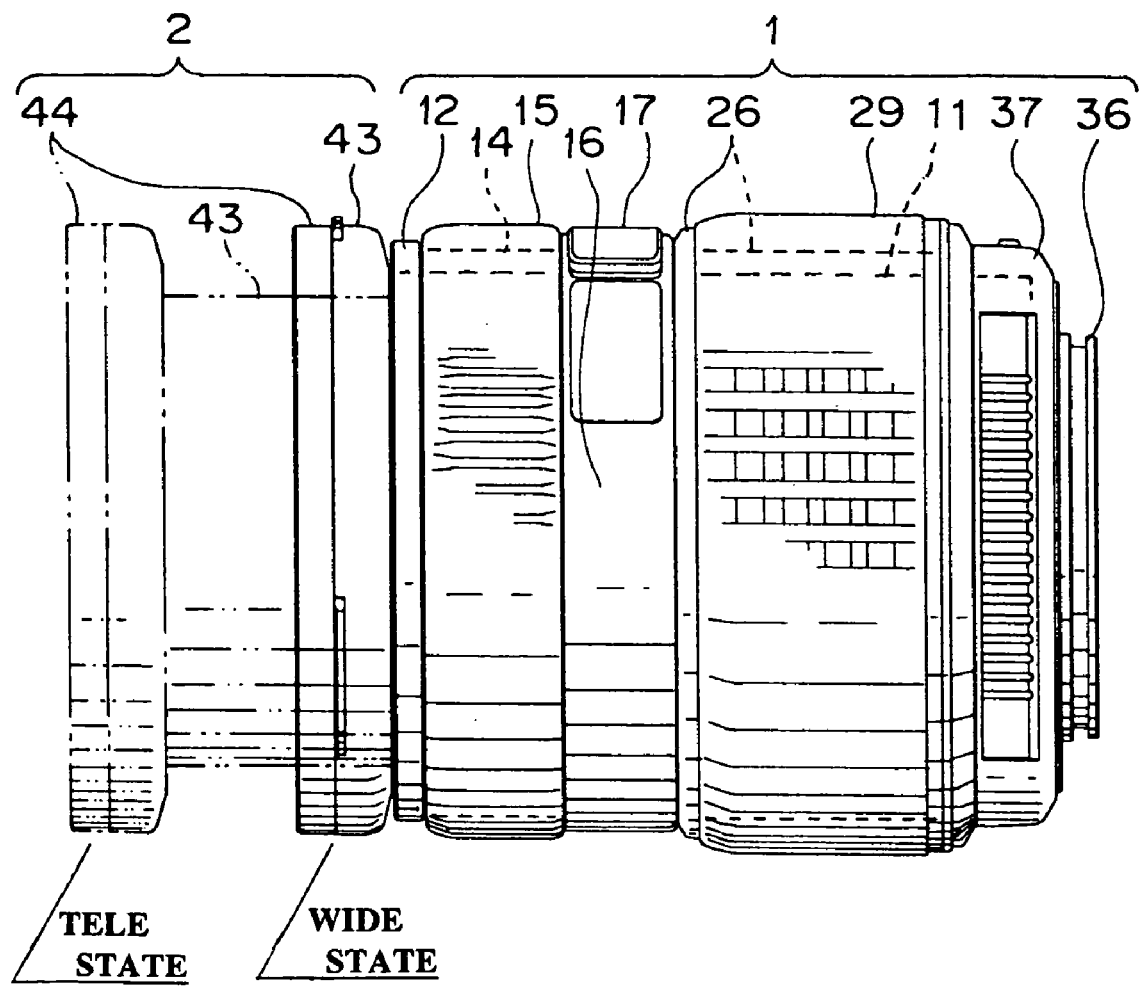
FIG. 1 is a side view of the first lens barrel constituting a lens barrel system according to an embodiment of the present invention.
Figure 2:
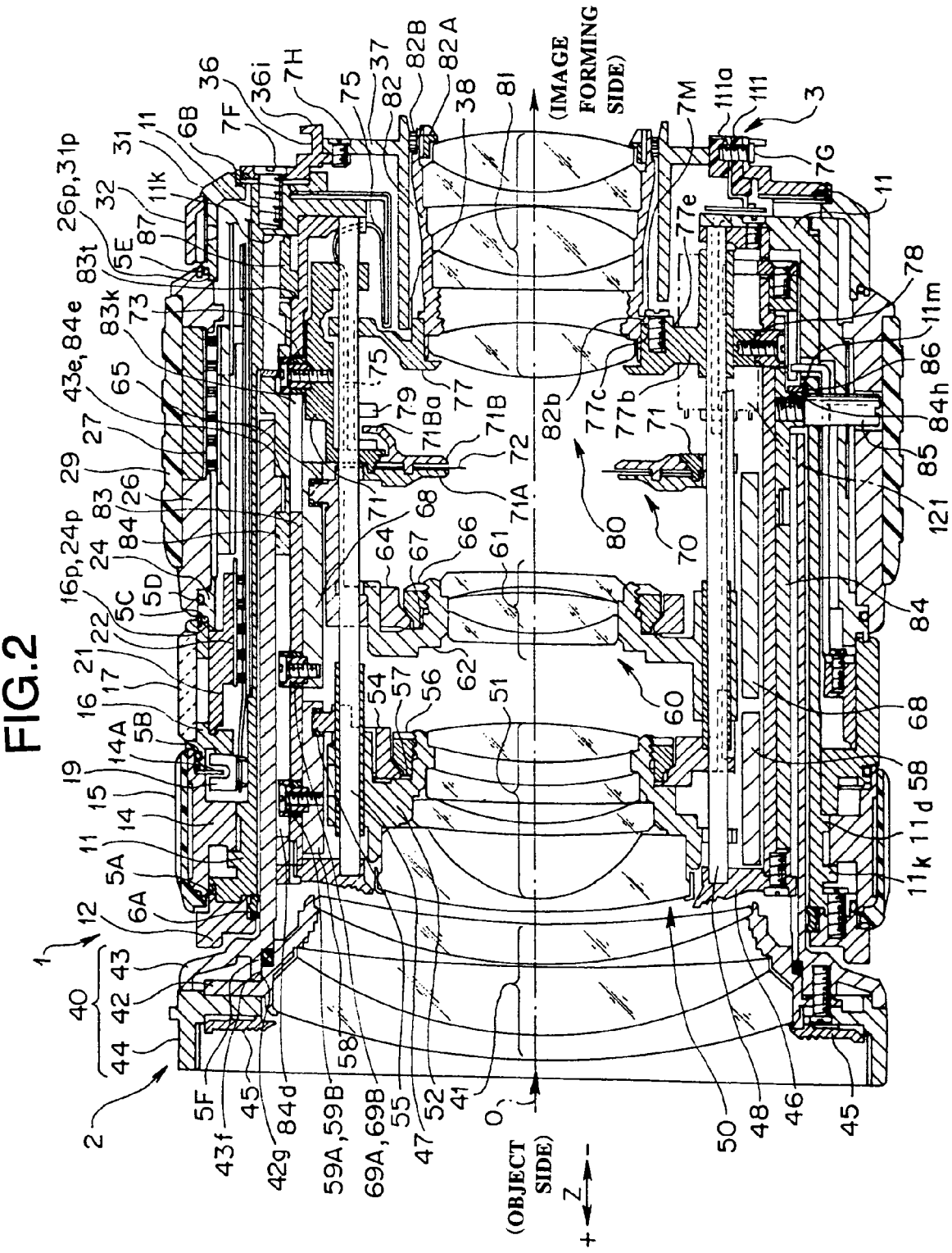
FIG. 2 is a sectional view along the optical axis in the wide state of the first lens barrel shown in FIG. 1.
Figure 3:
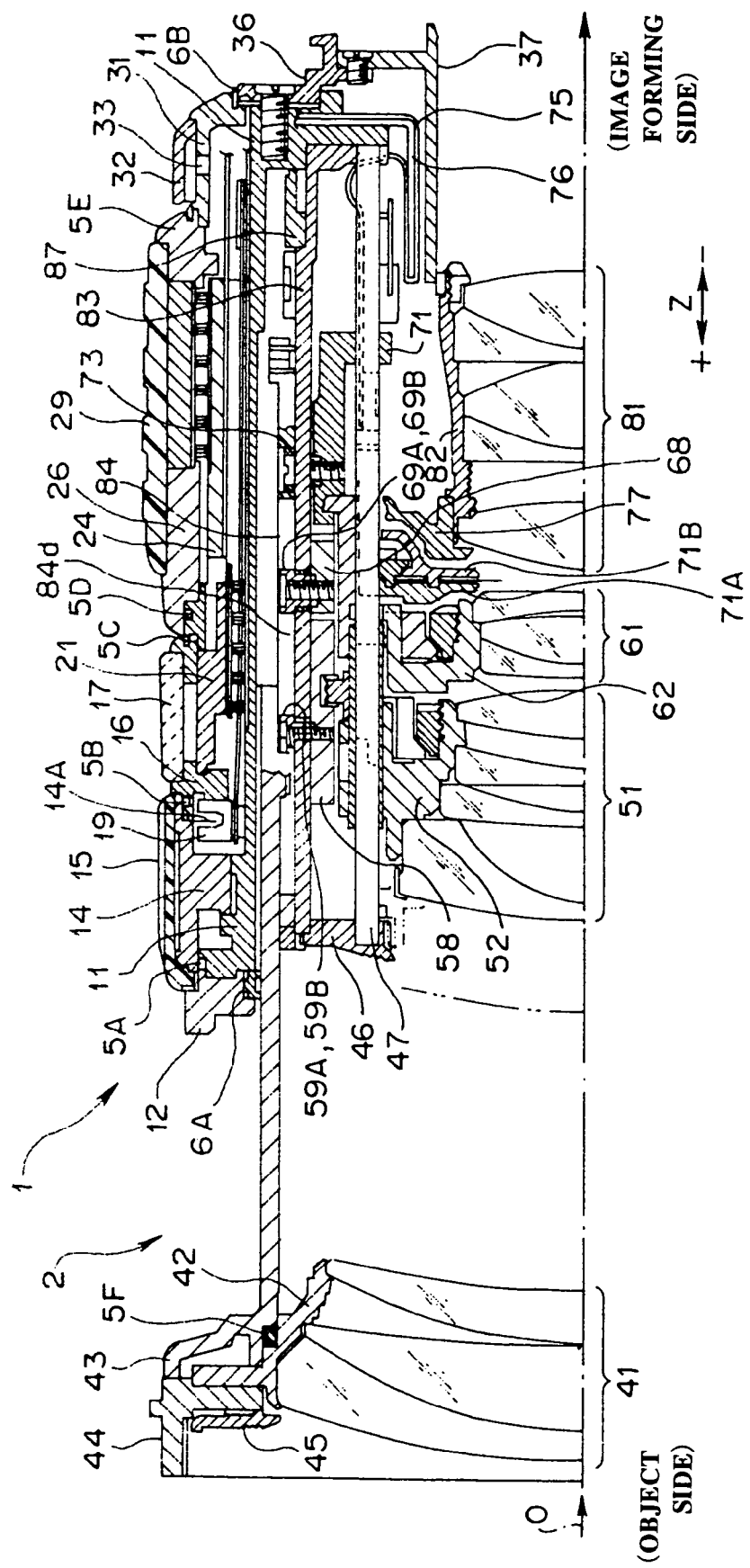
FIG. 3 is a sectional view (upper half) along the optical axis in the tele state of the first lens barrel shown in FIG. 1.
Figure 4:
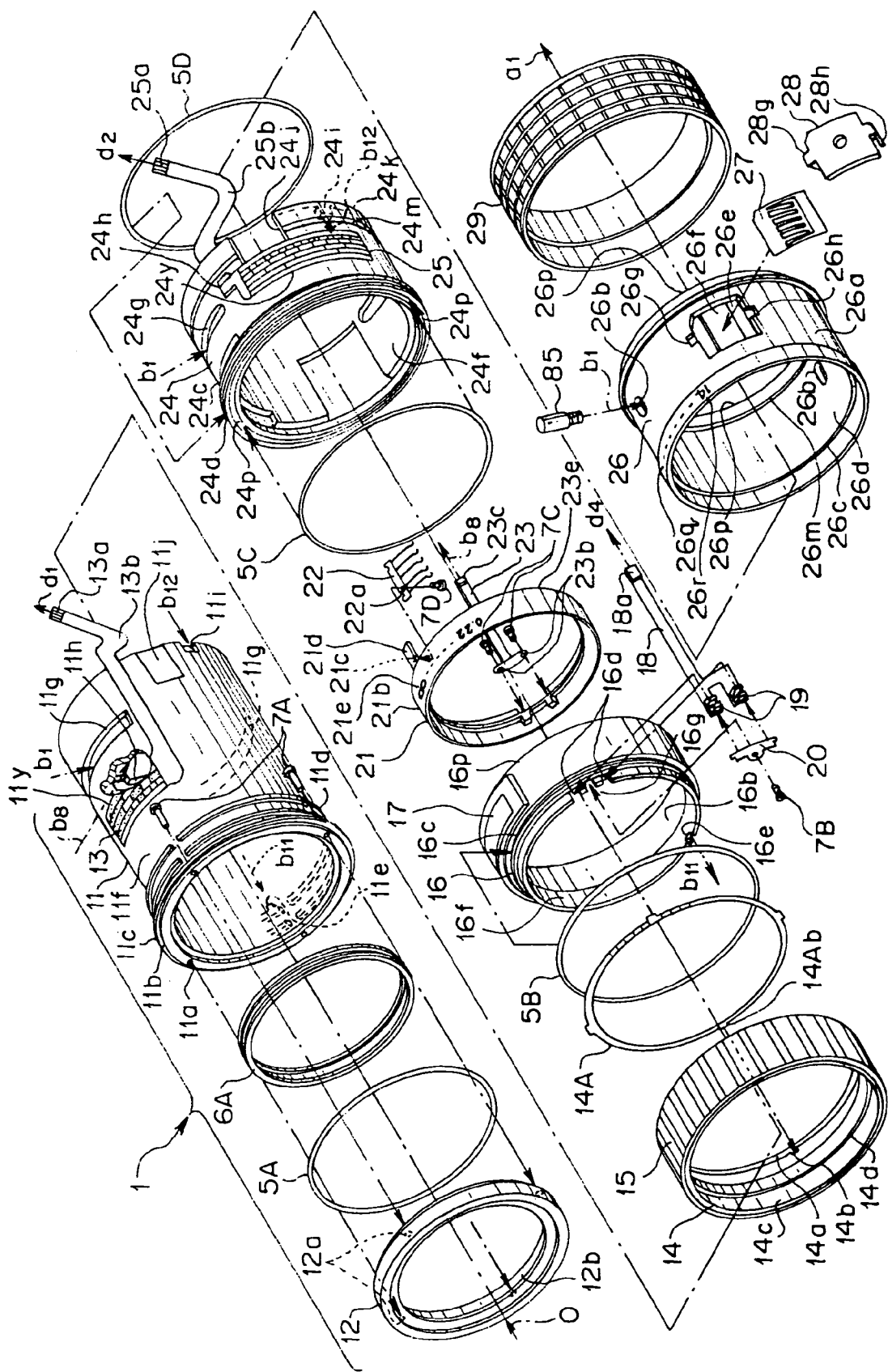
FIG. 4 is an exploded perspective view of one part of the external mounting unit constituting a part of the first lens barrel in FIG. 1.
Figure 5:
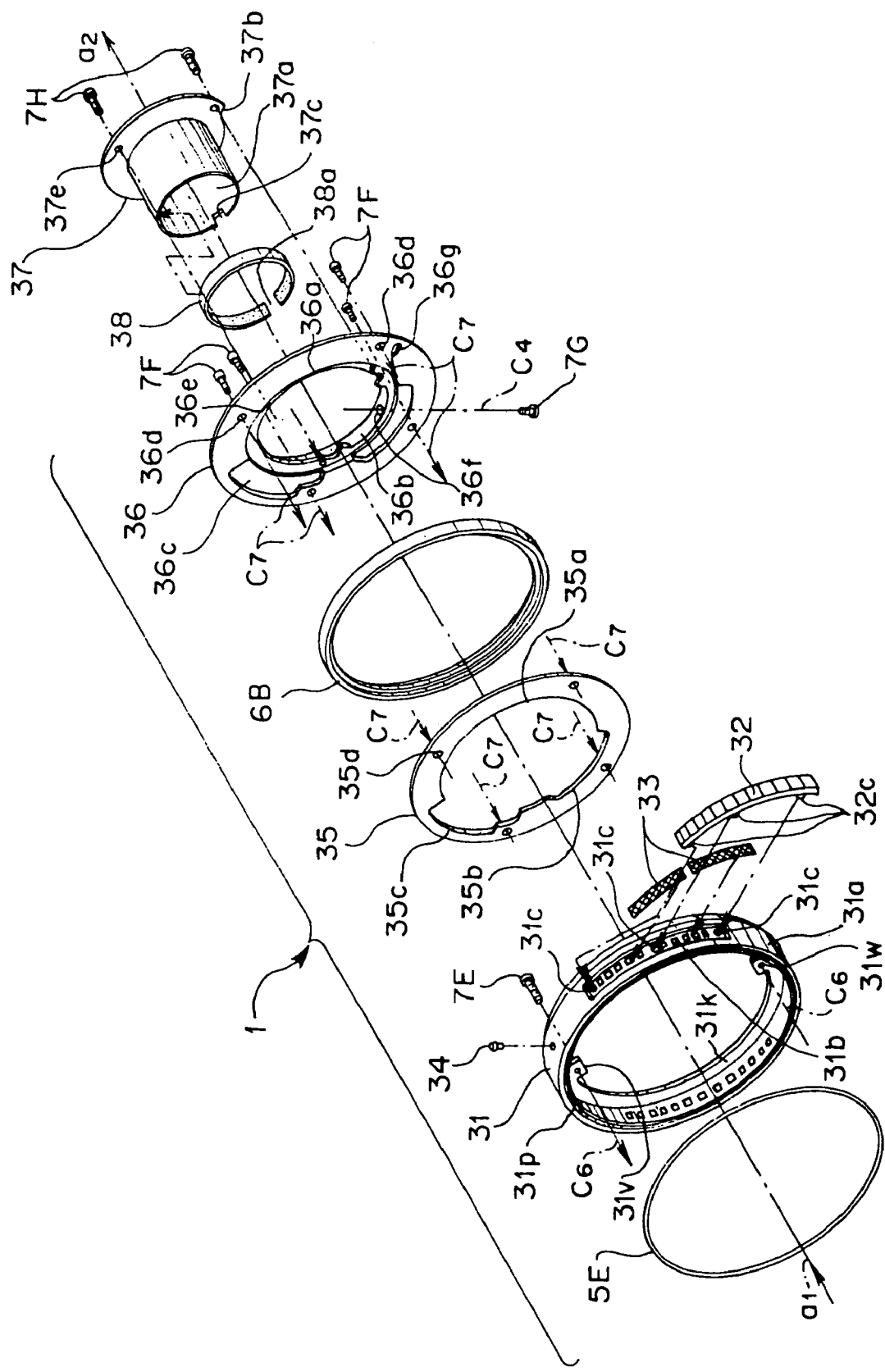
FIG. 5 is an exploded perspective view of another part of the external mounting unit constituting a part of the first lens barrel in FIG. 1.
Figure 6:
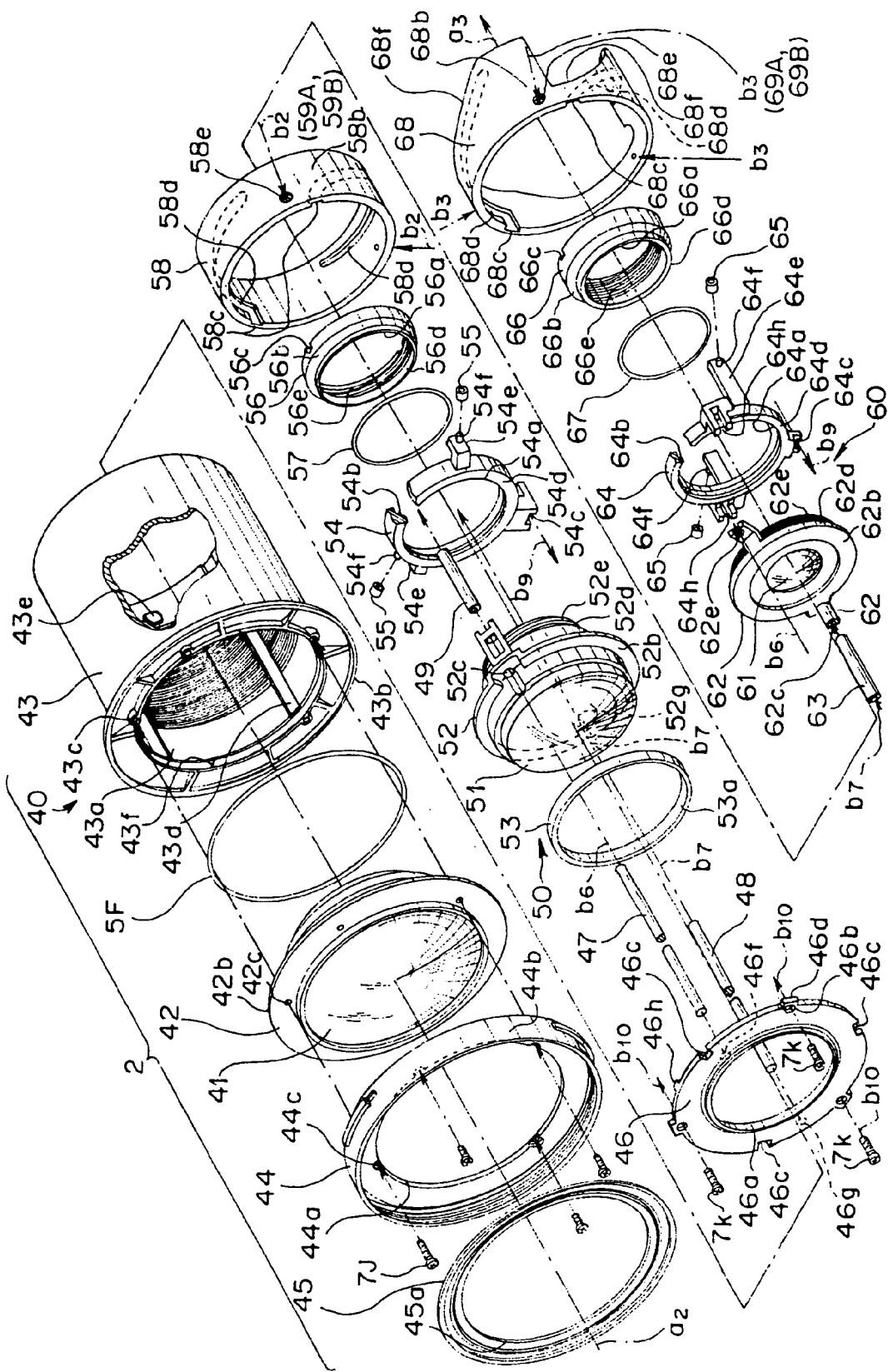
FIG. 6 is an exploded perspective view of one part of the optical unit constituting a part of the first lens barrel in FIG. 1.
Figure 7:
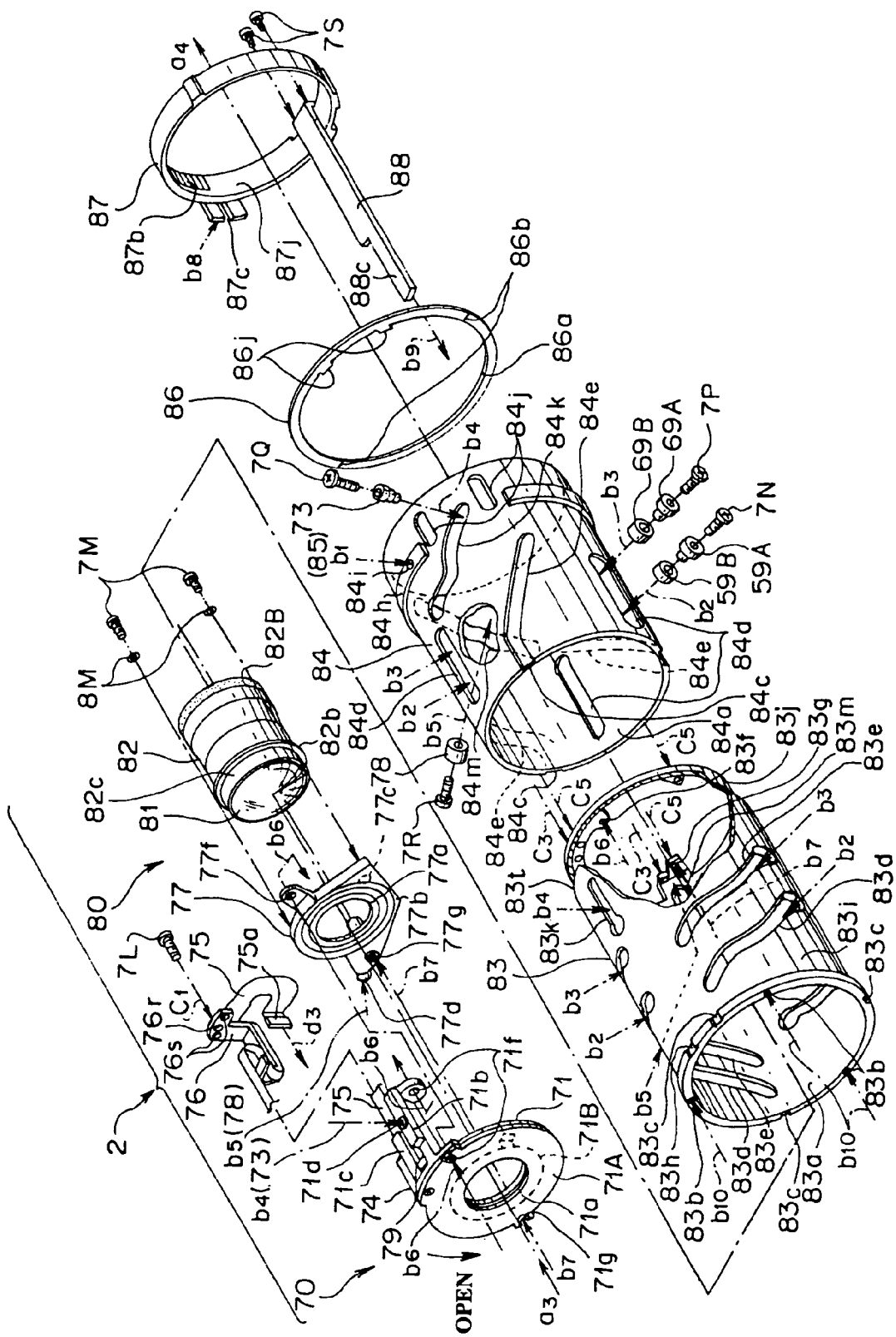
FIG. 7 is an exploded perspective view of another part of the optical unit constituting a part of the first lens barrel in FIG. 1.
Figure 8:
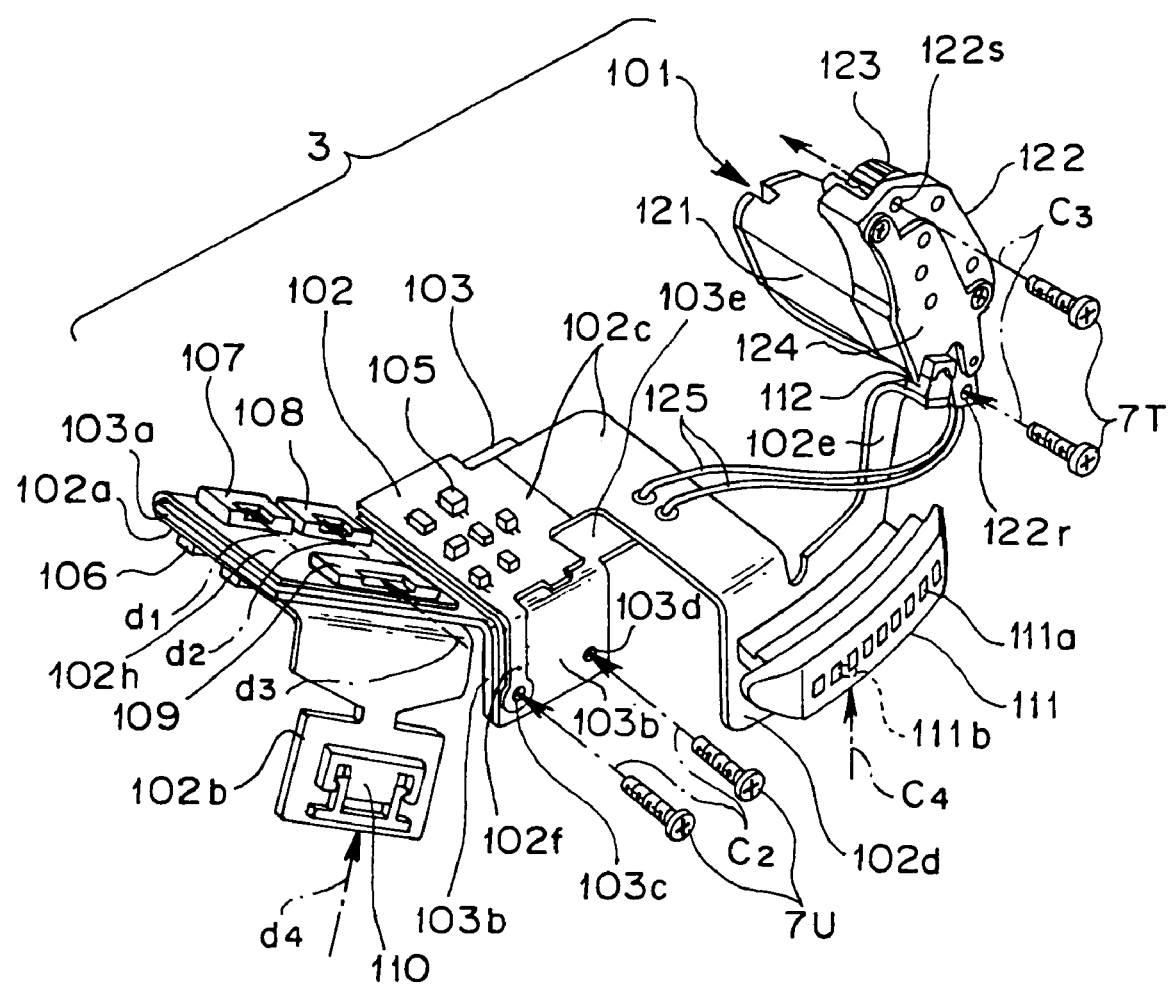
FIG. 8 is a perspective view of the control unit constituting a part of the first lens barrel in FIG. 1, as seen from the image forming side (rear side)

FIG. 1 is a side view of the first lens barrel. FIG. 2 is a sectional view along the optical axis in the wide state of the lens barrel. FIG. 3 is a sectional view along the optical axis in the tele state of the lens barrel (showing the upper half part). FIG. 4 is an exploded perspective view of one part of the external mounting unit constituting a part of the lens barrel. FIG. 5 is an exploded perspective view of another part of the external mounting unit constituting a part of the lens barrel. FIG. 6 is an exploded perspective view of one part of the optical unit constituting a part of the lens barrel. FIG. 7 is an exploded perspective view of another part of the optical unit constituting a part of the lens barrel. FIG. 8 is a perspective view of the control unit constituting a part of the lens barrel, as seen from the image forming side (rear side).

Figure 9:
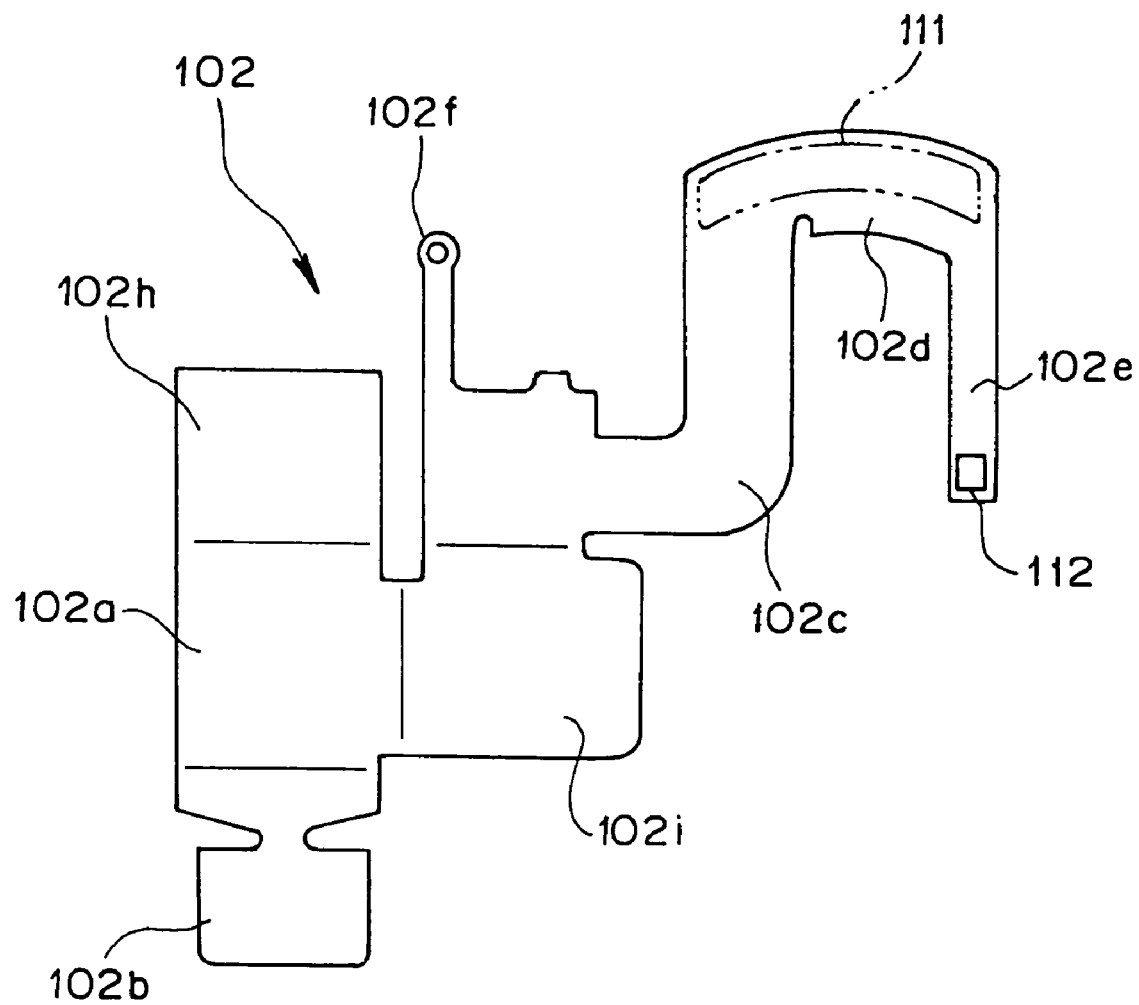
FIG. 9 is an unfolded view of the lens barrel control FPC constituting a part of the control unit seen in FIG. 8.
Figure 10:
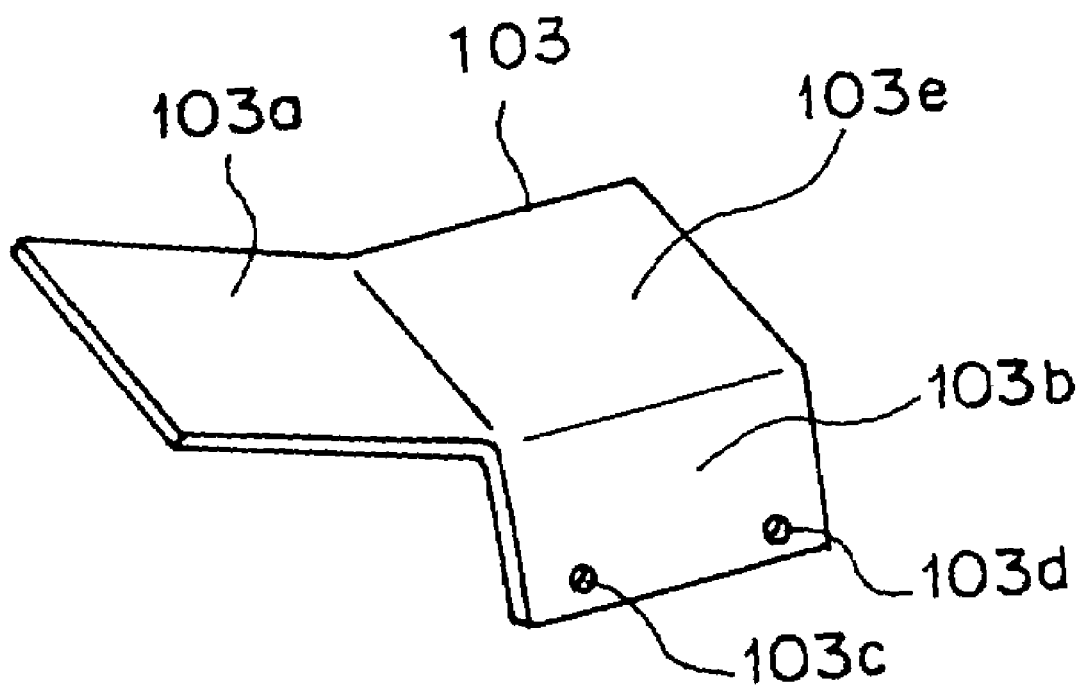
FIG. 10 is a perspective view of the FPC supporting plate constituting a part of the control unit shown in FIG. 8.
Figure 11:
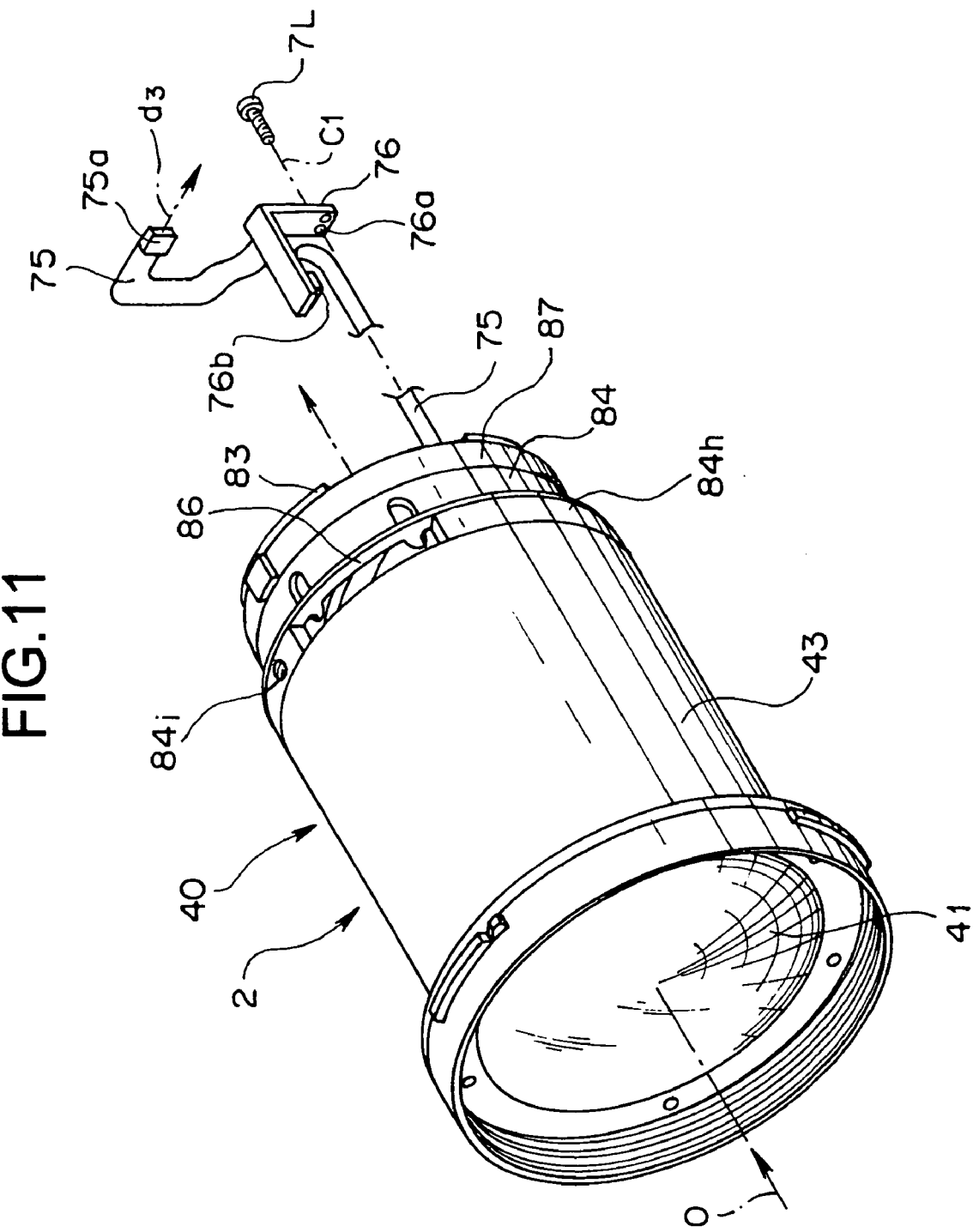
FIG. 11 is a perspective view of the assembled state of the optical unit shown in FIGS. 6 and 7.
Figure 12:
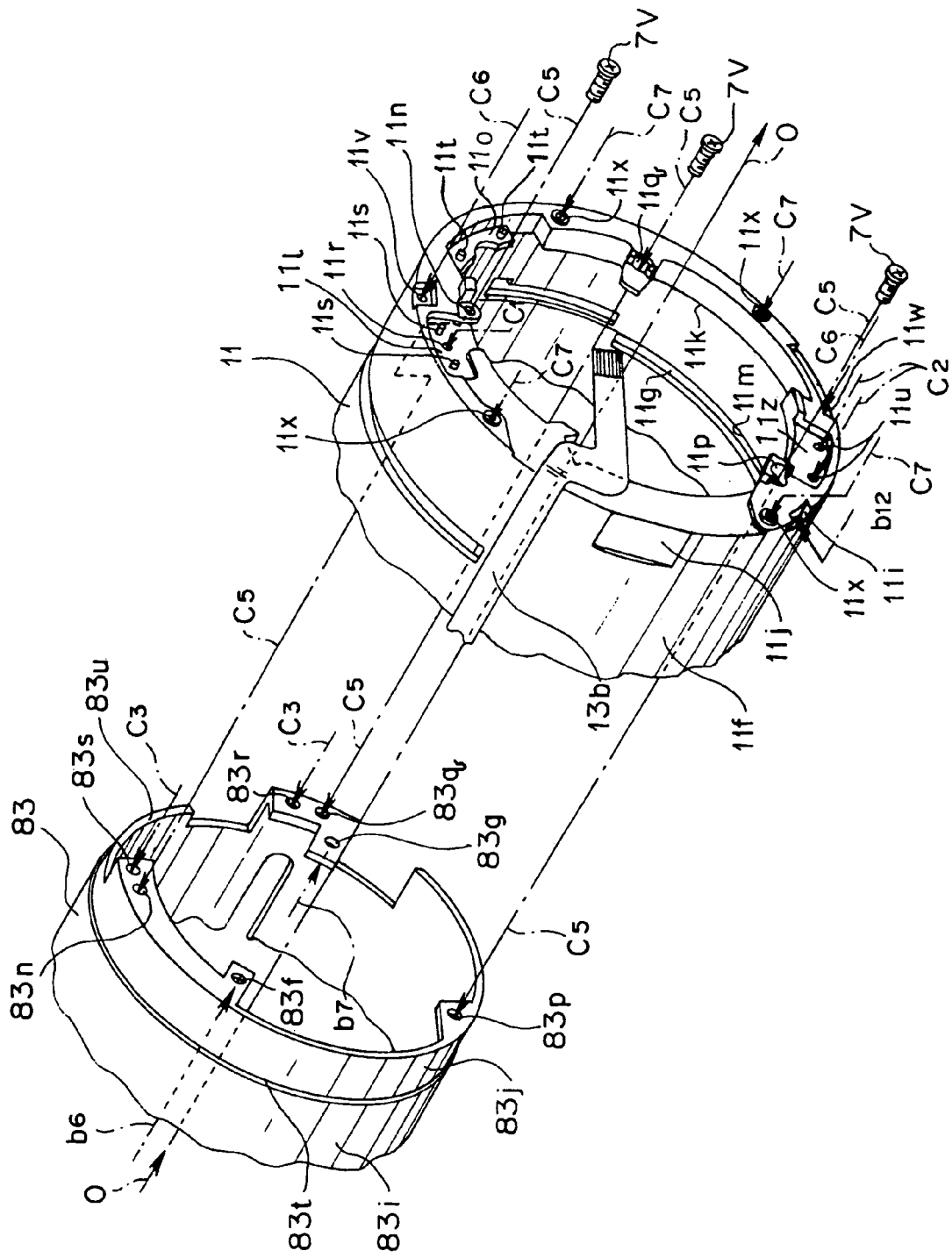
FIG. 12 is an exploded perspective view of the main frame and fixed ring that are to be fastened to each other in the first lens barrel shown in FIG. 1, as seen from the image forming side (rear side)
Figure 13:
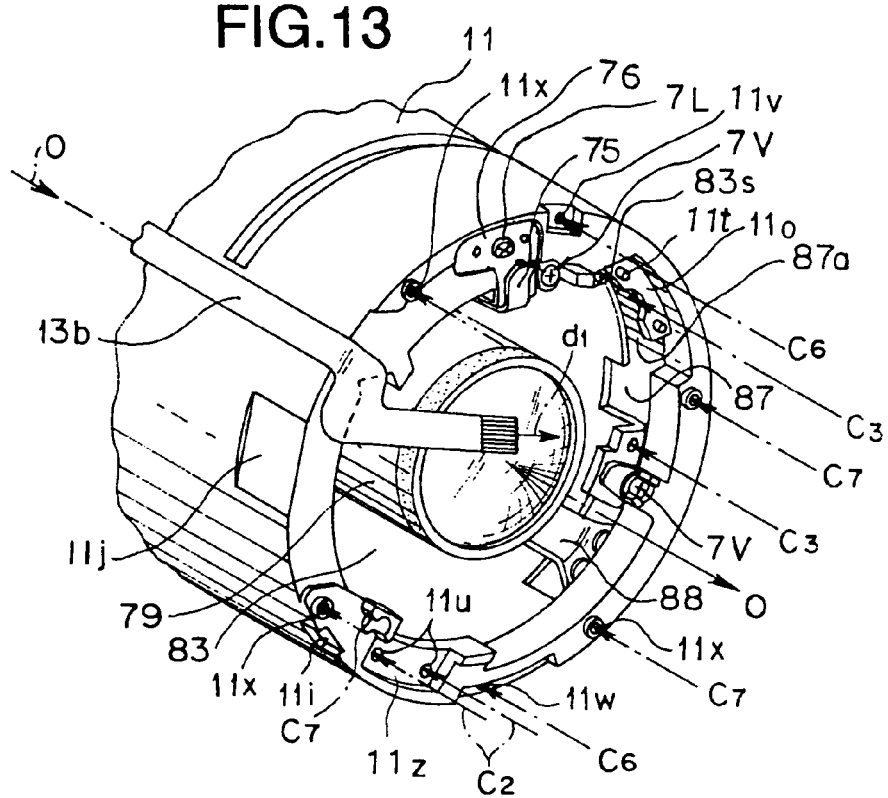
FIG. 13 is a perspective view of the rear part of the assembled body comprising the external mounting unit shown in FIGS. 4 and 5 and the optical unit shown in FIG. 11, as seen from the image forming side (rear side)
Figure 14:
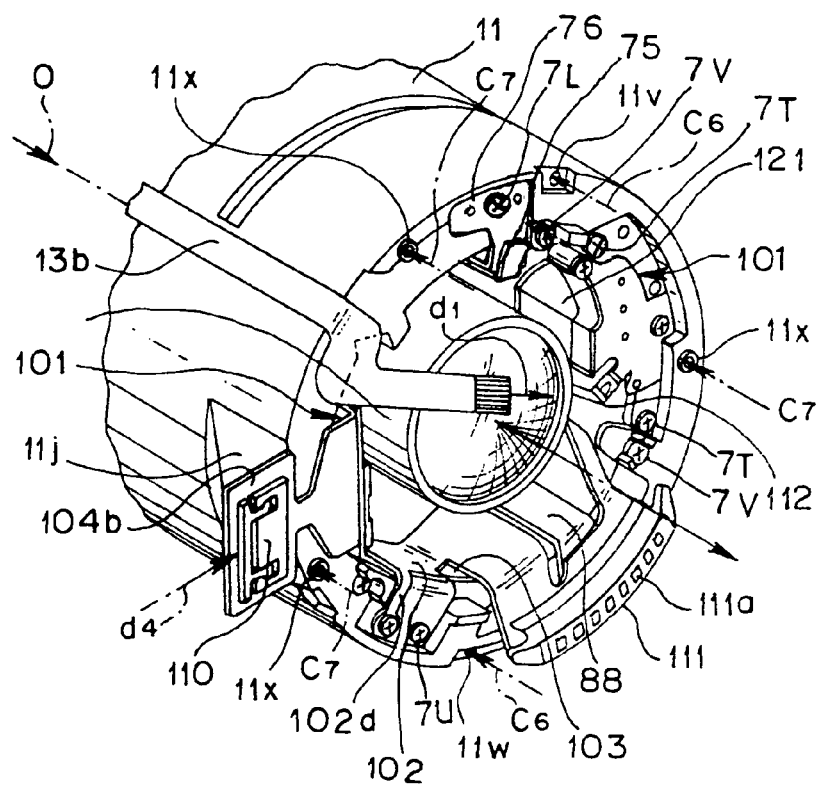
FIG. 14 is a perspective view showing a state in which the control unit is mounted on the rear part of the assembled body of the external mounting unit and optical unit shown in FIG. 13, as seen from the image forming side (rear side)

FIG. 9 is an unfolded view of the lens barrel control FPC constituting a part of the control unit. FIG. 10 is a perspective view of the FPC supporting plate constituting a part of the control unit. FIG. 11 is a perspective view of the assembled state of the optical unit constituting a part of the lens barrel. FIG. 12 is an exploded perspective view of the back end portions of the fixed frame of the external mounting unit and the fixed ring of the optical unit, as seen from the image forming side (rear side). FIG. 13 is a perspective view of the assembled body comprising the optical unit and the external mounting unit, as seen from the image forming side (rear side). FIG. 14 is a perspective view showing a state in which the control unit is further mounted on the assembled body of the optical unit and the external mounting unit, as seen from the image forming side (rear side).

Furthermore, in the following description, the optical axis of the optical system (taking lens) of the lens barrel is designated as "O", and the direction along the optical axis O is designated as the "Z direction". The object side of the lens barrel in the Z direction is designated as "forward" (+Z direction), and the image forming side is designated as "rearward" (−Z direction). Furthermore, the directions of rotation of the respective constituent members are indicated as directions of rotation seen from the object side, with the clockwise direction being taken as the + direction, and the counterclockwise direction being taken as the − direction. Furthermore, in FIGS. 3 through 11 and FIGS. 19 through 24, directions indicated by the same symbols, e.g., the symbols am through an, bm through bn, cm through cn, dm through dn and the like, refer to the directions in which the members in question are passed through, engaged or connected by screwing at the time of assembly.

As is shown in FIGS. 1 and 2, the first lens barrel 10 is a zoom type lens barrel with an adjustable focus that can be mounted on a monocular reflex camera body, and comprises mainly an external mounting unit 1 that forms the external mounting of the lens barrel, an optical unit 2 that is accommodated inside the external mounting unit 1, and that contains the optical system of this lens barrel, and a control unit 3 that is used to perform driving control of the first lens barrel 10. The optical system of this first lens barrel 10 comprises a first group lens 41 that is advanced and retracted from the object side (front side) during zooming, a second group lens 51 and third group lens 61 of the focusing optical system that are advanced and retracted during zooming and during focusing, and a fourth group lens 81 and diaphragm vanes 72 that are advanced and retracted during zooming.

As is shown in FIGS. 4 and 5, the external mounting unit 1 comprises a fixed frame 11 used as a first fixed frame containing the optical unit 2, which is an external mounting unit side fixed frame in which a front cover 12 is mounted on the front surface part, a distance ring 14 constituting a first frame member rotatably engaged with the fixed frame 11, which is a member that has a rubber ring 15 mounted on the outer circumference, and that is pivoted during adjustment of the focus, an intermediate frame 16 used as a second frame member (display ring retaining ring) which is an outer circumferential cover that is engaged with, fastened to and supported by the outer circumference of the fixed frame 11, and that rotatably holds the scale ring 21 described below, a scale ring 21 which is a distance scale display ring that is rotatably held between the outer circumference of the fixed frame 11 and the inner circumference of the intermediate frame 16, and that is used to display the object focal position on the object field side corresponding to the focal position of the focusing lens system, a zoom base 24 that is fastened to and supported by the outer circumference of the fixed frame 11, a zoom ring 26 constituting a third frame member on the outer circumference of which a rubber ring 29 is engaged and is rotated during zooming, a back end cover 31 which is a movement preventing member that is fastened to and supported by the back surface side outer circumference on one end of the fixed frame 11, and that prevents the movement of the distance ring 14, intermediate frame 16, zoom ring 26 and the like in the direction of the optical axis O, and which is used as a back end part external mounting member that is disposed on the back end part, a lens mount 36 that is fastened to the back surface part of the fixed frame 11, and a cover rear frame 37 that is inserted into and fastened to the inner circumference of the lens mount 36.

Furthermore, among the abovementioned respective constituent members, the distance ring 14 and rubber ring 15, the intermediate frame 16, the zoom ring 26 and rubber ring 29, an the back end cover 31, are respectively members that form a portion of the external appearance, used in common with the second lens barrel 10A (described later).

As is shown in FIGS. 6 and 7, the optical unit 2 comprises a first group frame unit 40 which has a first group lens 41, a second group frame unit 50 which has two guide rods 47 and 48 and a second group lens 51, a second group rotating zoom frame 58 which causes the second group frame unit 50 to advance and retract, a third group frame unit 60 which has a third group lens 61, a third group rotating zoom frame 68 which causes the third group frame unit 60 to advance and retract, a diaphragm frame unit 70 which has diaphragm vanes 72, a fourth group frame unit 80 which has a fourth group lens 81, a fixed ring 83 used as an optical unit side fixed frame which is fastened to and supported by the fixed frame 11, a cam ring 84 which is rotatably supported by the fixed ring 83, a retaining ring 86, and a lens driving frame 87 which is rotatably supported on the rear part of the fixed ring 83.

As is shown in FIG. 8, the control unit 3 comprises a focusing lens driving unit 101 that has a focusing motor, motor PI (photo-interrupter), speed reduction gear train and the like, and a lens barrel control FPC (lens barrel control board) 102 comprising a flexible board on which respective control FPC (flexible board) connectors, control ICs, mount contacts and the like are mounted. This control unit 3 receives the output from a distance PI 19 (described later), and performs focusing driving control of the lens system within the zoom lens system of the lens barrel.

Furthermore, in this first lens barrel 10, a main zoom lens driving device is constructed by the fixed ring 83, cam ring 84, second and third group frame units 50 and 60, second and third rotating zoom frames 58 and 68, lens driving frame 87 and the like. Moreover, advancing and retracting driving of the first group lens 41, second group lens 51, third group lens 61, fourth group lens 81 and diaphragm frame unit 80 in the direction of the optical axis O is performed by the rotational driving of the zoom ring 26. Furthermore, only the second group lens 51 and third group lens 61 are caused to advance and retract in the direction of the optical axis O by the rotational driving of the lens driving frame 87.

Next, further details and the assembly procedures (and the like) of the respective constituent members of the first lens barrel 10 will be described.

In the first lens barrel 10, the optical unit 2 is first assembled as a unit, and this optical unit 2 is attached to the fixed frame 11 of the external mounting unit 1 (as will be described later). Then, the respective constituent members of the external mounting unit are successively inserted and attached to the outer circumferential part of the fixed frame 11. Subsequently, the control unit 32 is attached from the rear of the fixed frame 11, and the lens mount is mounted, thus completing the assembly of the lens barrel 10. However, the order of assembly of these parts is not necessarily limited to the order described below.

First, the respective constituent members of the optical unit 2 will be described.

As is shown in FIG. 6, the first group frame unit 40 comprises a first group frame member 43, a first group lens holding frame 42 that holds the first group lens 41, a hood ring 44, and an ornamental plate 45.

The first group frame member 43 is a cylindrical frame member, and is inserted into the inner circumference of the fixed frame 11 of the external mounting unit 1 so that this member can advance and retract. Three direct-advance grooves 43d (which have a bottom) that run along the optical axis O are formed in the inner circumferential part 43a of this first group frame member, and three cam follower projections 43e are formed. The cross-sectional shape of the cam follower projections 43e in the circumferential direction is a substantially square shape, and the corner parts where these projections slide in contact with the cam groove 84e of the inserted cam ring 84 (described later) are formed with a relatively large curvature radius, so that the corner parts in the direction of the cam groove 84e are formed with a shape that is close to an edge. By using such a shape, sliding is facilitated, and the cam follower shear strength is improved.

The first group lens holding frame 42 is a ring-shaped member that has an opening part, and a first group lens 41 is fastened in this opening part.

The hood ring 44 is a ring-shaped member that has an opening part 44a; the ornamental plate 45 that has an opening part 45a is bonded to the front of this hood ring 44.

The step part 42f of the first group lens holding frame 42 (in a state in which an O-ring 5F is inserted into the step part 42g) is mounted by engagement with the inner circumferential part 43f on the front surface side of the first group frame member 43. Furthermore, the hood ring 44 is fit on the front surface side of the first group lens holding frame 42, and screws 7J are passed through screw passage holes 44c and 42c, and screwed into screw holes 43c of the first group frame member 43. As a result of this screw engagement, the first group frame member 43, first group lens holding member 42 and hood ring 44 are integrated as a first group frame unit 40.

The fixed ring cover 46 is a ring-shaped member. As is shown in FIG. 6, this member has a central opening part 46a, and is attached to the front surface of the fixed ring 83 (described later). First group frame direct-advance guide projections 46d that protrude in three directions from the outer circumference, screw passage holes 46b that are disposed to the inside of these projections 46d, first group frame cam follower relief recesses 46c that are disposed at intermediate points of the outer circumferential projections 46d in the circumferential direction, positioning projections 46h that protrude rearward on the rear surface side in the vicinity of the outer circumference, and guide rod engaging hole parts 46f and 46g (formed with a bottom) that are disposed in two places constituting substantially symmetrical positions with respect to the optical axis O on the rear surface, are formed in this fixed ring cover 46.

The fixed ring 83 is a cylindrical member, and is fastened to and supported by the back end part inside the fixed frame 11 of the external mounting unit 1 as shown in FIGS. 2 and 12. The second group, third group and fourth group frame units, the diaphragm unit, and the second group and third group rotating zoom frames, are installed inside the fixed ring 83 so that rotation or an advancing and retracting movement is possible; furthermore, the cam ring and lens driving frame are mounted on the outer circumferential part so that these parts are free to rotate.

As is shown in FIGS. 7 and 12, three screw holes 83b are formed in the front end flange part of the fixed ring 83, and three first group frame cam follower relief recesses 83c and one positioning recess 83h are formed in the outer circumference of the flange part. Guide rod engagement holes 83f and 83g, screw holes 83n, 83q, 83r and 83s, a cut-out part 83u and the like are formed in the back end surface of the fixed ring 83. Furthermore, two sets of cam grooves 83d and 83e with three grooves each running obliquely with respect to the direction of the optical axis O are formed in the front cylindrical part 83i of the fixed ring 83, and two direct-advance grooves 83k and 83m that are parallel to the direction of the optical axis O are formed in the rear cylindrical part 83j. Furthermore, a step part 85 running along the circumference is formed in the portion of the fixed ring 83 that is located in the vicinity of the rear cylindrical part 83j.

The guide rods 47 and 48 are straight rod members. As is shown in FIGS. 6 and 7, the back end parts (first end parts) of these guide rods are inserted into engaging holes 83f and 83g in the fixed ring 83, and the tip end parts (other end parts) are inserted into engaging hole parts 46f and 46g in the fixed ring cover 46, so that the guide rods are supported in a state parallel to the optical axis O. These guide rods 47 and 48 are inserted into the respective guide holes or cut-out parts of the second group lens holding frame 52 of the second group frame unit 50, the third group lens holding frame 62 of the third group frame unit 60, the diaphragm frame member 71 of the diaphragm frame unit 70, and the fourth group frame member 77 of the fourth group frame unit 80, so that these guide rods guide the respective frame members in a manner that allows the frame members to slide along the direction of the optical axis O while the rotation of the members is regulated.

The cam ring 84 is a cylindrical member; as is shown in FIGS. 2, 6 and 7, this cam ring is engaged with the front cylindrical part 83i of the fixed ring 83 so that the cam ring is free to rotate, and the first group frame member 43 is rotatably engaged with the outer circumference. Three direct-advance grooves 84d that are parallel to the optical axis O in the front side of the cylindrical part, three cam grooves 84e (with bottoms) which have front insertion openings in the front side of the outer circumferential of the cylindrical part, two cam grooves 84k, and 84m that run obliquely with respect to the direction of the optical axis O in the rear side of the cylindrical part, and a rotation stopping groove 84j with a bottom (in the rear part of the outer circumference), are formed in this cam ring 84. Furthermore, a band-form step part 84h with a specified width is formed along the circumferential direction of the rear part of the outer circumference of the cam ring 84, and screw holes 84i used for the screw attachment of driving pins are formed in two places on this step part 84h.

The retaining ring 86 is a ring-shaped member made of metal which can undergo elastic deformation in the direction of thickness. As is shown in FIG. 7, this retaining ring 86 has an inner circumferential protruding part 86j that engages with the rotation stopping groove 84j in the outer circumference of the cam ring 84; furthermore, the left-right line 86p on the front surface side is formed so that this line is bent at a slight angle as a forward peak folding line.

The lens driving frame 87 is a ring-form member; as is shown in FIG. 7, a coupling bifurcated part 87c that protrudes forward is provided, and an inside-tooth gear part 87b is formed in one part of the inner circumferential part 87j. Furthermore, a straight connecting arm 88 that passes through the inner circumferential part and extends forward along the optical axis is fastened to and supported on this frame. This connecting arm 88 is a metal plate member which is fastened by means of screws 7S to the back end surface part of the lens driving frame 87, and an engaging part 88c which is formed with a width narrower than that of the root part is disposed on the front part of the connecting arm 88. Furthermore, this engaging part 88c is engaged with the guide recesses 54c and 64c of second and third group rotating rinds 54 and 64. Moreover, the output gear 123 of the speed reduction gear train of the focusing lens driving unit 101 (described later) engages with the inside-tooth gear part 87b.

As is shown in FIGS. 2 and 6, the second group frame-unit 50 has a second group lens 51 which is a focusing lens, a second group lens holding frame 52 that holds the second group lens 51, a second group rotating ring 54, a second group frame nut 56, and a lens cap 53 used to cut unnecessary light, which covers the outer circumference of the second group lens.

An opening part which holds the second group lens 51, a sleeve supporting hole 52c located above in a substantially symmetrical position on the outer circumferential flange part 52b with respect to the optical axis O, and a guide slot 52g (located below) into which the guide rod 48 is inserted so that the guide rod 48 is free to slide, are formed in the second group lens holding frame 52. Furthermore, a rear contact surface 52d and a male screw part 52e that protrudes rearward from the rear contact surface 52d are provided.

The sleeve 49 into which the guide rod 47 is inserted so that the guide rod 47 is free to slide is inserted into the sleeve supporting hole 52c in a loose state. Furthermore, the sleeve 49 is positioned in a state in which the guide rod 47 is supported in a specified separated position with respect to the optical axis O of the second group lens, and is fastened by bonding to the sleeve supporting hole 52c. Moreover, when the bonding of the abovementioned sleeve is performed, the boning agent is injected from a bonding agent injection opening part formed in an intermediate part of the sleeve supporting hole 52c.

The second group rotating ring 54 is a ring-shaped member, and is provided with a central opening part 54a, a conical inclined surface 54b that is disposed to the rear of the central opening part 54a, and two projecting parts 54e that protrude from the outer circumferential part in substantially symmetrical positions with respect to the optical axis O. Moreover, a guide recess 54c into which the connecting arm 88 is inserted so that the connecting arm 88 is free to slide is formed in an outer circumferential position in a direction that is substantially perpendicular to the two projecting parts 54e. Respective pins 54f are disposed in the radial direction in the two projecting parts 54e, and cam followers 55 are engaged with the respective pins 54f, and fastened by hot crimping.

The second group nut 56 is a ring-shaped member, and is provided with a central opening part 56a that engages with the outer circumferential part of the male screw pat 52e of the second group lens holding frame 52, a female screw part 56e that can be screw-engaged with the male screw part 52e, a front end surface 56d, a conical inclined surface 56b (located to the rear of the front end surface) with an inclination that is equal to that of the conical inclined surface 54b of the second group rotating ring 54, and a slit part 56c on the side of the back end surface.

When the second group frame unit 50 is to be assembled, the second group frame nut 56 is screw-connected with the second group lens holding frame 52 in a state in which the second group rotating ring 54 is clamped between these parts, thus producing a state in which the conical inclined surface 54b of the second group rotating ring 54 and the conical inclined surface 56b of the second group frame nut 56 make sliding contact. In this assembly, a gap seating plate (spacer) 57 with an appropriate thickness is inserted between the rear contact surface 52d of the second group lens holding frame 52 and the front end surface 56d of the second group frame nut 56. Accordingly, the second group lens holding frame 52 and second group rotating ring 54 can rotate relative to each other in a smooth manner in a state in which there is extremely little looseness in the direction of the optical axis O and the direction perpendicular to the optical axis O; furthermore, the parts are formed into an integrated unit in the direction of the optical axis O.

The second group rotating zoom frame 58 is a cylindrical member; as is shown in FIG. 6, this member has two cam grooves 58d that run obliquely in the direction of the optical axis O, and that have front insertion openings 58c in the inner circumferential part, and two screw parts 58e that are disposed on the outer circumferential parts 58b. Furthermore, the cam followers 55 of the second group rotating ring 54 are inserted into the cam grooves 58d from the insertion openings 58c, and are engaged so that these cam followers 55 are free to slide. Moreover, screws 7N (see FIG. 7) with which metal cam followers 59A (forming two-step cam followers) and resin cam followers 59B that are rotatably fitted into the lower step parts of the cam followers 59A are engaged are screw-connected to the screw parts 58e.

As is shown in FIGS. 2 and 6, the third group frame unit 60 comprises a third group lens 61 which is a focusing lens, a third group lens holding frame 62 which holds the third group lens 61, a third group rotating ring 64, and a third group frame nut 66.

The third group lens holding frame 62 has a flare diaphragm plate, and is provided with an opening part that holds the third group lens 61, a cut-out part 62e (into which the guide rod 47 is inserted in a manner that allows free sliding) located above in a position on the outer circumferential flange part 62b that is substantially symmetrical with respect to the optical axis O, a sleeve supporting hole 62c located below, a rear contact surface 62d, and a male screw part 62e that protrudes rearward from the rear contact surface 62d.

A sleeve 63 into which the guide rod 48 is inserted so that the guide rod 48 is free to slide is inserted into the sleeve supporting hole 62c in a loose state. Furthermore, the sleeve 63 is positioned and fastened by bonding in the sleeve supporting hole 62c in a state in which the guide rod 48 is supported in a specified separated position with respect to the optical axis of the third group lens 61.

The third group rotating ring 64 is a ring-shaped member, and is provided with a central opening part 64a, a conical inclined surface 64b that is disposed to the rear of the central opening part 64a, two extension parts 64e that extend rearward from the outer circumferential part in positions that are substantially symmetrical with respect to the optical axis O, a guide recess 64c into which the connecting arm 88 is inserted (so that the connecting arm 88 is free to slide) in am outer circumferential position in a direction that is substantially perpendicular to the two extension parts 64e, and two cut-out parts 64h that open in front. Pins 64f are respectively disposed in the radial direction on the two extension parts 64e; the cam followers 65 are engaged with these respective pins 64f, and are fastened by hot crimping.

Furthermore, in regard to the two cut-out parts 64h, the two projecting parts 54e of the second group rotating ring 54 are engaged with the cut-out parts 64h during assembly. As a result of this engagement, the guide recesses 54c and 64c of the second group rotating ring 54 and third group rotating ring 64 are positioned in specified positions. Accordingly, the insertion of the connecting arm 88 of the lens driving frame 87 into the guide recesses 54c and 64c is facilitated.

The third group frame nut 66 is a ring-shaped member, and is provided with a central opening part 66a that engages with the outer circumferential part of the male screw part 62e of the third group lens holding frame 62, a female screw part 66e that can be screw-engaged with the male screw part 62e, a front end surface 66d, a conical inclined surface 66b (located to the rear of the front end surface) with an inclination equal to that of the conical inclined surface 64b of the third group rotating ring 64, and a slit part 66c on the side of the back end surface.

In the assembly of the third group frame unit 60, as in the assembly of the second group frame unit 50, the third group frame nut 66 is screw-engaged with the third group lens holding frame 62 in a state in which the third group rotating ring 64 is clamped between these two parts, thus producing a state in which the conical inclined surface 64b of the third group rotating ring 64 and the conical inclined surface 66b of the third group frame nut 66 make sliding contact. In this assembly, a gap seating plate (spacer) 67 with an appropriate thickness is inserted between the rear contact surface 62d of the third group lens holding frame 62 and the front end surface 66d of the third group frame nut 66. Accordingly, the third group lens holding frame 62 and third group rotating ring 64 can rotate relative to each other in a smooth manner in a state in which there is extremely little looseness in the direction of the optical axis O and the direction perpendicular to the optical axis O; furthermore, the parts are formed into an integrated unit in the direction of the optical axis O.

The third group rotating zoom frame 68 is a cylindrical member; as is shown in FIG. 6, this member has two cam grooves 68d that run obliquely in the direction of the optical axis O, and that have front insertion openings 68c in the inner circumferential part, two screw holes 68e that are formed in the outer circumferential parts 68b, and relief cut-out parts 68f in two places in the rear surface part for the projections of the diaphragm frame member and fourth group frame member or the like. Furthermore, the cam followers 65 of the third group rotating ring 64 are inserted into the cam grooves 68d from the insertion openings 68c, and are engaged so that these cam followers 65 are free to slide. Moreover, screws 7P (see FIG. 7) that support metal cam followers 69A (forming two-step cam followers) and resin cam followers 69B that are rotatably fitted into the lower step parts of the cam followers 69A are screw-connected to the screw holes 68e.

As is shown in FIG. 7, the diaphragm frame unit 70 comprises a diaphragm frame member 71, a diaphragm front plate 71A, a diaphragm driving plate 71B, a plurality of diaphragm vanes 72 (see FIG. 2), a diaphragm driving motor 74 which is a stepping motor, a diaphragm opening reset position detection diaphragm PI79, a diaphragm FPC 75 which is connected to the diaphragm driving motor 74 and diaphragm PI79, and an L-shaped FPC supporting plate 76 used to support the diaphragm FPC 75.

The diaphragm frame member 71 is a ring-form member, and is provided with a central opening part 71a, a protruding part 71b that protrudes rearward, a pair of rod engagement holes 71f that are disposed in separated positions on the tip end part of the protruding part 71b and the flange part protruding outward in the radial direction, a rod cut-out part 71g disposed in the flange part in a position that is different from that of the abovementioned flange part, and an FPC supporting part 71c that protrudes rearward, and that supports the diaphragm driving motor of the diaphragm FPC 75, and the end part on the side of the diaphragm PI. Furthermore, a plurality of diaphragm vane supporting pins (located on the inside, not shown in the figures) that support the plurality of diaphragm vanes 72 so that these vanes are free to rotate, a supporting part (not shown in the figures) that supports the diaphragm driving motor 74, and a supporting part (not shown in the figures) that supports the PI 79, are disposed on the diaphragm frame member 71. Furthermore, a cam follower attachment screw hole 71d oriented in the direction perpendicular to the optical axis O is formed in the protruding part 71b, and a screw 7Q that passes through and supports the two-step cam follower 73 is screw-connected to the screw hole 71d. The guide rod 47 is inserted into and passed through the rod engagement hole 71f so that this guide rod 47 is free to slide. The guide rod 48 is inserted into and passed through the rod cut-out part 71g so that the guide rod 48 is free to slide.

The diaphragm driving plate 71B is a circular disk-shaped member; a gear part is formed on the outer circumference of this plate, and the plate is supported on the diaphragm frame member 71 so that the plate is free to rotate. This diaphragm driving plate 71B is rotationally driven via the gear part by the pinion (not shown in the figures) of the diaphragm driving motor 74 during diaphragm adjustment.

As is shown in FIGS. 2 and 7, the fourth group frame unit 80 comprises a fourth group frame member 77, a fourth group lens 81, and a fourth group lens holding frame 82 that holds the fourth group lens 81.

The fourth group frame member 77 has a central opening part 77a, and is provided with a guide slot 77f which protrudes from the outer circumferential part in a position that is substantially symmetrical with respect to the optical axis O, and through which the guide rod 47 is inserted and passed so that the guide rod 47 is free to slide, and a rod engagement hole 77g with a specified length through which the guide rod 48 is inserted and passed so that the guide rod 48 is free to slide. Furthermore, a cam follower mounting screw hole 77d oriented in a direction perpendicular to the direction of the optical axis O is formed in a position to the side of the rod engagement hole 77g. A screw 7R that supports the cam follower 78 is screwed into the screw hole 77d. Furthermore, a circular projecting part 77e (see FIG. 2) that protrudes in the direction of the optical axis O, and that is used to fasten the fourth group lens holding frame 82, and a plurality of screw holes 77c located in positions to the outside of this projecting part 77e, are disposed on the rear surface side of the fourth group frame holding part 77.

The fourth group lens holding frame 82 is a cylindrical member, and has opening part that supports the fourth group lens 81, an engaging diameter 82c that engages with the engaging inside surface 77h of the fourth group frame part 77 on the front side, and a flange part 82b on the front side circumference. An anti-dust member 82B made of felt or the like is bonded to the entire circumference on the rear outer circumferential part. As is shown in FIG. 2, the flange part 82b can be engaged in a state in which there is looseness in the circular projecting part 77e of the fourth group frame member 77, and the thickness of the flange part 82b in the direction of the optical axis O is slightly greater than the thickness of the circular projecting part 77e in the direction of the optical axis O.

In the assembly of the fourth group frame unit 80, the engaging diameter 82c of the fourth group lens holding frame 82 and the engaging inside surface 77h of the fourth group frame part 77 are engaged, and the flange part 82b is inserted into the circular projecting part 77e. Then, the fourth group lens holding frame 82 is rotated with respect to the fourth group frame member 77 positioned by the guide rods 47 and 48 so that the optical axis position of the fourth group lens 81 is adjusted and positioned, and the screws 7M passed through washers 8M are screwed into the screw holes 77c. As a result of this screw fastening, the fourth group frame member 77 and the fourth group lens holding frame 82 are fastened together.

Next, the assembly of the respective constituent units of the optical unit 2 constructed as described above will be described.

The two cam followers 55 mounted on the second group rotating ring 54 are inserted into the cam grooves 58d of the second group rotating zoom frame 58, so that the second group frame unit 50 is accommodated inside the second group rotating zoom frame 58. At the same time, the two cam followers 65 mounted on the third group rotating ring 64 are inserted into the cam grooves 68d of the third group rotating zoom frame 68, so that the third group frame unit 60 is accommodated inside the third group rotating zoom frame 68.

Then, the guide rod 47 is successively passed through the sleeve 49 of the second group lens holding frame 52, the cut-out part 62e of the third group lens holding frame 62, the front side hole of the rod engagement holes 71f of the diaphragm frame member 71, the slot 77f of the fourth group frame member and the rear side hole of the rod engagement holes 71f from the front. Meanwhile, the guide rod 48 is also similarly successively passed through the slot 52g of the second group lens holding frame 52, the sleeve 63 of the third group lens holding frame 62, the cut-out part 71g of the diaphragm frame member 71 and the rod engagement hole 77g of the fourth group frame member.

As a result of the abovementioned rods thus being passed through, a state is produced in which the second group frame unit 50 supported on the second group rotating zoom frame 58, the third group frame unit 60 supported on the third group rotating zoom frame 68, the diaphragm frame unit 70 and the fourth group frame unit 80 are supported in that order from the front so that these units are free to slide by the two guide rods 47 and 48.

The respective units in a state supported by the guide rods 47 and 48 are inserted into the fixed ring 83, and the back end parts of the guide rods 47 and 48 are inserted into the engagement holes 83f and 83g of the fixed ring 83. Here, the guide rods 47 and 48 are inserted and engaged with the engagement holes 83f and 83g from the front side. However, the rods are held in a state in which the rods do not pass completely through. Then, the fixed ring cover 46 is caused to abut against the front end surface of the fixed ring 83, the positioning projections 46h are inserted into the positioning recesses 83h of the fixed ring 83, and the front end parts of the guide rods 47 and 48 are inserted into the engaging hole parts 46f and 46g of the fixed ring cover 46. The screws 7K are passed through the screw passage holes 46b and screwed into the screw holes 83b of the fixed ring 83, so that the fixed ring cover 46 is fastened to the fixed ring 83.

The inner circumferential part 84a of the cam ring 84 is engaged and passed over the front cylindrical part 83i of the fixed ring 83 in which the respective frame members have been assembled as described above, so that free rotation is possible.

Then, the three two-step cam followers 59A and 59B are inserted an passed through the three direct-advance grooves 84d of the cam ring 84 and the three cam grooves 83d of the fixed ring 83, and the screws 7N are screwed into the screw holes 58e in the outer circumference of the second group rotating zoom frame 58, so that the two-step cam followers are attached to the second group rotating zoom frame 58.

Furthermore, the three two-step cam followers 69A and 69B are similarly inserted and passed through the three direct-advance grooves 84d of the cam ring 84 and the three cam grooves 83e of the fixed ring 83, and the screws 7P are screwed into the screw holes 68e in the outer circumference of the third group rotating zoom frame 68, so that these cam followers are attached to the third group rotating zoom frame 68.

Then, the two-step cam follower 73 is passed through the cam groove 84k of the cam ring 84 and the direct-advance groove 83k of the fixed ring 83, and the screws 7Q are screwed into the screw holes 71d of the diaphragm frame member 71 so that this cam follower is attached to the diaphragm frame member 71.

Furthermore, the cam follower 78 is passed through the cam groove 84m of the cam ring 84 and the direct-advance groove 83m of the fixed ring 83, and the screws 7R are screwed into the screw holes 77d of the fourth group frame member 77, so that this cam follower is attached to the fourth group frame member 77.

The retaining ring 86 is fit over the outer circumference of the cam ring 84 from the rear, and the projecting part 86j is inserted into the rotation-stopping groove 84j of the cam ring 84, thus producing a state that allows contact with the step part 84h so that the cam ring 84 can be pushed forward in the direction of the optical axis O.

The lens driving frame 87 is freely rotatably engaged with and passed over the rear outer circumferential part 83j of the fixed ring 83, and the front engaging part 88c of the connecting arm 88 is engaged with and passed through the guide recess 64c of the third group rotating ring 64 and the guide recess 54c of the second group rotating ring 54. The engaging bifurcated part 87c of the lens driving frame 87 can move in the circumferential direction over the rear outer circumferential part 83j of the fixed ring 83.

Then, while the three projecting parts 46d of the fixed ring cover 46 are inserted into the three direct-advance grooves 43d of the first group frame member, the inside circumferential part 43a of the first group frame member 43 of the first group frame unit 40 is engaged (in a manner that allows sliding) with the outer circumference of the cam ring 84. During the abovementioned engagement, the three cam follower parts 43e on the inner circumferential side of the first group frame member 43 are inserted (in a manner that allows free sliding) into the cam grooves 84e via the recesses 46c of the fixed ring cover 46 and the insertion recesses 84c of the cam ring 84.

The assembly of the optical unit 2 is completed by the attachment of the first group frame unit 40. The optical unit 2 for which the abovementioned assembly has been completed is shown in a perspective view in FIG. 11. As is shown in FIG. 11, the diaphragm FPC 75 held on the FPC supporting plate 76 is exposed at the rear of the assembled optical unit 2.

Next, the detailed structures and attachment procedures of the respective constituent members of the external mounting unit 1 will be described.

The fixed frame 11 is a cylindrical member whose axial center is oriented along the direction of the optical axis O. A flange-form front cover attachment part is formed on the cylindrical front end part, and screw parts or the like for the attachment of the fixed ring, control unit, lens mount an the like are disposed on the cylindrical back end surface part (see FIG. 12). Furthermore, two driving pin relief holes 11g that face each other along the circumferential direction, one connecting arm relief hole 11h, an FPC mounting recess 11y formed by a slight recess along the circumferential direction, an FPC mounting flat surface part 11j and positioning recess 11i (located on the rear part of the outer circumference of the cylindrical part), and a projecting part 11e (projecting to the rear) located on the outer circumference of the front cylindrical part, are disposed on the cylindrical part of the fixed frame 11.

In a state in which an O-ring 5A is inserted into the front end outer circumferential part 11b, the ring-form front cover part 12 (in a state in which sealing ring 6A has been inserted into the inner circumferential part 12b) is engaged with the fixed frame 11. Screws 7A that are passed through the screw passage holes 11a of the fixed frame 11 are screwed into the screw holes 12a of the front cover 12, so that the front cover 12 is fastened to the front surface part of the fixed frame 11.

A distance encoder FPC 13 which is a distance encoder board is bonded to the FPC mounting part 11y on the cylindrical outer circumferential part of the fixed frame 11. This distance encoder FPC 13 has a distance encoder pattern, an has an FPC extension part 13b that extends rearward along the optical axis O; a connector terminal 13a used for connection with a lens barrel control FPC 102 are disposed on the tip end of this extension part.

An optical unit 2 in which the first group frame unit 40, fixed ring 83, cam ring 84, lens driving frame 87 and the like shown in the FIG. 11 are installed is inserted into the inner circumferential part of the fixed frame 11 from the front side, and the fixed ring 83 is fastened to the back end part of the fixed frame 11 as a result of screws 7V that are-passed through the screw passage holes 11n, 11p and 11q of the fixed frame 11 being screwed into the screw holes 83n, 83p and 83q of the fixed ring 83 (see FIGS. 12 and 13).

As a result of the fixed ring 83 being fastened to the fixed frame 11, the lens driving frame 87 is supported (so that this lens driving frame 87 can rotate) on the rear circumferential part 83j of the fixed ring 83 in a state in which movement in the direction of the optical axis O is restricted by the rear inner circumferential end surface 11k of the fixed frame 11 and the step part end surface 83t of the fixed ring 83. Furthermore, since the retaining ring 86 on which the cam ring 84 is mounted is pushed forward by the rear part inner circumferential step part 11m of the fixed frame 11 in the fastened state of the fixed ring 83, the cam ring 84 is pushed forward and supported so that rotation is possible in a state in which there is no looseness with respect to the fixed ring 83 in the direction of the optical axis O.

Then, the FPC supporting plate 76 supporting the diaphragm FPC 75 exposed at the rear of the fixed ring 83 (see FIG. 11) is attached to the back end part of the fixed frame 11. Specifically, when the FPC supporting plate 76 is positioned by fitting the positioning holes 76s of the FPC supporting plate 76 over the positioning pins 11s formed in the recess 11l of the back end part of the fixed frame 11, and the screws 7L that are passe through the screw passage holes 76r are screwed into the screw holes 11r of the fixed frame 11, the FPC supporting plate 76 is attached to the back end part of the fixed frame 11 (see FIGS. 12 an 13).

Then, the distance ring 14, intermediate ring 16, scale ring 21, zoom base 24, zoom ring 26 and back end cover 31 are installed by being fit over the outer circumference of the fixed frame 11 from the rear in that order. Next, the details and assemble states of the respective members will be described.

The distance ring 14 is an annular member that has a central opening; a rubber ring 15 is engaged and mounted on the outer circumference of this member, and a slit disk 14A used as an encoder plate is positioned by a recess 14b and attached to the inner circumference. The slit disk 14A is a thin plate member which has a central opening; in this member, slits constituting light transmitting parts that run along the radial direction, and light blocking parts, are alternately formed in the circumferential direction, and four positioning projecting parts 14Ab that engage with recesses 14b formed in the distance ring 14, are disposed on the outer circumferential part.

The intermediate frame 16 is an annular member that has a central opening; this member has a window part opening in a part of the circumferential surface of the upper part of the ring, and a transparent window part member 17 is bonded to the outside surface of the window part opening. Two PI mounting recesses 16d and one rotation stopping recess 16e are formed in the front end part of the intermediate frame 16, engaging contact part 16p with a zoom base 24 is formed on the back end surface. And a pair of distance PI (photo-interrupters) 19 which are photodetectors that are mounted on the distance PI FPC 18 are inserted into the recess 16d. These distance PI 19 are held by a PI retainer 20 that is a plate spring member, and are fastened to the intermediate frame 16 by screws 7B that are screwed into screw holes 16g in the intermediate frame 16.

In the distance PI FPC 18, a pair of distance PI 19 are mounted on one end, and the other end extends to the rear along the optical axis O. A connector terminal 18a used for connection to the lens barrel control FPC 102 is disposed on the tip end of this FPC 18.

The scale ring 21 is an annular member that has a central opening; this member has an outer circumferential part 21b that rotatably engages with the inner circumferential part 16b of the intermediate frame. A projecting part 21d that extends in the direction of the optical axis O, and screw holes 21c located above this projecting part, are disposed on the upper part of the scale ring 21. A distance armature 22 constituting an electrical armature is attached to the inside by means of screws 7D. Furthermore, distance indicators 21e ranging from a proximate distance to infinity that indicate the distance of the object of focusing of the second and third group lenses 51 and 61 (focusing lenses) that advance and retract in linkage with the rotation of the scale ring 21 are disposed on the outer circumference of the upper part in correspondence with the respective rotational positions. A connecting arm 23 is fastened to the lower part of the scale ring 21 by means of screws 7D that are passed through the screw passage holes 23b.

The connecting arm 23 is a straight metal plate member that extends rearward parallel to the optical axis O; an engaging part 23c that is formed by bending the member toward the inner circumference is disposed on the tip end part of this member.

When the distance ring 14, intermediate frame 16 and scale ring 21 are to be assembled with the fixed frame 11, the slit disk 14A is inserted beforehand into the detection part gap of the distance PI 19 on the side of the intermediate frame 16, and, with the tip end part of the intermediate frame 16 maintained in a state in which this tip end part is inserted into the inner circumference 14a of the distance ring 14, the distance ring 14 and intermediate frame 16 are fit over the front part of the outer circumference of the fixed frame 11 from the rear side. During this engagement, the O-ring 5B is engaged with the front ring groove 16c of the intermediate frame 16, and the inner circumferential 14a of the distance ring 14 is caused to contact the outer circumference of the O-ring 5B.

Furthermore, the scale ring 21 is inserted into the inner circumference of the intermediate frame 16 from the rear. In this case, the engaging part 23c of the connecting arm 23 is passed through the connecting arm relief hole 11h of the fixed frame 11, and is engaged with the engaging bifurcated part 87c of the lens driving frame 87 that has been installed inside the fixed frame 11 beforehand (see FIG. 7).

In the state in which the distance ring 14, intermediate frame 16 and scale ring 21 are installed in the fixed frame 11, the intermediate frame 16 is supported so that the front end surface of this frame contacts the side surface (in the direction of the optical axis O) of the circumferential rib-form projecting part 11d disposed on the outer circumferential surface 11f of the fixed frame 11, and so that the rotation-stopping recess 16e engages with the projecting part 11e of the fixed frame 11. Accordingly, rotation with respect to the fixed frame 11 is checked, and the distance ring 14 is positioned in the direction of the optical axis O so that this distance ring 14 can rotate on the fixed frame 11. The distance ring 14 is supported so that this ring is engaged in the radial direction with the flange part outer circumference 11c and projecting part (outer circumference) 11d of the fixed frame 11, and is further supported so that this ring makes sliding contact with the side surface (in the direction of the optical axis O) of the circumferential rib-form projecting part 11k1 disposed on the outer circumferential 11f of the fixed frame 11, thus allowing a manual turning operation together with the slit disk 14A in a state in which movement in the forward direction is checked. The scale ring 21 is inserted into the inner circumferential part of the intermediate frame 16, and is supported so that rotational driving by means of the lens driving frame 87 is possible in a state in which movement in the forward direction is restricted.

The engaging contact part 16p on the rear side of the intermediate frame 16 engages in the radial direction with the front end engaging contact part 24p of the zoom base 24 (described later), and makes contact via the O-ring 5C in the axial direction, so that movement of the intermediate frame 16 and distance ring 14 in the rearward direction and radial direction is restricted. The rearward movement of the scale ring 21 is also restricted by the engaging contact part 24p of the zoom base 24. Furthermore, the O-ring 5C is engaged with the circumferential groove of the engaging contact part 24p of the zoom base 24, and is pushed and held by the back end surface of the engaging contact part 16p of the intermediate frame 16.

When the distance ring 14 is rotated, the slit disk 14A that rotates as an integral unit with the distance ring 14 moves in relative terms through the distance PI 19 fastened to the intermediate frame 16; accordingly, the output of the distance PI 19 caused by the operation of the distance ring 14 is transmitted to the side of the distance PI FPC 18. Furthermore, since the distance armature 22 mounted on the scale ring 21 slides over the encoder pattern of the distance encoder FPC 13 on the outer circumference of the fixed frame 11, the rotational position output of the scale ring 21 is transmitted to the side of the distance encoder FPC 13. Furthermore, in the abovementioned assembled state, the portion of the distance encoder FPC 13 located on the side of the connector terminal 13a, and the portion of the distance PI FPC 18 located on the side of the connector terminal 18a, both extend to the back end of the fixed frame 11.

The zoom base 24 is a cylindrical member whose axial center runs along the optical axis O; this member has an inner circumferential part 24f that is fit over the outer circumference 11f of the fixed frame 11 so that this member is free to slide. An engaging contact part 24p that engages with the intermediate frame 16, and a front flange part 24c, are disposed on the front end part of the zoom base 24. Furthermore, an outer circumferential step part 24m with a slightly smaller diameter is formed on the back end part of the zoom base 24. Two driving pin passage slots 24g that extend in the circumferential direction, a connector relief cut-out part 24j, an FPC mounting recess 24y, and an FPC passage hole 24h, are formed in the cylindrical part of the zoom base 24, and a rotation-stopping projecting part 24i is formed in the inner circumferential surface of the back end part.

A zoom encoder FPC 25 that has a zoom encoder pattern is boned to the FPC mounting recess 24y. The zoom encoder FPC 25 has an extension part 25b that passes through the FPC passage hole 24h, and extends to the rear of the fixed frame 11. A zoom encoder connector terminal 25a is disposed on the tip end of the extension part 25b.

The zoom ring 26 is a cylindrical member whose axial center runs along the direction of the optical axis O; this member has a cylindrical inner circumferential part 26d that is fit over the cylindrical outer circumferential part of the zoom base 24. Furthermore, a tip end outer circumferential part 26q with a specified width (to which zoom indicators 26r are applied), which is a step part with a slightly greater diameter than the cylindrical part 26a, and a front inner circumferential step part 26c, which engages in the radial direction with the outer circumference of the front flange part 24c of the zoom base 24, and which makes sliding contact with the side of the flange part 24c in the direction of the optical axis O, are formed on the front end part of the zoom ring 26. Moreover, a back end inner circumferential step part 26m which is slightly smaller in diameter than the inner circumference of the zoom ring, and an engaging contact part 26p which engages with the back end cover 31, are formed on the back end part of the zoom ring 26.

Furthermore, two driving pin slots 26b which are slots that are slightly longer in the direction of the optical axis O, and that allow the insertion of driving pins 85 in an attitude in which these pins substantially face each other, and a recess 26e in which a zoom encoder armature 27 is mounted, are formed in the cylindrical part 26b of the zoom ring 26. Moreover, a specified gap for the installation of the zoom encoder is formed between the cylindrical inner circumferential part 26d and the cylindrical outer circumferential part of the zoom base 24.

An opening part 26f used to expose the armature is formed in the central part of the recess 26e, and anchoring holes 26g and 26h are formed in the end parts of the recess 26e in the circumferential direction. The zoom encoder armature 27, and an armature cover 28 that pushes and holds the back surface of the zoom encoder armature 27, are inserted into these parts. Anchoring projections 28g and 28h are formed in the armature cover 28 at both ends; during mounting, the anchoring projections 28g and 28h are anchored in the anchoring holes 26g an 26h so that the armature and cover are prevented from falling out.

The back end cover 31 is an annular member; in this member, an engaging sliding contact part 31p that engages and makes sliding contact with the zoom ring 26 is disposed on the front end part, and a cylindrical rear contact surface 31k is disposed on the inside surface of the back end. Screw passage holes 31v and 31w are formed in the rear contact surface 31k. Furthermore, ventilation hole groups 31b are formed in two places along the short tubular cylindrical part in the direction of the optical axis O. Cover supporting holes 31c are formed in the center and at both ends of each ventilation hole group 31b.

Two water-repellent sheets 33 are applied to the upper parts of the respective ventilation hole groups 31b, and these ventilation hole groups 31b are covered by a water-repellent sheet cover 32. The water-repellent sheet cover 32 is fastened by inserting supporting pins 32c into the cover supporting holes 31c, and bonding these parts. A slight space that communicates with the outside air is formed between the water-repellent cover 32 and the water-repellent sheets 33.

The zoom base 24, zoom ring 26 and back end cover 31 are successively attached to the outer circumference of the fixed frame 11 with which the distance ring 14, intermediate frame 16 and scale ring 21 have been assembled.

First, the zoom encoder FPC 25 is bonded to the recess 24y of the zoom base 24; furthermore, the O-ring 5C is inserted into the front surface ring groove of the engaging contact part 24p of the zoom base 24, and the O-ring 5D is inserted into the ring groove 24d in the outer circumference. The zoom base 24 is fit over the outer circumference 11f of the fixed frame 11 from the rear, and the front engaging contact part 24p is caused to engage and contact the rear engaging contact part 16p of the intermediate frame 16. The positioning of the zoom base 24 in the rotational direction is accomplished by engaging the projecting part 24i on the back end part of the zoom base 24 with the rotation-stopping recess 11i in the back end part of the fixed frame 11.

Then, the zoom ring 26 is fit over the outer circumference of the zoom base 24 from the rear side, with the tip end outer circumferential part 26q positioned on the front side. Specifically, the front inner circumferential step part 26c of the zoom ring 26 is caused to engage and contact the flange part 24c of the zoom base 24, and at the same time, the inner circumference of the back end inner circumferential step part 26m of the zoom ring 26 is engaged with the outer circumference of the step part 24m of the zoom base 24.

Here, the detailed construction of the control unit 3 comprising the focusing lens driving unit 101 and lens barrel control FPC 102 will be described with reference to FIG. 8.

The focusing lens driving unit 101 comprises a speed reduction gear box 122 containing a speed reduction gear train and speed reduction output gear 123, a focusing motor 121 which is supported via the gear box 122, a motor PI 112 that is used to detect the amount of rotation of the motor output gear of the focusing motor 121, and an attachment plate 124, with motor lead wires 125 from the motor 121 being soldered to the lens barrel control FPC 102, and these part being connected via the motor PI FPC 102e. The focusing motor 121, speed reduction gear box 122 and motor PI are fastened by means of screws via the attachment plate 124.

An FPC supporting plate 103 which is used to accommodate and attach the lens barrel control FPC 102 to the back surface part while maintaining a specified shape inside the barrel is bonded to this FPC 102. As is shown in FIGS. 8 and 10, this FPC supporting plate 103 has a main part 103e with a flat surface parallel to the barrel optical axis O, which supports the main FPC part of the lens barrel control FPC 102, and a bent part 103a which is connected to this main part, and which is slightly bent along a line parallel to the barrel optical axis O and disposed in the circumferential direction of the barrel so as to support the folded FPC part 102*a* which has a flat surface parallel to the barrel optical axis O. Furthermore, the supporting plate 103 has an attachment part 103*b* constituting a flat surface perpendicular to the barrel optical axis which is connected to and bent from the main part 103*c*, and which is used for attachment to the fixed frame 11. Screw passage holes 103*c* and 103*d* are formed in the attachment part 103*b*.

The lens barrel control FPC 102 is an FPC in which the mounted electrical parts (IC 105 and the like), connectors and the like are mounted on one side (except for the PI 112). As is shown in FIGS. 8 and 9, this FPC is provided with an FPC part 102*i* that is bonded to the back surface of the main part 103*e* of the FPC supporting plate 103, a main FPC 102*a* that is connected to this FPC part 102*i*, and that is bonded to the back surface of the bent part 103*a*, an FPC part 102*h* which is connected and bent from one end of the main FPC 102*a* and bonded to the front surface of the bent part 103*a*, and in which a distance encoder FPC connector 107, a zoom encoder FPC connector 108 and a diaphragm FPC connector 109 are mounted on the mounting surface, a relay FPC part which is a part that is connected to the FPC part 102*i*, and in which a portion of this part is bonded to the front surface of the main part 103*e*, an FPC part 102*d* which continues from this relay FPC part 102*c*, and on which a mount contact member 111 is mounted, and FPC part 102*e* which extends from the FPC part 102*d*, and in which a motor PI 112 is mounted on the tip end of the opposite side from the mounting surface on which the other electrical parts are mounted, and a ground FPC 102*f* which is disposed so that this part protrudes from the FPC part 102*i*. Furthermore, a connector mounting part 102*b* which is a part that is disposed so as to protrude from the main FPC part 102*a*, and on which a distance PI connector 110 is mounted, is also provided. Moreover, in regard to the terms "front surface" and "back surface" used in the description of the abovementioned FPC 102, the surface that can be seen when the supporting plate 103 and FPC 102 are installed inside the lens barrel and viewed from the optical axis O of the lens barrel is taken as the "front surface", and the surface on the opposite side is taken as the "back surface".

A lens mount contact part 111*a* which is a contact used for communications with the camera body side is disposed on the back end surface of the mount contact member 111. The lens mount contact part 111*a* is connected to the lens barrel control FPC 102 via the relay FPC part 102*c*.

After the fixed ring 83 and fixed frame 11 have been coupled, but before the back end cover 31 is attached, and prior to the connection of the respective FPC connectors, the focusing motor 121 is inserted into the interior of the fixed ring 83 from the rear of the fixed frame 11 as shown in FIGS. 12, 13, and 14, and the speed reduction gear box 122 is positioned in the gear box positioning recess 11*o* in the rear surface of the fixed frame 11 by a pair of pins lit that are disposed on the flat surface of this recess while the output gear 123 of the speed reduction gear train is engaged with the inside-tooth gear part 87*b* of the lens driving frame 87. Then, two screws 7T are passed through the screw passage holes 122*s* and 122*r* of the speed reduction gear box 122 (see FIG. 8) and screwed into the screw holes 83*s* and 83*r* of the fixed ring 83, so that the speed reduction gear box 122 and focusing motor 121 are fastened to the back end part of the fixed ring 83.

Furthermore, the FPC supporting plate 103 with which the lens barrel control FPC 102 is integrated is inserted into the fixed frame 11 from the back end of this frame, and the attachment part 103*b* of the FPC supporting plate 103 is mounted in the supporting plate attachment recess 11*z* in the back end part of the fixed frame 11 as shown in FIGS. 13 and 14. The screws 7U are passed through the screw passage holes 103*c* and 103*d* of the attachment part 103*b*, and are screwed into the screw holes 11*u* of the fixed frame 11, so that the attachment part 103*b* is fastened to the fixed frame 11. As a result of this fastening of the attachment part 103*b*, the lens barrel control FPC 102 is accommodated in and fastened to the back end part of the fixed frame 11. Specifically, this FPC 102 is held on the inner circumferences of the fixed ring 83 (which is a fixed frame) and the fixed frame 11.

In the state prior to the attachment of the back end cover 31, the FPC connector terminals are connected to the respective connector terminals mounted on the lens barrel control FPC 102. Specifically, the connector terminal 13*a* of the distance encoder FPC 13 is connected to the distance encoder FPC connector 107. The connector terminal 25*a* of the zoom encoder FPC 25 is connected to the zoom encoder FPC connector 108. The connector terminal 75*a* of the diaphragm FPC 75 is connected to the diaphragm FPC connector 109. The connector terminal 18*a* of the distance PI FPC 18 is connected to the distance PI connector 110.

Then, the back end cover 31 in a state in which the O-ring 5E is mounted in the ring groove of the engaging contact part 31*p* is engaged with the back end part of the fixed frame 11 on the rear of the zoom ring 26, the engaging contact part 31*p* of the back end cover 31 is engaged with the engaging contact part 26*p* on the rear of the zoom ring 26, an the engaging contact part 26*p* and engaging contact part 31*p* are caused to contact each other via the O-ring 5E while the O-ring 5E is compressed. In this case, the rear contact surface 31*k* of the back end cover 31 contacts the back end surface of the zoom base 24. The screws 7E that are passed through the screw passage holes 31*v* and 31*w* of the back end cover 31 are screwed into the screw holes 11*v* and 11*w* of the fixed frame 11 (see FIG. 12), so that the back end cover 31 is fastened to the fixed frame 11.

Following the mounting of the back end cover 31, or before this mounting, the driving pins 85 are engaged with and passe through the driving pin slots 26*b* of the zoom ring 26, and are further passed through the driving pin passage slots 24*g* of the zoom base 24; then, these driving pins 85 are screwed into the driving pin screw holes 84*i* of the cam ring 84 that has been installed beforehand in the fixed frame 11. Furthermore, the zoom encoder armature 27 is inserted into the recess 26*e* of the zoom ring 26, and the armature cover 28 is attached to the back surface of this armature. In this attached state, the rubber ring 29 is engaged with the outer circumferential part of the zoom ring 26.

In the assembled state of the zoom base 24, zoom ring 26 and back end cover 31, the zoom base 24 is restrained from the rear in the direction of the optical axis O with respect to the fixed frame 11 by the back end cover 31, and is thus supported so that both rotation and movement in the axial direction are restricted. The zoom ring 26 is also restrained from the rear in the direction of the optical axis O with respect to the fixed frame 11 by the back end cover 31, so that this zoom ring 26 is rotatably supported, but in a state in which movement in the axial direction is restricted. Furthermore, the rearward movement of the intermediate frame 16 and scale ring 21 to the rear in the direction of the optical axis O is restricted via the zoom base 24.

In the abovementioned assembled state, the cam ring 84 on the side of the optical unit 2 is rotationally driven via the driving pins 85 with the rotational operation of the zoom ring 26. As a result of the rotation of the zoom ring 26, the zoom encoder armature 27 slides over the pattern of the zoom encoder FPC 25; accordingly, a zoom encoder signal is output to the side of the FPC 102 via the connector terminal 25*a* of the zoom encoder FPC 25.

Subsequently, the mount contact member 111 mounted on the lens barrel control FPC 102 is mounted on the lens mount 36 (described later), and the lens mount 36 is attached to the back end surface of the fixed frame 11.

As is shown in FIGS. 2 and 5, the lens mount 36 has an opening part 36*a*, and is provided with a bayonet claw part 36*i* that is disposed on the rear side of the flange part, a mount contact member mounting recess 36*b* that is disposed in the inner circumference of the flange part, a motor attachment plate relief recess 36*c* that is disposed in the front surface, an engaging hole 36*g* used for the locking of the lens mount to the camera body, screw passage holes 36*d* and the like.

The cover rear frame 37 is provided with a tubular part 37*a* that can engage with the outer circumference of the fourth group lens holding frame 82, a relief recess 37*c* for the fourth group frame member 82, a cut-out part 37*b* used for relief of the mount contact member, and screw passage holes 37*e* that are disposed in the flange part. Furthermore, an anti-dust cover ring 38 which has a cut-out part 38*a* with an anti-dust member disposed on the inside surface is inserted and bonded to the inner circumference of the front end part of the tubular part 37*a*.

When the lens mount 36 is to be attached to the back end surface of the fixed frame 11, the mount contact member 111 is first fit into the contact mounting recess 36*b* of the lens mount 36, and the screws 7G passed through the screw passage holes 36*f* of the lens mount 36 are screwed into the screw holes 111*b* (see FIG. 8) of the mount contact member 111, so that the mount contact member 111 is fastened to the lens mount 36. Then, the screws 7F are passed through the screw passage holes 36*d* of the lens mount 36, an are screwed into the screw holes 11*x* in the back end surface of the fixed frame 11, so that the lens mount 36 is fastened to the back end surfaces of the fixed frame 11 and back end cover 31.

In the attachment of the lens mount 36, in order to adjust the flange-backing amount of the optical system of the optical unit 2 installed inside the fixed frame, one or a plurality of spacing washers (spacers) 35 that have an appropriate thickness are selected and placed on the back end surfaces of the fixed frame 11 and back end cover 31, and the lens mount 36 is fastened in a state in which the spacing washers 35 are interposed.

Furthermore, in the attachment of the lens mount 36, the lens mount 36 is mounted on the fixed frame 11 in a state in which a sealing ring 6B constituting a packing material is inserted between the outer circumference of the lens mount 36 and the back end surface step part of the back end cover 31.

Subsequently, the tubular part of the cover rear frame 37 is inserted into the opening part 36*a* of the lens mount 36, and the screws 7H are passed through the screw passage holes 37*e* and screwed into the screw holes 36*e* of the lens mount 36, so that the cover rear frame 37 is attached to the lens mount 36.

As a result of the mounting of the abovementioned lens mount 36 and cover rear frame 37, the assembly of the first lens barrel 10 comprising the external mounting unit 1, the optical unit 2, control unit 3 an the like is completed.

Next, the supported states and movement operations of the respective frame members constituting the optical unit 2 of the abovementioned first lens barrel 10 will be described.

The fixed ring 83 is connected to the fixed frame 11 at the back end part so as to form an integral unit. Furthermore, the first group frame member 43 of the first group frame unit 40 can advance and retract in the direction of the optical axis O in a state in which rotation is restricted by the projecting part 46*d* of the fixed ring cover 46 that is mounted on the fixed ring 83, and this member is caused to advance and retract by the cam groove 84*e* of the cam ring 84 when the cam ring 84 is rotated.

The second group lens holding frame 52 in the second group frame unit 50 can advance and retract in the direction of the optical axis O in a state in which rotation is restricted by the guide rods 47 and 48. The second group rotating ring 54 moves together with the second group lens holding frame 52 in the direction of the optical axis O, and is rotationally driven in linkage with the rotation of the lens driving frame 87. The second group rotating zoom frame 58 is rotationally driven together with the cam ring 84 along the direct-advance groove 84*d* of the cam ring 84, and is also caused to advance and retract in the direction of the optical axis O by the cam groove 83*d* of the fixed ring 83. Furthermore, the advanced or retracted position of the second group rotating ring 54 is determined via the cam groove 58*d* by the rotation and advancing and retracting movement (in the direction of the optical axis O) of the second group rotating zoom frame 58; moreover, the advanced or retracted position of the second group lens holding frame 52 in the direction of the optical axis O is also determined in the same manner.

Meanwhile, the third group lens holding frame 62 in the third group frame unit 60 can also similarly advance and retract in the direction of the optical axis O in a state in which rotation is restricted by the guide rods 47 and 48. The third group rotating ring 64 moves in the direction of the optical axis O together with the third group lens holding frame 62, and is rotationally driven in linkage with the rotation of the lens driving frame 87. The third group rotating zoom frame 68 is rotationally driven together with the cam ring 84 along the direct-advance groove 84*d* of the cam ring 84, and is also caused to advance and retract in the direction of the optical axis O by the cam groove 83*e* of the fixed ring 83. Furthermore, the advanced or retracted position of the third group rotating ring 64 is determined via the cam groove 68*d* by the rotation and advancing and retracting movement (in the direction of the optical axis O) of the third group rotating zoom frame 68; moreover, the advanced or retracted position of the third group lens holding frame 62 in the direction of the optical axis O is also determined in the same manner.

The diaphragm frame unit 70 can advance and retract in the direction of the optical axis O in a state in which rotation is restricted by the guide rods 47 and 48, and is driven in an advancing and retracting motion in the direction of the optical axis O by the cam groove 84*k* of the cam ring 84 via the cam follower 73.

The fourth group frame unit 80 can advance and retract in the direction of the optical axis O in a state in which rotation is restricted by the guide rods 47 and 48, and is driven in an advancing and retracting motion in the direction of the optical axis O by the cam groove 84*m* of the cam ring 84 via the cam follower 78.

In the first lens barrel 10, in cases where the zoom ring 26 is rotated via the rubber ring 29 in order to perform a zooming operation, the first group frame unit 40 advances or retracts into the desired zoom position in the direction of the optical axis O as a result of the rotation of the cam ring 84. Furthermore, the second group and third group rotating zoom frames 58 and 68 respectively rotate and move in the direction of the optical axis O as a result of the rotation of the cam ring 84.

The second group and third group rotating rings 54 and 64 move in the direction of the optical axis O with the amount of movement caused by the cam grooves accompanying the rotation of the second group and third group rotating zoom frames 58 and 68 being further superimposed on the amount of movement of these zoom frames 58 and 68 in the direction of the optical axis O (in a state in which these members are held in a state of restricted rotation by the lens driving frame 87 in a non-rotating state). The second group and third group lens holding frames 52 and 62 respectively advance or retract into desired zoom positions together with these rotating rings 54 and 64. Furthermore, as a result of the rotation of the cam ring 84, the diaphragm frame unit 70 and fourth group frame unit 80 advance or retract into respective desired zoom positions via the cam grooves 84$k$ and 84$m$.

The rotational position of the zoom ring 26 during zooming is transmitted to the side of the lens barrel control FPC 102 via the zoom encoder FPC 25, and is output as a zoom position signal to the side of the mounted camera body.

Next, in cases where the distance ring 14 is rotated via the rubber ring 15, the amount of this rotation and direction of this rotation are detected by the pair of distance PIs 119. The rotational amount output is transmitted to the side of the lens barrel control FPC 102 via the distance PI FPC 18, and the focusing motor 121 is rotationally driven so as to form a focus at the distance corresponding to the rotational amount output. Meanwhile, in cases where focusing distance data is taken into the lens barrel control FPC 102 from the side of the mounted camera body via the lens mount contact part 111$a$, the focusing motor 121 is rotationally driven by a specified amount in the necessary direction on the basis of this focusing distance data.

When the focusing motor 121 is rotationally driven, the lens driving frame 87 is rotationally driven, and the second group and third group rotating rings 54 and 64 are both rotationally driven via the connecting arm 88. As a result of this rotational driving, the second group and third group rotating rings 54 and 64 advance or retract along the cam grooves of the second group and third group rotating zoom frames 58 and 68 that are stopped during focusing. The second group and third group lens holding frames 52 and 62 respectively move into the focusing position together with the second group and third group rotating rings 54 and 64. The rotation of the lens driving frame 87 is transmitted to the scale ring 21 via the connecting arm 23. The rotational position signal of the scale ring 21 is transmitted to the side of the lens barrel control FPC 102 via the distance encoder FPC 13, and is further transmitted to the side of the camera body via the lens mount contact part 111$a$. At the same time, the amount of rotation of the focusing motor 121 is detected by the motor PI 112, and is transmitted to the side of the lens barrel control FPC 102.

In cases where diaphragm driving is performed in the first lens barrel 10, a diaphragm signal is taken into the lens barrel control FPC 102 via the lens mount contact part 111$a$, and is converted into a diaphragm driving motor driving signal. The abovementioned diaphragm driving motor driving signal is transmitted to the diaphragm driving motor 74 via the diaphragm FPC 75, and the diaphragm vanes 72 are rotationally driven via the diaphragm driving plate 71B. The fully-open position (reset position) signal of the diaphragm driving plate 71B is detected by the diaphragm PI 79, and is taken into the lens barrel control FPC 102 via the diaphragm FPC 75.

Next, the advanced and retracted positions of the respective lenses and the diaphragm (i. e., the advanced and retracted positions of the respective lens frames and the diaphragm frame) with respect to the rotation of the zoom ring and lens driving frame during focusing and during zooming by means of the zoom driving device of first lens barrel 10 will be described in detail with reference to FIGS. 15 through 18 and the like.

Figure 15:
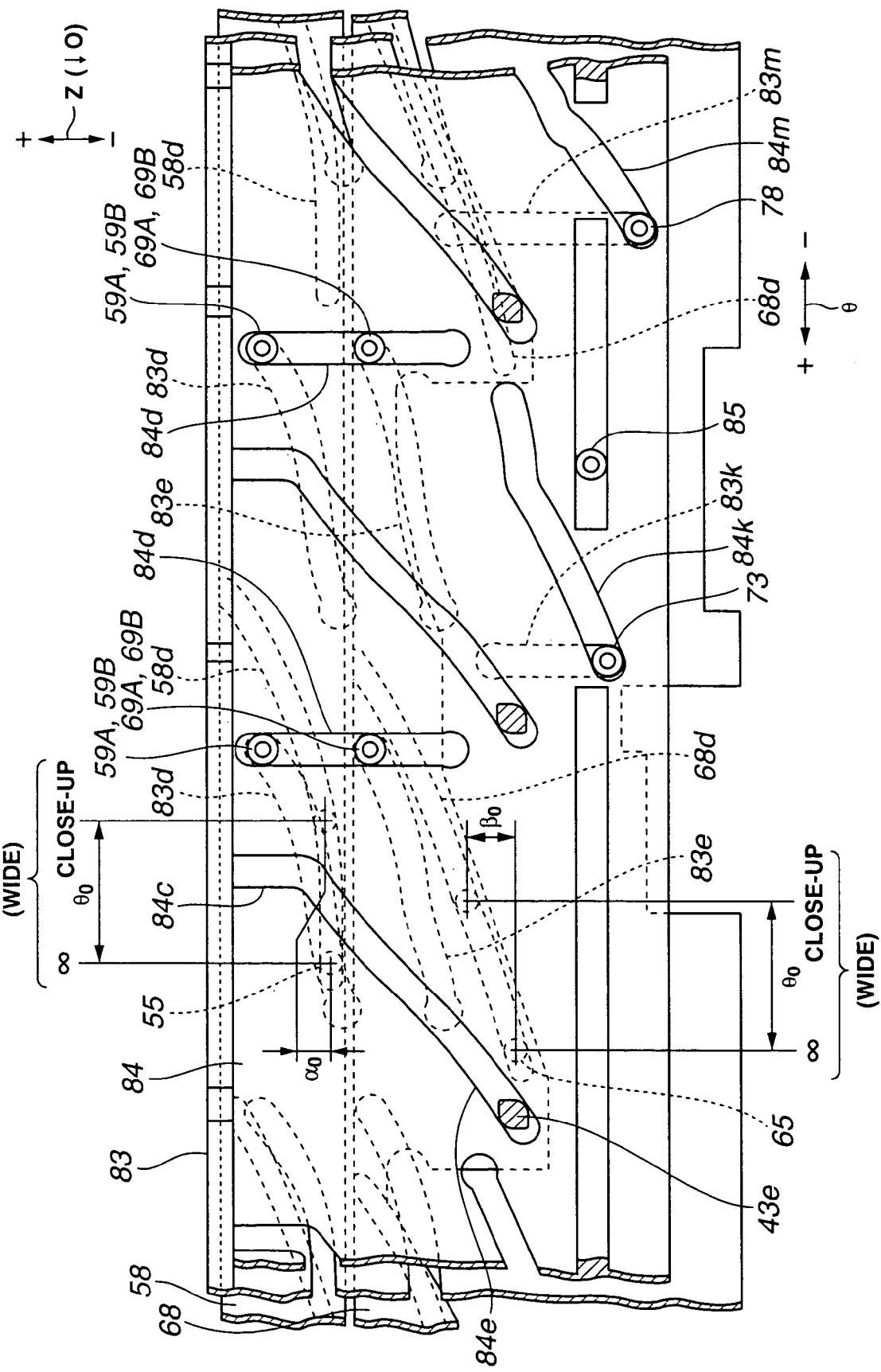
FIG. 15 is an unfolded view of the cam ring, fixed ring, rotary zoom frame and cam follower in the wide state in the first lens barrel shown in FIG. 1, as seen from the outer circumferential side.
Figure 16:
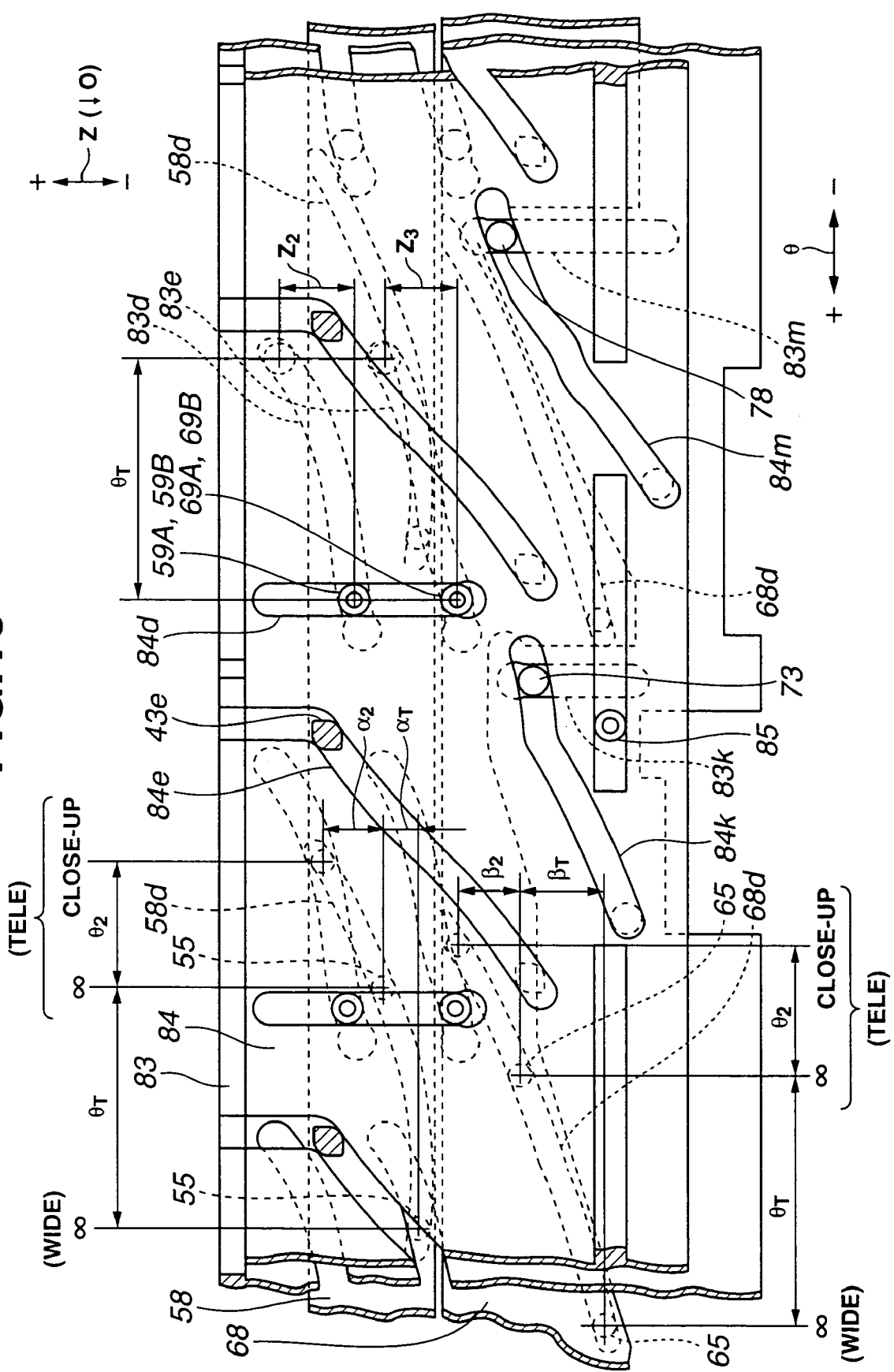
FIG. 16 is an unfolded view of the cam ring, fixed ring, rotary zoom frame and cam follower in the tele state of the first lens barrel shown in FIG. 1, as seen from the outer circumferential side.
Figure 17:
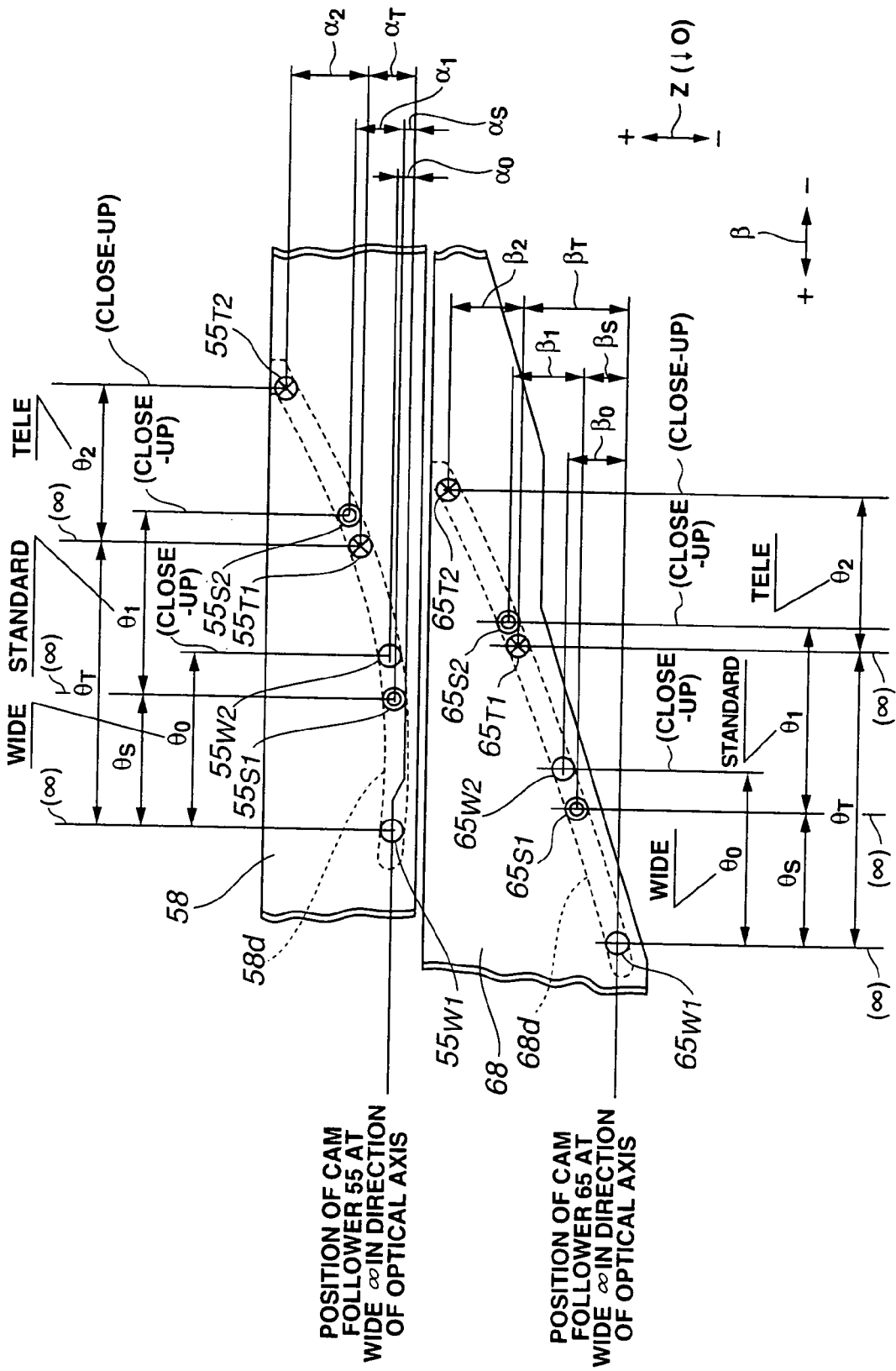
FIG. 17 is an unfolded view showing the movement state of the cam follower in which the second and third group rotary zoom frames during zooming and focusing of the first lens barrel shown in FIG. 1 are seen from the outer circumferential side.
Figure 18:
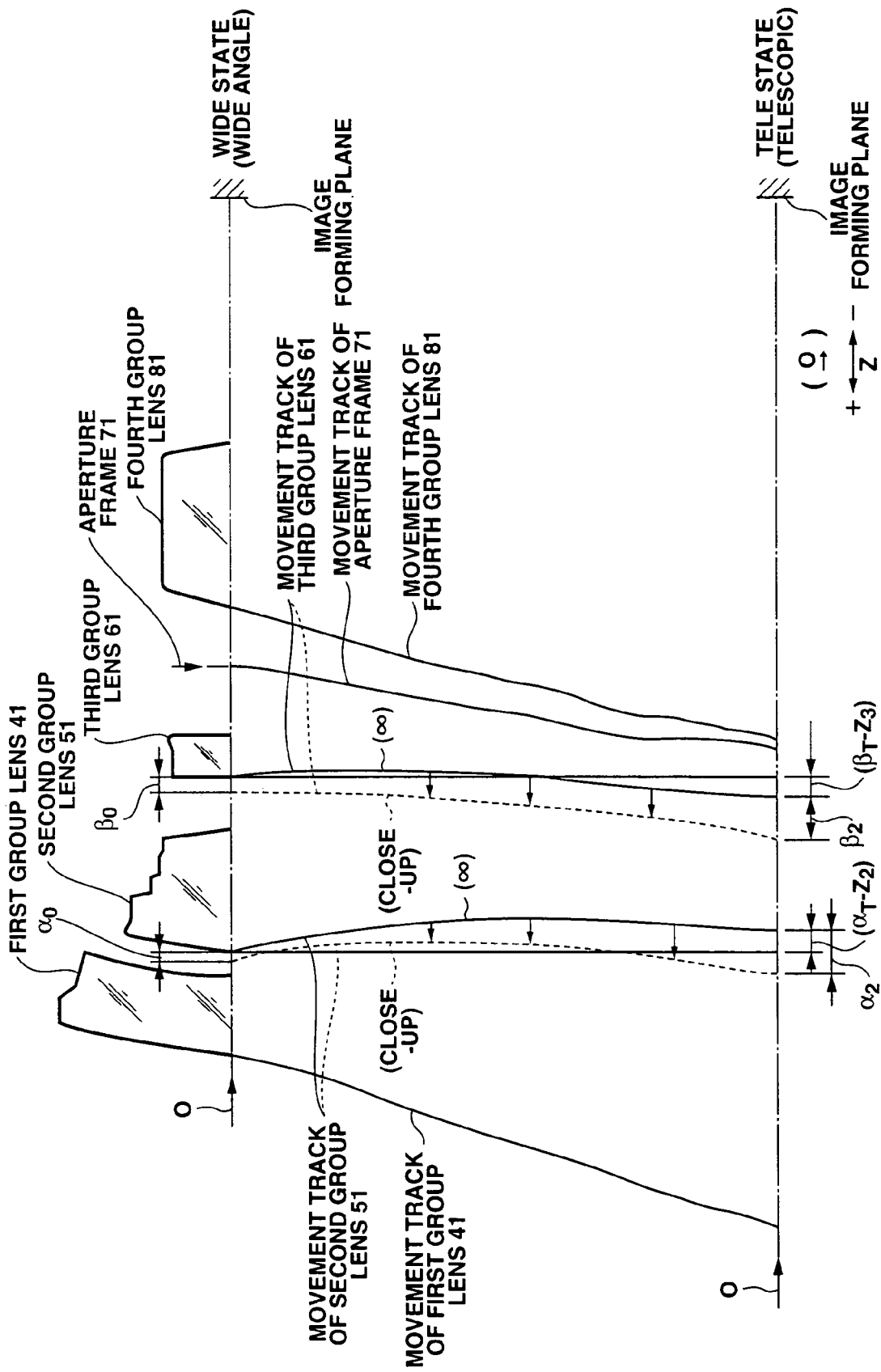
FIG. 18 is a diagram which shows the movement tracks of the respective lens groups and diaphragm frame in the first lens barrel shown in FIG. 1 during zooming and focusing.

FIG. 15 is an unfolded view of the cam ring, fixed ring, second and third group rotating zoom frames and cam followers in the wide state of the first lens barrel 10, as seen from the outer circumferential side. FIG. 16 is an unfolded view of the cam ring, fixed ring, rotating zoom frames and cam followers in the tele state of the lens barrel 10, as seen from the outer circumferential side. FIG. 17 is an unfolded view showing the movement states of the cam followers, with the second and third group rotating zoom frames during zooming and focusing of the lens barrel 10 being viewed from the outer circumferential side. FIG. 18 is a diagram which shows the movement tracks of the respective lens groups and diaphragm frame in the lens barrel 10 during zooming and focusing.

In the following description, the rotational angle of the cam ring 84 in the case of zooming from wide to standard (zoom) in the first lens barrel 10 is taken to be θS in the clockwise direction. The rotational angle of the cam ring 84 in the case of zooming wide to tele is taken to be θT in the clockwise direction. The rotational angle of the lens driving frame 87 in the case of focusing from infinity to close-up in the wide state is taken to be θ0 in the counterclockwise direction. The rotational angle of the lens driving frame 87 in the case of focusing from infinity to close-up in the standard state is taken to be θ1 in the counterclockwise direction. The rotational angle of the lens driving frame 87 in the case of focusing from infinity to close-up in the tele state is taken to be θ2 in the counterclockwise direction.

In the zooming operation of the first lens barrel 10 from wide to tele, as a result of the rotation of the cam ring 84 by a rotational angle θT in the clockwise direction, the first group frame member 43 supporting the first group lens 41 is fed out by a specified movement amount in the forward direction by the cam groove 84$e$ in a state in which rotation is restricted by the fixed ring cover 46 (FIGS. 15, 16, 18).

At the same time, in the abovementioned zooming operation from wide to tele, the diaphragm frame member 71 that contains the diaphragm vanes is fed out by a specified movement amount in the forward direction by the cam groove 84$k$ of the cam ring 84 in a state in which rotation is restricted by the guide rods 47 and 48 (FIGS. 15, 16, 18).

Similarly, in the abovementioned zooming operation from wide to tele, the fourth group frame member 77 supporting the fourth group lens 81 is similarly fed out by a specified movement amount in the forward direction by the cam groove 84$m$ of the cam ring 84 in a state in which rotation is restricted by the guide rods 47 and 48 (FIGS. 15, 16, 18).

Furthermore, there is no movement of the first group frame member 43, diaphragm frame member 71 or fourth group frame member 77 accompanying the rotation of the lens driving frame 87 during the focusing operation.

Meanwhile, the second group lens 51 and third group lens 61 advance and retract during both zooming and focusing.

The second group lens 51 is held by the second group lens holding frame 52, and the second group lens holding frame 52 is integrally supported by the second group rotating ring 54 in the direction of the optical axis O. Accordingly, the amount of movement of the second group lens 51 in the direction of the optical axis O (i. e., on the optical axis) is the same as the amount of movement of the cam follower 55 (fastened to the second group rotating ring 54) in the direction of the optical axis O (i.e., on the optical axis). Similarly, the amount of movement of the third group lens 61 in the direction of the optical axis O (i.e., on the optical axis) is the same as the amount of movement of the cam follower 65 (fastened to the third group rotating ring 64) in the direction of the optical axis O (i.e., on the optical axis).

Accordingly, in the following description, the amounts of movement of the second group lens 51 and third group lens 61 in the direction of the optical axis O (i.e., on the optical axis) are respectively described by the amounts of movement of the cam follower 55 and cam follower 65 in the direction of the optical axis O (i.e., on the optical axis). Furthermore, in the following description, an indication that the amounts of movement are amounts of movement in the direction of the optical axis (i.e., on the optical axis) is omitted.

In cases where focusing is performed from infinity to close-up in the wide state, the second group rotating ring 54 is rotationally driven by θ0 in the counterclockwise direction by the lens driving frame 87 in a state in which the second group rotating zoom frame 58 is stopped in the wide position (FIG. 15). As a result of the abovementioned rotation, the cam follower 55 moves along the cam groove 58*d* of the second group rotating zoom frame 58, and the amount of movement of the cam follower 55 from the wide infinitely distant focal position (hereafter indicated as the wide/∞ position) to the wide close-up focal position (hereafter indicated as the wide/close-up position) is taken as α0 (FIGS. 15, 18).

In cases where zooming is performed from wide to tele in a state in which the focusing position is fixed in the ∞ position, the second group rotating zoom frame 58 rotates by a rotational angle of θT in the clockwise direction together with cam ring 84; accordingly, this zoom frame 58 is fed out by a movement amount of −Z2 by the cam groove 83*d* of the fixed ring 83 (FIG. 16). In this case, the second group rotating ring 54 does not rotate, and the cam follower 55 is caused to move forward by a movement amount of αT by the cam groove 58*d* of the second group rotating zoom frame 58. As a result, the amount of movement of the cam follower 55 from the wide/∞ position to the tele/∞ position is an amount αT−Z2, obtained by adding the movement amount −Z2 to the movement amount αT (FIG. 18).

In cases where focusing is performed from the ∞ position to the close-up position in the tele state, the second group rotating zoom frame 58 is in the tele position, and the second group rotating ring 54 is rotationally driven by θ2 in the counterclockwise direction by the lens driving frame 87 (FIG. 16). As a result of the abovementioned rotation, the cam follower 55 moves along the cam groove 58*d* of the second group rotating zoom frame 58 by a movement amount of +α2 from the tele/∞ position to the tele/close-up position (FIGS. 15 and 18). Accordingly, the amount of movement of the cam follower 55 from the wide/∞ position to the tele/close-up position is (αT−Z2)+α2 (FIG. 18).

Next, the amount of movement of the third group lens 61 (cam follower of the third group rotating ring 64) will be described. In this case, as in the case of the above-mentioned second group lens 51, when focusing is performed from infinity to close-up in the wide state, the third group rotating zoom frame 68 stops in the wide position, and the third group rotating ring 64 is rotationally driven by a rotational angle of θ0 in the counterclockwise direction by the lens driving frame 87 (FIG. 15). As a result of the abovementioned rotation, the cam follower 65 moves along the cam groove 68*d* of the third group rotating zoom frame 68, and the amount of movement of the cam follower 65 from the wide/infinity (∞) position to the wide/close-up position is β0 (FIGS. 15 and 18).

In cases where zooming is performed from wide to tele in a state in which the focusing position is fixed in the ∞ position, the third group rotating zoom frame 68 rotates by a rotational angle of θT in the clockwise direction together with the cam ring 84 during zooming from wide to tele; accordingly, this frame is drawn in by a movement amount of −Z3 by the cam groove 83*e* of the fixed ring 83 (FIG. 16). In this case, the third group rotating ring 64 does not rotate; accordingly, the cam follower 65 is caused to move forward by a movement amount of βT by the cam groove 68*d* of the third group rotating zoom frame 68. As a result, the amount of movement of the cam follower 65 from the wide/∞ position to the tele/∞ position is βT−Z3 (FIG. 18).

When focusing is performed from the ∞ position to the close-up position in the tele state, the third group rotating zoom frame 68 is in the tele position, and the third group rotating ring 64 is rotationally driven by θ2 in the counterclockwise direction by the lens driving frame 87 (FIG. 16). As a result of the abovementioned rotation, the cam follower 65 moves by a movement amount of +β2 (with reference to the tele/∞ position) along the cam groove 68*d* of the third group rotating zoom frame 68 (FIGS. 15 and 18). Accordingly, the amount of movement of the cam follower 65 (and therefore the third group lens 61) from the wide/∞ position to the tele/close-up position is (βT−Z3)+β2 (FIG. 18).

Thus, the relative positions of the second and third group rotating zoom frames 58 and 68 and cam followers 55 and 65 in the direction of the optical axis O are determined by the positions of the cam followers 55 and 65 in the cam grooves 58*d* and 68*d* that are generated by the rotation of the second and third group rotating zoom frames 58 and 68 themselves due to zooming, and the rotation of the lens driving frame 87 due to focusing. In other words, the relative positions of the cam followers 55 and 65 on the cam lines of the cam grooves 58*d* and 68*d* are determined by the rotation of the second and third group rotating zoom frames 58 and 68 due to zooming, and the rotation of the lens driving frame 87 due to focusing.

Accordingly, the respective cam regions used for focusing and cam regions used for zooming are superimposed in the cam grooves 58*d* and 68*d* of the second and third group rotating zoom frames 58 and 68. Furthermore, the amounts of movement (amounts of movement on the optical axis, in the direction of the optical axis O) with respect to the fixed frame 11 due to zooming are amounts of movement that are obtained by adding the relative amounts of movement in the direction of the optical axis O generated by the action of the cam grooves 58*d* and 68*d* of the second and third group rotating zoom frames 58 and 68 that rotate with respect to the cam followers 55 and 65, and the amounts of movement of the second and third group rotating zoom frames 58 and 68 themselves in the direction of the optical axis O generated by the action of the direct-advance groove 84*d* of the cam ring 84 and the cam groove 83*d* of the fixed ring 83. The amounts of movement (amounts of movement on the optical axis, in the direction of the optical axis O) of the cam followers 55 and 65 with respect to the fixed frame 11 due to focusing are only the amounts of movement in the direction of the optical axis O that are generated by the movement of the cam followers 55 and 65 of the second group rotating ring 54 and third group rotating ring 64 that rotate with respect to the cam grooves 58*d* and 68*d* of the second and third group rotating zoom frames 58 and 68.

Here, the relative amounts of movement of the cam followers 55 and 65 of the second and third group rotating rings 54 and 64 caused by the cam grooves 58*d* and 68*d* of the second and third group rotating zoom frames 58 and 68 during zooming and focusing will be described with reference to the unfolded view of the rotating zoom frames shown in FIG. 17.

FIG. 17 summarizes the amounts of movement of the cam followers 55 and 65 caused by the cam grooves 58*d* and 68*d* during wide, standard (zoom) and tele zooming, or during focusing.

First, the amount of movement of the cam follower 55 in the direction of the optical axis O will be described. In a case where the second group rotating zoom frame 58 is rotated by a rotational angle of θS (here, θS<θ0) from wide to standard during zooming in the ∞ focusing state, the cam follower 55 moves from the position 55W1 to the position 55S1, and the amount of this movement is αS. Furthermore, in a case where this zoom frame is rotated by a rotational angle of θT (here, θT<(θS+θ1)) from wide to tele in the ∞ focusing state, the cam follower 55 moves from the position 55W1 to the position 55T1, and the amount of this movement is αT.

Furthermore, when the second group rotating ring 54 rotates by a rotational angle of θ0 (here, θ0<θT, θ0<(θS+θ1)) from the ∞ position to the close-up position during focusing in the wide state, the cam follower 55 moves from the position 55W1 to the position 55W2, and the amount of this movement is α0. When this rotating ring 54 rotates by a rotational angle of θ1 from the ∞ position to the close-up position in the standard state, the cam follower 55 moves from the position 55S1 to the position 55S2, and the amount of this movement is α1. When this rotating ring 54 rotates by a rotational angle of θ2 from the ∞ position to the close-up position in the tele state, the cam follower 55 moves from the position 55T1 to the position 55T2, and the amount of this movement is α2.

As a result, if the wide/∞ position 55W1 of the cam follower 55 is used as a reference, the amounts of movement of the cam follower 55 to the respective close-up positions in the wide state, standard state and tele state are respectively given as α0, αS+α1 and αT+α2. Furthermore, as was described above, if the amount of movement of the second group rotating zoom frame 58 during zooming, e.g., −Z2 (between wide and tele) is added to these amounts of movement of the cam follower 55, the actual amounts of movement of the cam follower 55, and therefore the amounts of movement of the second group lens 51 with respect to the fixed frame 11, can be obtained.

The amounts of movement of the cam follower 65 can be determined in FIG. 17 in the same manner as the amounts of movement of the cam follower 55. In a case where the third group rotating zoom frame 68 is rotated by a rotational angle of θS from wide to standard during zooming in the ∞ focusing state, the cam follower 65 moves from the position 65W1 to the position 65S1, and the amount of this movement is βS. When this zoom frame 68 is rotated by a rotational angle of θT from wide to tele, the cam follower 65 moves from the position 65W1 to the position 65T1, and the amount of this movement is βT.

Furthermore, when the third group rotating ring 64 is rotated by a rotational angle of θ0 from the ∞ position to the close-up position during focusing in the wide state, the cam follower 65 moves from the position 65W1 to the position 65W2, and the amount of this movement is β0. When this rotating ring is rotated by a rotational angle of θ1 from the ∞ position to the close-up position in the standard state, the cam follower 65 moves from the position 65S1 to the position 65S2, and the amount of this movement is β1. When this rotating ring is rotated by a rotational angle of θ2 from the ∞ position to the close-up position in the tele state, the cam follower 65 moves from the position 65T1 to the position 65T2, and the amount of this movement is β2.

As a result, if the wide/∞ position 65W1 of the cam follower 65 is used as a reference, the amounts of movement of the cam follower 65 to the respective close-up positions in the wide state, standard state and tele state are respectively given as β0, βS+β1 and βT+β2. Furthermore, as was described above, if the amount of movement of the third group rotating zoom frame 68 during zooming, e.g., −Z3 (between wide and tele) is added to these amounts of movement of the cam follower 65, the actual amounts of movement of the cam follower 65, and therefore the amounts of movement of the third group lens 61 with respect to the fixed frame 11, can be obtained.

Thus, in the first lens barrel 10, since the external mounting unit 1 is assembled by successively attaching the distance ring 14, intermediate frame 16, scale ring 21, zoom base 24, zoom ring 26 and back end cover 31, which are members that include members constituting parts of the external appearance of the external mounting unit 1 after the optical unit 2 in which the respective optical systems have been assembled is fastened to the fixed frame 11, the assembly characteristics are good, and the productivity is increased.

In the state of the assembled body in which the assembly of the optical unit 2 and the external mounting unit 1 prior to the attachment of the members from the back end cover 31 on has been completed, connector connections are made between the FPCs contained in the respective units and the lens barrel control FPC 102; then, the focusing lens driving unit 101 including the focusing motor is inserted from the rear of the fixed frame 11, and is fastened to the end surface of the fixed ring 83. Furthermore, the lens barrel control FPC 102 is attached to the back end part of the fixed frame 11. Thus, the focusing lens driving unit 101 and lens barrel control FPC 102 can be attached to or removed from the inside of the lens barrel 10 in an independent state from the optical unit 2 and external mounting unit 1.

Accordingly, since the control unit 3 on which electrical parts are mounted is not present during most of the assembly work of the abovementioned assembled body, complication of the assembly work can be avoided. Moreover, the abovementioned assembled body and control unit 3 (especially the focusing lens driving unit 101) can be easily separated, and the mount contact part which is a communications contact with the camera body can be removed from the assembled body together with the control unit 3, repair and replacement of electrical parts and the like can be simply performed.

Subsequently, the back end cover 31, spacing washer 35, sealing ring 6B, lens mount 36 and cover rear frame 37 are attached.

As was described above, O-rings 5A through 5F and sealing rings 6A and 6B and the like are clamped (while undergoing elastic compressive deformation) between the contact and sliding surfaces of the respective external appearance members of the first lens barrel 10, so that the waterproof properties of the lens barrel can function adequately.

Furthermore, in regard to pressure differences from atmospheric pressure that accompany changes in the volume inside the first lens barrel 10 caused by the zooming of the lens barrel, the generation of such pressure differences is prevented by allowing the entry and exit of air via ventilation hole groups 31*b* that are disposed in the back end cover 34 in the circumferential direction, and water-repellent sheets 33 that are disposed on the outside surfaces of these ventilation hole groups 31b. Moreover, invasion by water droplets is prevented by the water-repellent sheets 33.

As a result of the mounting of the cover rear frame 37 inside the lens mount 36, contact of the respective connection FPCs and the FPC and lead wires of the control unit 3 with the movable members (such as the fourth group lens holding frame 82 which is a driving member) can be securely prevented.

Furthermore, in the attached state of the cover rear frame 37, the dust-proof cover ring 38 is engaged with the outer circumference of the fourth group lens holding frame 82, and at the same time, the dust-proof member 82B disposed on the outer circumference of the back end of the fourth group lens holding frame 82 engages with the inner circumference of the tubular part of the cover rear frame 37; accordingly, invasion by dust from the side of the lens mount 36 in a state in which the camera body has not yet been mounted can be securely prevented.

Next, the second lens barrel constituting the lens barrel system of one embodiment of the present invention will be described with reference to FIGS. 19 through 24.

Figure 19:
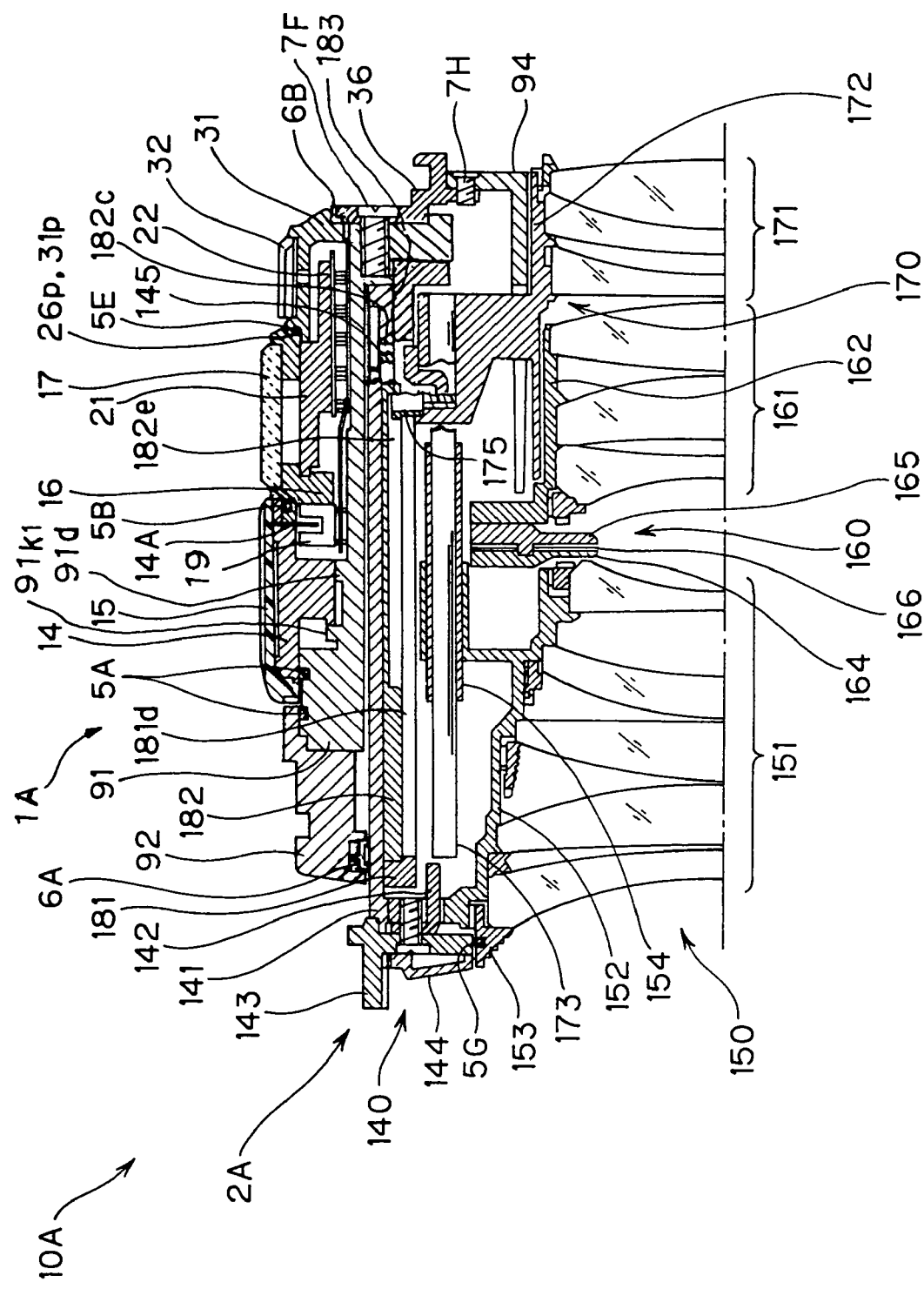
FIG. 19 is a sectional view (upper half) on the optical axis in the wide state of the second lens barrel constituting the lens barrel system of one embodiment of the present invention.
Figure 20:
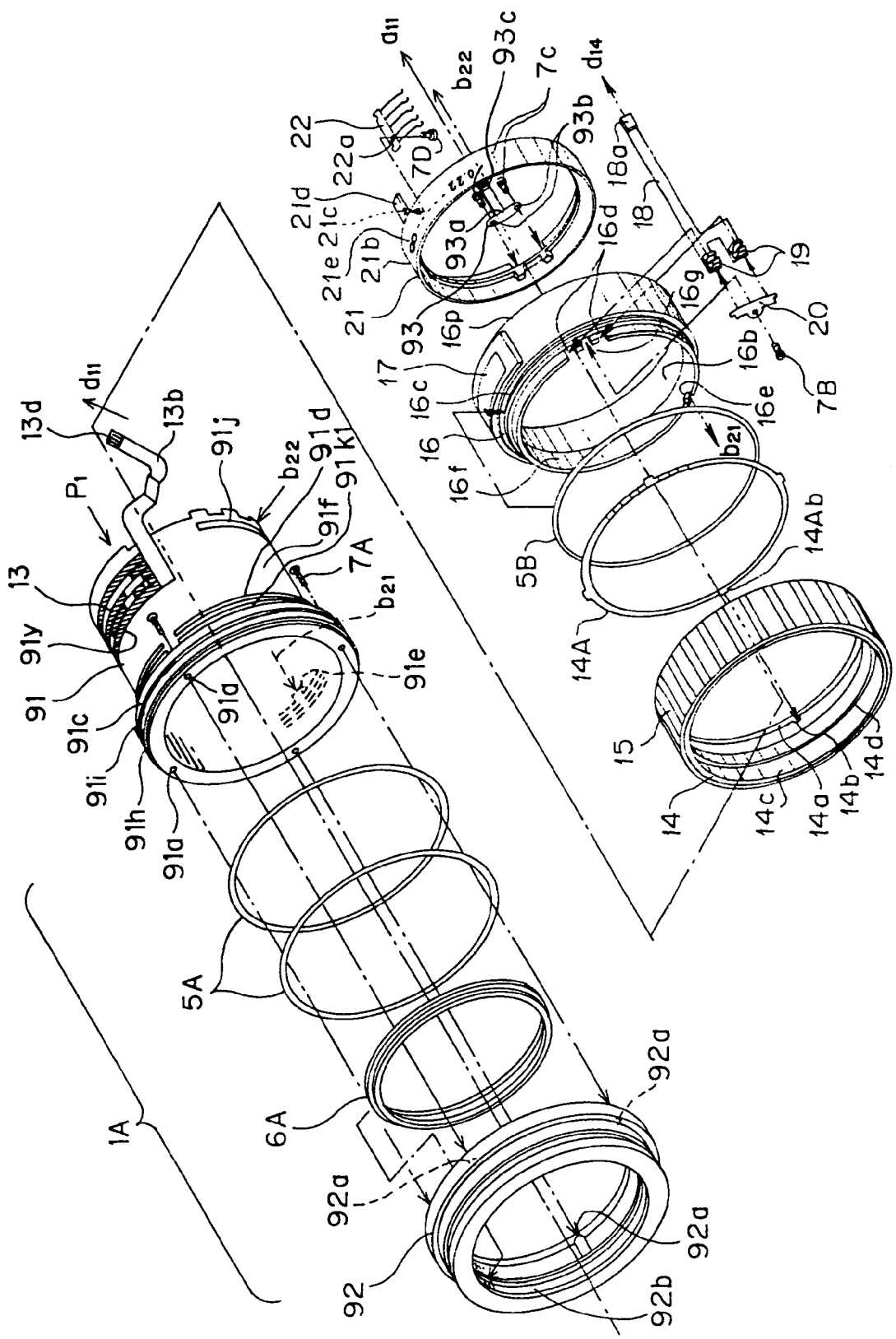
FIG. 20 is an exploded perspective view of one part of the external mounting unit constituting a part of the second lens barrel shown in FIG. 19.
Figure 21:
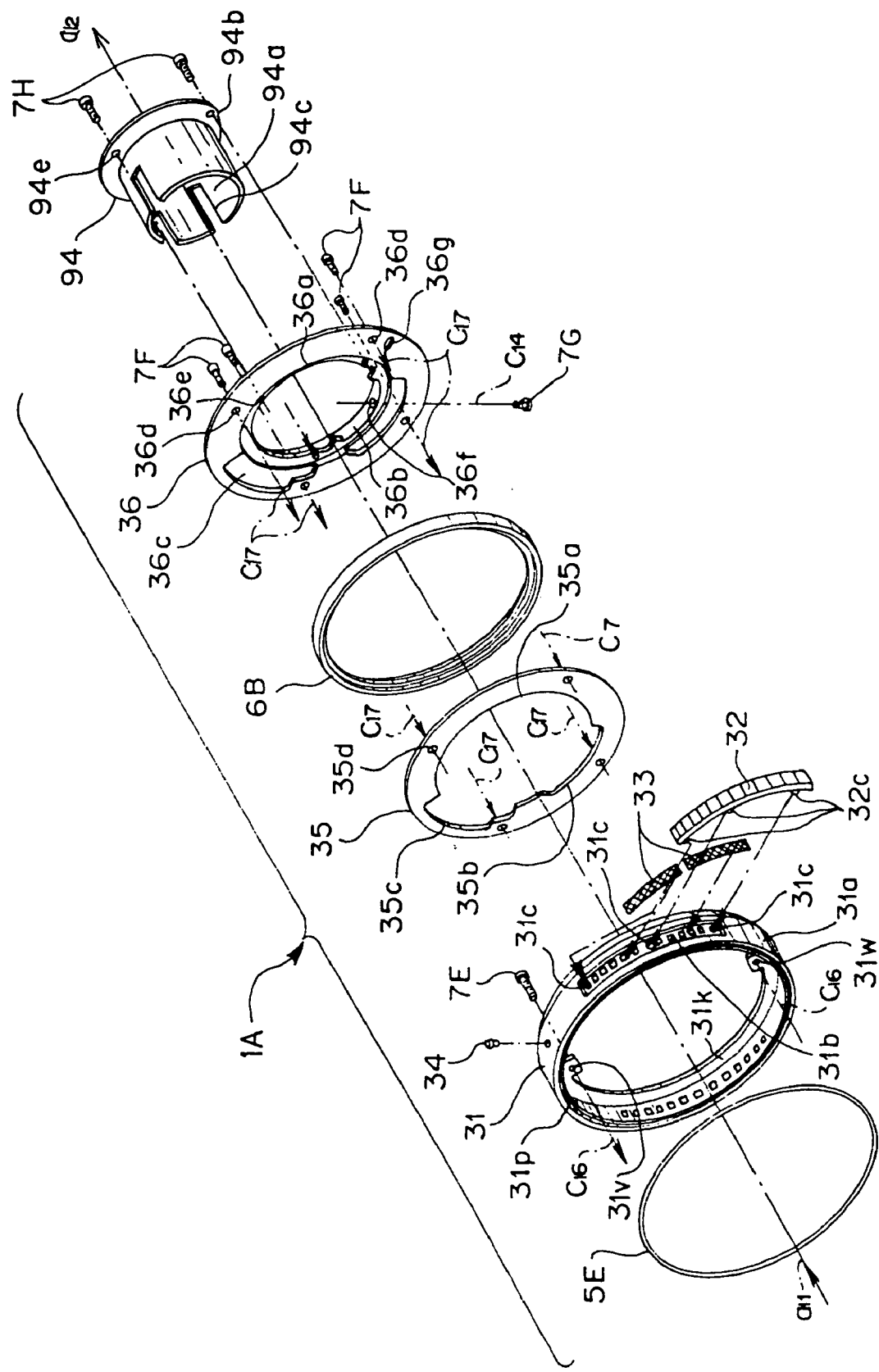
FIG. 21 is an exploded perspective view of another part of the external mounting unit that constitutes a part of the second lens barrel shown in FIG. 19.
Figure 22:
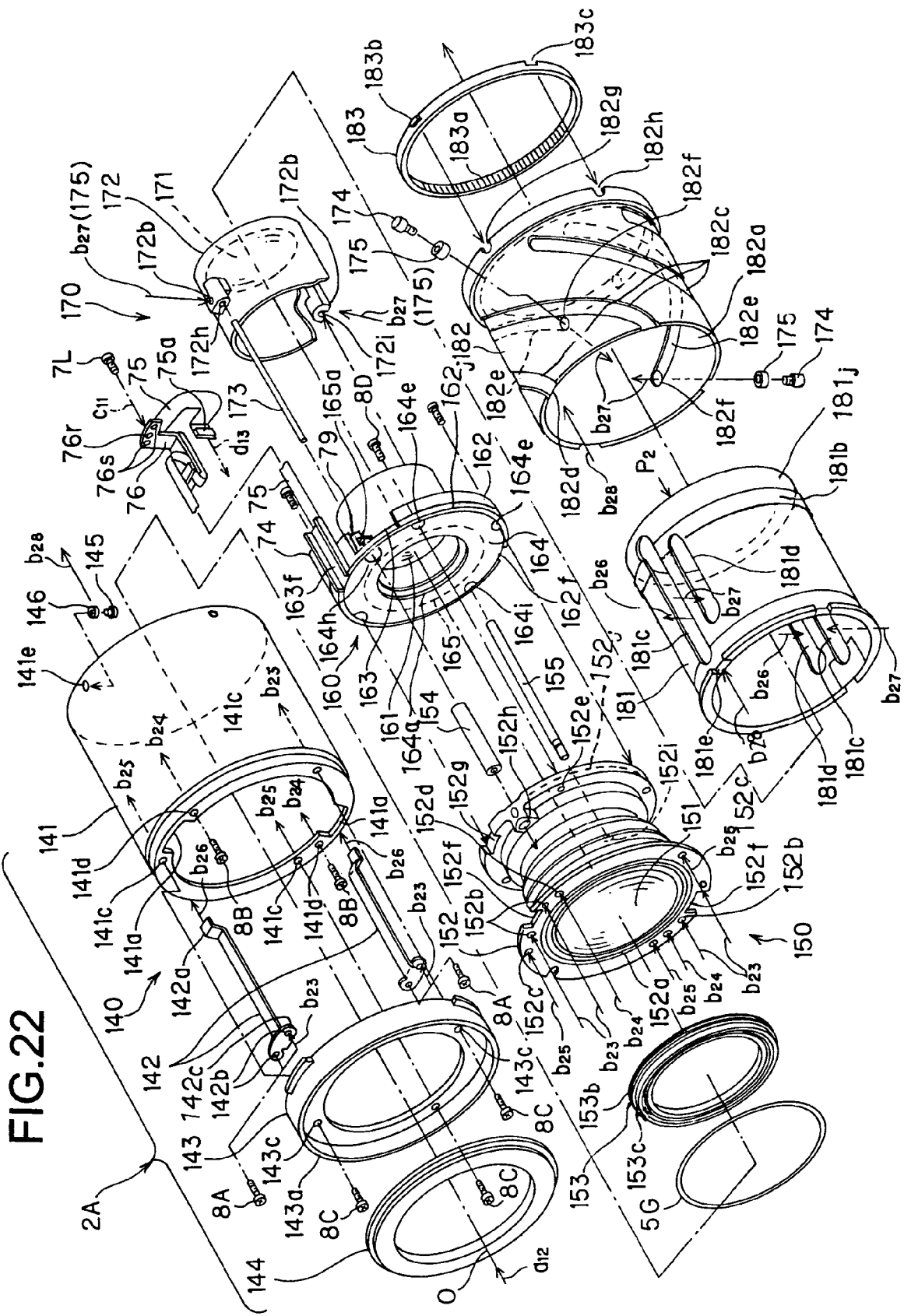
FIG. 22 is an exploded perspective view of the optical unit that constitutes a part of the second lens barrel shown in FIG. 19.
Figure 23:
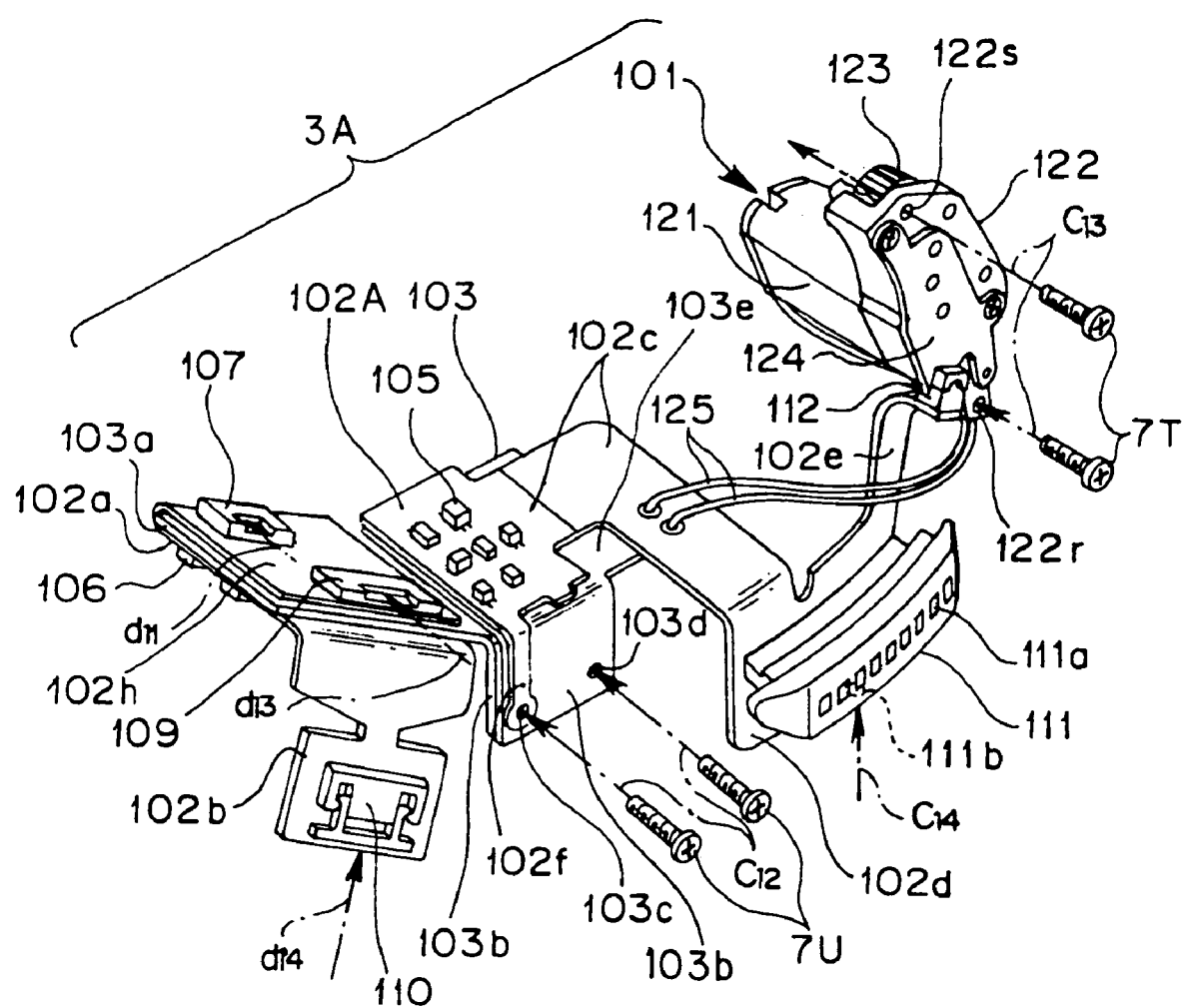
FIG. 23 is a perspective view of the control unit that constitutes a part of the second lens barrel shown in FIG. 19, as seen from the image forming side (rear side)
Figure 24:
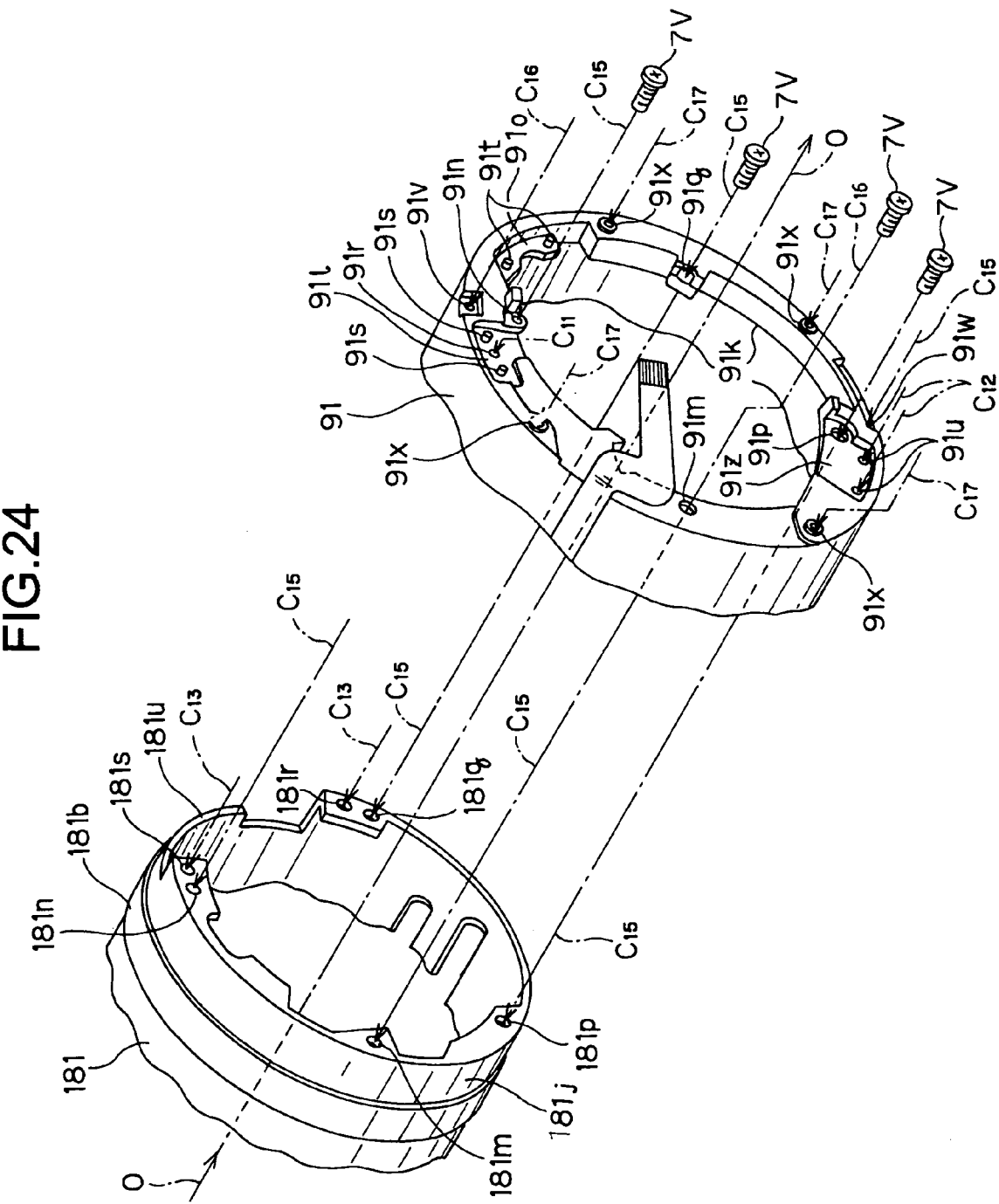
FIG. 24 is an exploded perspective view of the main frame and fixed ring that are to be fastened to each other in the second lens barrel shown in FIG. 19, as seen from the image forming side (rear side).

FIG. 19 is a sectional view (showing the upper half part) of the abovementioned lens barrel on the optical axis in the wide state. FIG. 20 is an exploded perspective view of one part of the external mounting unit constituting a part of the abovementioned second lens barrel. FIG. 21 is an exploded perspective view of another part of the external mounting unit that constitutes a part of the abovementioned lens barrel. FIG. 22 is an exploded perspective view of the optical unit that constitutes a part of the abovementioned lens barrel. FIG. 23 is a perspective view of the control unit that constitutes a part of the abovementioned lens barrel, as seen from the image forming side (rear side). FIG. 24 is an exploded perspective view of the back end parts of the fixed frame of the abovementioned external mounting unit and the fixed ring of the abovementioned optical unit, as seen from the image forming side (rear side).

As is shown in FIG. 19, the second lens barrel 10A is a fixed-focus lens barrel that can be detachably mounted on a monocular reflex camera body; this lens barrel comprises mainly an external mounting unit 1A that forms the outer part of this lens barrel, an optical unit 2A that is accommodated in inside the external mounting unit 1A, and that differs from the optical unit 2 containing the optical system of the main lens barrel, and a control unit 3A that is used to perform driving control of the lens barrel 10A. The second lens barrel 10A is an exchangeable lens barrel that can be attached to or detached from the camera boy; the optical system of this barrel comprises a first group lens 151, a second group lens 161, a third group lens 171 and diaphragm vanes 166 in that order from the object side (front side); these lens groups advance and retract in the direction of the optical axis during focusing.

As is shown in FIGS. 19, 21 and the like, the external mounting unit 1A mounts a front cover 92 on the front surface part, and has a fixed frame 91 which has the same diameter as the fixed frame 11 of the first lens barrel 10, and which is used as a second frame member that contains the optical unit 2A, a distance ring 14 which is a first frame member that has a rubber ring 15 mounted on the outer circumference, and that is rotated during adjustment of the focus, and which rotatably engages with the fixed frame 91, an intermediate frame 16 which is an outer circumferential cover (display ring holding ring) used as a second frame member that is engaged and fastened to (and supported by) the fixed frame 91, that restricts the movement of the distance ring 14 in the direction of the optical axis O, and that rotatably supports the scale ring 21, a scale ring 21 which is a distance scale display ring having a window part that is used to display the object focal position (distance) on the object field side corresponding to the focal position of the taking lens system, this ring being held between the outer circumference of the fixed frame 91 and the inner circumference of the intermediate frame 16 so that this ring is free to rotate, a back end cover 31 used as a back end part outer covering part that is fastened to and supported by the outer circumference on the back surface side of one end of the fixed frame 91, and that is disposed on the back end part in order to prevent movement of the distance ring 14, intermediate frame 16 and the like in the direction of the optical axis O, a lens mount 36 which is fastened to the back surface part of the fixed frame 91, and a cover rear frame 94 which is inserted and fastened to the inner circumference of the lens mount 36.

Here, the scale that is printed on the outer circumference of the scale ring 21 used in the second lens barrel 10A inevitably differs in terms of position and the like from the scale used in the first lens barrel 10. The reason for this is that the rotational range of the scale ring is different due to the design of the cam ring and the like. Furthermore, exactly the same scale may be applied and used if this is permitted by the design.

Furthermore, among the abovementioned respective constituent members, the distance ring 14 and rubber ring 15, the intermediate frame 16, the back end cover 31 and the lens mount 36 are respectively members that constitute a part of the external appearance of the second lens barrel 10A; these members are members that are used in common with the first lens barrel 10.

As is shown in FIGS. 19 and 22, the optical unit 2A has a moving frame unit 140 that can advance and retract in the direction of the optical axis O, a first group frame unit 150 that is fastened to the moving frame unit 140, and that holds a first group lens 151, a second group frame unit 160 that is fastened to and supported by the first group frame unit 150, and that holds a second group lens 161 and diaphragm vanes 166, a third group frame unit 170 that can move in relative terms with respect to the moving frame unit 140, and that holds a third group lens 171, a fixed ring 181 used as an optical unit side fixed frame that is fastened to and supported by the fixed frame 91, a cam ring 182 that is rotatably supported on the fixed ring 181, and a lens driving frame 183 that is rotatably supported on the back end part of the fixed ring 181.

As is shown in FIG. 23, the control unit 3A comprises a focusing motor, a motor PI (photo-interrupter), a focusing lens driving unit 101 that has a speed reduction gear train and the like, and a lens barrel control FPC (lens barrel side control board) 102A on which respective control FPC (flexible printed circuit film) connectors, control ICs, mount contacts and the like are mounted. This control unit 3A has substantially the same construction as the control unit 3 used in the first lens barrel 10. However, a connector for zoom encoder FPC connection is not provided.

Next, further details, assembly procedures and the like for the respective constituent members of the above-mentioned second lens barrel 10A will be described.

In the second lens barrel 10A, the optical unit 2A is first assembled as a unit, and this optical unit 2A is installed in the fixed frame 91 of the external mounting unit 1A (as will be described later). Then, the respective constituent members of the external mounting unit 1A are successively engaged with the outer circumferential part of the fixed frame 91, and are thus assembled. Subsequently, the control unit 3A is installed from the rear of the fixed frame 91, and the lens mount is mounted, thus completing the assembly of the lens barrel 10A. However, the order of this assembly is not necessarily limited to the order described below.

First, the respective constituent members of the optical unit 2A will be described.

As is shown in FIG. 22, the moving frame unit 140 has a moving frame 141, two direct-advance keys 142, a filter ring 143, and an ornamental ring 144.

The moving frame 141 is a cylindrical frame member which has an inside flange part on the front surface side; this moving frame 141 is inserted into the inner circumference of the fixed frame 91 of the external mounting unit 1A so that this frame can advance and retract. On the inner circumferential part of the back end of this moving frame 141, four cam followers 146 are supported by pins 145 that are crimped in pin holes 141*e*.

The direct-advance keys 142 are metal plate members that extend in the direction of the optical axis O; these keys are provided with tip end guide parts 142*a* that are bent in step form in the radial direction on the back end part, and attachment seating parts 142*c* that are formed by being bent upward on the front part, and that have screw passage holes 142*b*.

The filter ring 143 is a ring member that has a central opening part; this member is provided with a filter screw (female screw) 143*a* on the front part.

The ornamental ring 144 is a ring member that has a central opening part; a screw part that engages with the filter screw 143*a* is formed on the outer circumference of this member.

The first group frame 152 of the first group frame unit 150 (described later) is fastened to the front end part of the inner circumference of the moving frame 141. Specifically, two screws 8B that are passed through the screw passage holes 141*d* of the moving frame are screwed into screw holes 152*d* formed in the front surface flange part of the first group frame 152, so that the first group frame 152 is fastened to the moving frame 141.

Furthermore, the two direct-advance keys 142 pass through attachment seating parts 142*c* in the front end cut-out 141*a* of the moving frame 141, and screws 8A that are passed through the screw passage holes 142*b* are screwed into the screw holes 152*b* of the first group frame 152, so that these parts are fastened to the first group frame 152. In this attachment state, the direct-advance keys 142 are maintained parallel to the optical axis O. Furthermore, the direct-advance keys 142 may also be inserted and fastened to the moving frame 141 from the front end cut-out 141*a* in a case where the first group frame 152 is fastened to the moving frame 141, and the fixed ring 181 is inserted into the interior of the moving frame 141.

The filter ring 143 is attached to the front surface of the moving frame 141 by passing screws 8C through the screw passage holes 143*c* and 141*c* and screwing these screws into the screw holes 152*c* of the first group frame 152 after the direct-advance keys 142 are attached. Furthermore, the ornamental ring 144 is fastened by screw engagement with the filter screw 143*a* of the filter ring 143.

The first group frame unit 150 comprises a first group lens 151, a first group frame 152 that holds the first group lens 151, a lens retaining ring 153, a sleeve 154, and a guide rod 155 which is a rectilinear shaft member.

The first group frame unit 152 has a lens holding opening part in the central part, and flange parts that are respectively disposed on the front and back end surface parts. Recesses 152*f* constituting direct-advance key relief parts that are disposed in positions above and below, and a plurality of screw holes, are formed in the front end flange part. A recess 152*g* positioned in the direction of the optical axis O of the recess 152*f*, a sleeve supporting hole 152*h* that supports the sleeve 154 above, a guide rod supporting hole 152*i* that supports the guide rod 155 below, and a plurality of screw holes, are formed in the back end flange part. Furthermore, a screw part 152*a* used for lens retaining screw engagement is disposed on the front part of the opening part, and the screw part 153*b* of the lens retaining ring 153 is screw-engaged with this screw part 152*a*, so that the first group lens 151 is fastened in place.

The second group frame unit 160 comprises a second group frame 162 that holds the second group lens 161, a diaphragm frame member 163, a diaphragm front plate 164, a diaphragm driving plate 165, diaphragm vanes 166 (see FIG. 19), a diaphragm driving motor 74 which is a stepping motor, a diaphragm opening reset position detection diaphragm PI 79, a diaphragm FPC 75 that is connected to the diaphragm driving motor 74 and diaphragm PI 79, and an L-shaped FPC supporting plate 76 that is used to support the diaphragm FPC 75.

The second group frame 162 has an engaging outer circumferential part 162*j* that engages precisely with the engaging inner circumferential part 152*j* of the first group frame 152. Furthermore, a direct-advance key passage recess 162*f*, a sleeve passage hole and a guide rod passage hole are also provided.

The diaphragm frame member 163 holds the diaphragm driving motor 74 and diaphragm PI 79, and supports the diaphragm driving plate 165 so that this plate is free to rotate. Furthermore, a recess 163*f* (through which the direct-advance keys are passed) that protrudes rearward is disposed in the upper part of the diaphragm frame member 163, and a diaphragm FPC 75 of a different size than the diaphragm FPC 75 used in the first lens barrel 10 is supported along the lower part of this recess 163*f*.

The diaphragm front plate 164 comprises a diaphragm opening 164*a*, screw passage holes 164*e* that pass through the second group frame 162, a sleeve passage hole 164*h*, a guide rod passage hole 164*i* and the like.

The diaphragm driving plate 165 is a circular disk-form member; a gear part is formed on the outer circumference of this member, and the member is supported on the diaphragm frame member 163 so that this member is free to rotate. During diaphragm adjustment, this diaphragm driving plate 165 is rotationally driven by the pinion (not shown in the figures) of the diaphragm driving motor 74 via the above-mentioned gear part. As a result of the rotation of the diaphragm driving plate 165, the diaphragm vanes 166 are rotationally driven, so that the diaphragm is set.

The second group frame 162, diaphragm frame-member 163 and diaphragm front plate 164 of the second group frame unit 160 are connected to the side of the first group frame unit 150 as a result of screws 8D that are passed through the screw passage holes 164*e* being screwed into the screw holes 152*e* of the rear side flange part. In this engagement, the front end engaging outer circumferential part 162*j* of the second group frame 162 and the back end engaging inner circumferential part 152*j* of the first group frame 152 are precisely engaged. Accordingly, the first group lens 151 and second group lens 161 are held in a state in which the optical axes of these lenses coincide.

The third group frame unit 170 comprises a third group frame 172, a third group lens 171, and a guide rod 173 which is a straight shaft member.

The third group frame 172 is a tubular member; the third group lens 171 is fastened to the central opening part of this member. Furthermore, this member has projecting parts above and below on the outer circumferential part. A guide rod supporting hole 172h and a step-equipped screw engagement screw hole 172b are disposed in the upper projecting part; furthermore, a cut-out 172i into which the guide rod is inserted, and a screw hole 172b, are disposed in the lower projecting part. Step-equipped screws 174 that respectively support the cam follower 175 are screwed into the upper and lower screw holes 172b.

The sleeve 154 and guide rod 155 are inserted into the first group frame 152 in a loose state; furthermore, the guide rod 153 is inserted into the guide rod supporting hole 172h of the third group frame 172 in a loose state, and these rods are fastened by bonding in a state in which the optical axis positions are adjusted so as to be parallel with the optical axis of the third group lens 171.

Furthermore, after being inserted in a loose state into the guide rod supporting hole 152i of the first group frame 152, the guide rod 155 is fastened by bonding in a state in which the rod is adjusted so as to be parallel to the optical axis of the first group lens 151.

Specifically, in a state in which the first group frame unit 150 and second group frame unit 160 are coupled, the sleeve 154 is inserted in a loose state into the sleeve supporting hole 152h of the first group frame 152. The guide rod 173 is inserted into the sleeve 154. Furthermore, the guide rod 155 is inserted and held in the cut-out of the third group frame 172.

Then, in order to hold the guide rods 155 and 173 so that the third group frame 172 moves in parallel along the optical axis O of the first group lens 151 and second group lens 161, the sleeve supporting hole 152h of the first group frame 152 is coated with a bonding agent, and the sleeve 154 is fastened to the first group frame 152.

The first and second group frame units 150 and 160 and third group frame unit 170 that are connected and held by the guide rods 155 and 173 are installed inside the moving frame 141 of the moving frame unit 140. Specifically, the front end flange part side of the first group frame 152 is inserted from the rear of the moving frame 141, and the screws 8B that are passed through the screw passage holes 141d of the moving frame 141 are screwed into the screw parts 152d of the front end flange part 152 so that the first and second frame units 150 and 160 are fastened to the moving frame 141. The third group frame unit is supported via the guide rods 155 and 173 so that this third group frame unit can advance and retract in the direction of the optical axis O in a state in which rotation is restricted. Furthermore, the direct-advance keys 142 are held in a state in which these keys are passed through the recesses 152f and 163f of the first and second group frames.

Next, the O-ring 5G is mounted in the O-ring groove 153c of the lens retaining ring 153 attached to the front end of the first group frame 152, and the filter ring 143 is engaged with the lens retaining ring 153 so that this O-ring 5G is pushed inward in the radial direction. Then, the screws 8C that are passed through the screw passage holes 143c of the filter ring 143 and the screw passage holes 141c of the moving frame 141 are screwed into the screw holes 152c of the front end flange part of the first group frame 152, so that the filter ring 143 is fastened to the front surface of the moving frame 141. Furthermore, the ornamental ring 144 is fastened by being screw-engaged with the filter screw 143a on the front surface of the filter ring 143.

The fixed ring 181 is a tubular member, and comprises two direct-advance grooves 181c and 181d that run along the direction of the optical axis O, and cut-outs 181e used for the insertion of four cam followers 146 in the front step part. Furthermore, fastening screw holes used for fastening to the fixed frame 91 and screw holes used for the fastening of the focusing lens driving unit 101 are formed in the back end part as shown in FIG. 24.

The fixed ring 181 is inserted from the rear and installed in the moving frame 141 in which the first, second and third group frame units 150, 160 and 170 have been installed. In this insertion, the cam followers 146 are passed through the cut-out 181e; furthermore, after the direct-advance keys 142 are temporarily elastically deformed toward the optical axis, the tip end guide parts 142a are engaged in a state with no looseness in the radial direction in the direct-advance grooves 181c of the fixed ring 181.

The cam ring 182 is a cylindrical member, and has an inner circumferential part 182a that can be rotatably engaged with the outer circumferential part 181b of the fixed ring 181; furthermore, four cam grooves 182c that run obliquely in the direction of the optical axis O are formed in the outer circumferential part, and two cam grooves 182e that run obliquely in the direction of the optical axis O are formed in the inner circumferential part 182a. Cam follower insertion through-holes 182f are formed in the tip end parts of the cam grooves 182e, and recesses 182g and 182h are formed in the step part of the back end part.

The lens driving frame 183 is a ring-form member; an inside-tooth gear 183a is disposed on a portion of the inner circumferential part, and cam ring linking projecting parts 183b and engaging recesses 183c used to drive the scale ring are formed in the outer circumferential part. The lens driving frame 183 is inserted into the inner circumference of the back end part of the cam ring 182 so that this frame is free to rotate, and the projecting part 183b is engaged with the recess 182g of the cam ring 182. Accordingly, the cam ring 182 is rotationally driven as a unit with the lens driving frame 183.

The cam ring 182 and lens driving frame 183 are inserted into the inner circumferential part of the moving frame 141 from the rear. In this insertion, the cam ring 182 is engaged with the outer cc part 181b of the fixed ring 181 and inserted into the moving frame 141 while the cam followers 146 are engaged with the cam grooves 182c from the cam groove insertion openings 182d of the cam ring 182.

During the insertion of the abovementioned cam ring 182, screw holes 172b used for step screw engagement of the third group frame are aligned (in two places) with the positions of the cam follower insertion through-holes 182f of the cam ring 182, and fastening is accomplished by passing step-equipped pins 174 (that are passed through the cam followers 175) through the through-holes 182f and the direct-advance grooves 181d of the fixed ring 181, and screwing these pins into the screw holes 172b. Furthermore, the direct-advance grooves 181d are passage grooves that have a spacing corresponding to the cam followers 175.

When the cam ring 182 is thus inserted into the moving frame 141, the assembly of the optical unit 2A is completed. The diaphragm FPC 75 held on the FPC supporting plate 76 is exposed at the rear of the fixed ring 181 of the optical unit 2A in the abovementioned assembled state.

Next, details and assembly procedures of the constituent members of the external mounting unit 1A of the second lens barrel 10A will be described.

Furthermore, among the constituent members of the external mounting unit 1A, the distance ring 14 and rubber ring 15, the intermediate frame 16, the back end cover 31 and the lens mount 36 are common members that have the same shape as the members used in the external mounting unit 1. Accordingly, such common members will be described using the same symbols, and members other than these common members will be described in special detail below.

The fixed frame 91 is a cylindrical member whose axial center runs along the direction of the optical axis O, and which contains the optical unit 2A. This fixed frame 91 has the same external diameter as the fixed frame 11, but has a shorter length. Furthermore, a flange-form front cover attachment part is formed on the front end part of the cylinder, and a screw part or the like for attaching the fixed ring, control unit, lens mount and the like is disposed on the back end surface part of the cylinder (FIG. 24). Furthermore, a connecting arm relief hole 91j that passes through in the radial direction, an FPC mounting recess 91y formed as a slight recess along the circumferential direction, and a projecting part 91e that projects rearward on the outer circumference of the cylindrical part in the front, are disposed in the cylindrical part of the fixed frame 91.

In the fixing frame 91, in a state in which O-rings 5A are inserted into the ring grooves 91i and 91h in the outer circumferential part 91c of the front end flange part, a ring-form front cover 92 in a state in which a sealing ring 6A is inserted into the inner circumferential part 92b is engaged with outer circumferential part 91c of the front end flange part. Screws 7A that are passed through the screw passage holes 91a of the fixed frame 91 are screwed into the screw holes 92a of the front cover 92, so that the front cover 92 is fastened to the front surface part of the fixed frame 91.

A distance encoder FPC 13 is bonded to the FPC mounting recess 91y of the outer circumferential part of the cylinder of the fixed frame 91. This distance encoder FPC 13 has a distance encoder pattern, and has an FPC extension part 13b that extends rearward along the optical axis O. A connector terminal 13d used for connection with the lens barrel control FPC 102A is disposed on the tip end of this extension part.

However, this distance encoder FPC 13 differs from that used in the first lens barrel 10. The reason for this is that the lens characteristics of the first lens barrel 10 and second lens barrel 10A are different, and the sizes of the lens barrels also differ from each other, so that the sizes of the FPCs 13 are inevitably different. Of course, if permitted by the design, the encoder patterns may also be the same.

The optical unit 2A in which the moving frame unit 140, fixed ring 181, cam ring 182, lens driving frame 183 and the like shown in FIG. 11 above have been installed is inserted from the front side into the inner circumferential part of the fixed frame 91, and screws 7V that have been passed through the screw passage holes 91n, 91p and 91q of the fixed frame 91 are screwed into the 181n, 181p and 181q of the fixed ring 181, so that the fixed ring 181 is fastened to the back end part of the fixed frame 91 (FIG. 24).

As a result of the fastening of the fixed ring 181 to the fixed frame 91, the cam ring 182 is clamped between the front end flange part of the fixed ring 181 and the inner circumferential end surface 91k of the rear part of the fixed frame 91 so that movement in the direction of the optical axis O is restricted. At the same time, the lens driving frame 183 is also engaged with the rear outer circumference 181j of the fixed ring 181, so that movement in the direction of the optical axis O is restricted by the rear part inner circumferential end surface 91k of the fixed frame 91 and the back end inner circumferential step part of the cam ring 182. Furthermore, the cam ring 182 is supported so that this ring is free to rotate together with the lens driving frame 183 in a state in which the cam ring 182 is engaged with the outer circumference 181b of the fixed ring 181.

After the fixed ring 181 is fastened to the fixed frame 91, the FPC supporting plate 76 (FIG. 22) that supports the diaphragm FPC 75 exposed at the rear of the fixed ring 181 is attached to the back end part of the fixed frame 91. Specifically, positioning is accomplished by fitting the positioning holes 76s of the FPC supporting plate 76 over positioning pins 91s disposed in the recess 91l of the back end part of the fixed frame 91, and screws 7L that are passed through the screw passage holes 76r are screwed into the screw holes 91r of the fixed frame 91, so that the FPC supporting plate 76 is fastened to the back end part of the fixed frame 91 (FIGS. 22 and 24).

Next, the distance ring 14, intermediate frame 16, scale ring 21 and back end cover 31 which are common members with the abovementioned first lens barrel 10 are engaged with and installed on the outer circumference of the fixed frame 91 in that order from the rear. However, the connecting arm 93 that is fastened to the scale ring 21 has a shorter length than the connecting arm 23 that is fastened to the scale ring 21 used in the first lens barrel 10.

The connecting arm 93 is a straight metal plate member that extends rearward parallel to the optical axis O; an engaging part 93c that is formed by bending is disposed on the inner circumferential side of the tip end part of this connecting arm 93.

In the installation of the distance ring 14, intermediate frame 16 and scale ring 21 on the fixed frame 91, as in the case of the first lens barrel 10, the distance ring 14 and intermediate frame 16 are fit over the front part of the outer circumference from the rear side of the fixed frame 91. Furthermore, the scale ring 21 is inserted into the inner circumference of the intermediate frame 16 from the rear. In this case, the engaging part 93c of the connecting arm 93 is passed through the connecting arm relief hole 91j of the fixed frame 91, and is engaged with the engaging recess 183c of the lens driving frame 183 that was installed in the fixed frame 91 beforehand (FIG. 22).

In a state in which the distance ring 14, intermediate frame 16 and scale ring 21 are installed in the fixed frame 91, the front end surface of the intermediate frame 16 contacts the side surface (in the direction of the optical axis O) of the rib-form projecting part 91d (oriented in the circumferential direction) that is disposed on the outer circumferential surface 91f of the fixed frame 91; furthermore, this member is supported by the engagement of the rotation-stopping recess 16e with the projecting part 91e of the fixed frame 91, so that rotation with respect to the fixed frame 91 is restricted. Furthermore, the intermediate frame 16 is positioned in the direction of the optical axis O so that distance ring 14 can rotate on the fixed frame 91. The distance ring 14 is supported by engagement in the radial direction with the outer circumference 91c of the flange part and the projecting part (outer circumference) 91d of the fixed frame 91 in a state in which the O-ring 5A is interposed; furthermore, this distance ring 14 makes sliding contact with the side surface (in the direction of the optical axis O) of the circumferential rib-form projecting part 91k1 disposed on the outer circumference 91f of the fixed frame 91, and is thus supported so that manual rotational operation together with the slit disk 14A is possible in a state in which movement in the forward direction is restricted. The scale ring 21 is engaged with the inner circumferential part of the intermediate frame 16 and rotatably supported by the lens driving frame 183 in a state where its movement in the forward direction is restricted.

The engaging contact part 16p on the back end of the intermediate frame 16 engages in the radial direction with the engaging contact part 31p on the front end of the back end cover 31, and also contacts this part in the axial direction, so that movement of the intermediate frame 16 and distance ring 14 in the rearward direction and radial direction is restricted. Movement of the scale ring 21 in the rearward direction is also restricted by the engaging contact part 31p of the back end cover 31. Furthermore, the O-ring 5E is inserted into the circumferential groove of the engaging contact part 31p of the back end cover 31, and is pressed and held by the back end surface of the engaging contact part 16p of the intermediate frame 16.

When the distance ring 14 is rotated, the slit disk 14A that rotates as an integral unit with the distance ring 14 moves in relative terms through the distance PI 19 that is fastened to the intermediate frame 16; accordingly, the output of the distance PI 19 caused by the operation of the distance ring is transmitted to the side of the distance PI FPC 18 used for the second lens barrel 10A, which differs in size from the distance PI FPC used in the first lens barrel 10. Furthermore, the distance contact part 22 mounted on the scale ring 21 slides over the encoder pattern of the distance encoder FPC 13 on the outer circumference of the fixed frame 91; accordingly, the rotational position output of the scale ring 21 is transmitted to the side of the distance encoder FPC 13. Moreover, in the abovementioned assembled state, the portion of the distance encoder FPC 13 on the side of the connector terminal 13d and the portion of the distance PI FPC 18 on the side of the connector terminal 18a, are both extended to the rear of the fixed frame 91.

The back end cover 31 is installed on the outer circumference of the fixed frame 91 in which the distance ring 14, intermediate frame 16 and scale ring 21 have been installed; however, prior to the installation of this back end cover 31, the control unit 3A is installed on the back end part of the fixed frame 91.

Here, the detailed construction of the control unit 3A comprising the focusing lens driving unit 101 and the lens barrel control FPC 102A will be described with reference to the perspective view of the control unit 3A shown in FIG. 23.

The focusing lens driving unit 101 used in the second lens barrel 10A has the same construction as the one used in the first lens barrel 10 (see FIG. 8).

The FPC connecting connector 108 and the like used for the zoom encoder in the lens barrel control FPC 102 used in the first lens barrel 10 (see FIG. 8) is not mounted in the lens barrel control FPC 102A; however, the remaining construction is the same. Specifically, the lens barrel control FPC 102A is mounted on the FPC supporting plate 103, and mounts a distance encoder FPC connector 107, a diaphragm FPC connector 109, a distance PI connector 110, a mount contact member 111 and the like.

After the fixed ring 181 and fixed frame 91 are coupled, but prior to the attachment of the back end cover 31, and also prior to the connection of the abovementioned respective FPC connectors, the focusing motor 121 of the focusing lens driving unit 101 is inserted into the interior of the fixed ring 181 from the rear of the fixed frame 91, and the speed reduction gear box 122 is positioned in the gear box positioning recess 91o formed in the back surface of the fixed frame 91 by a pair of positioning pins 91t that are disposed on the flat surface of this recess, while the output gear 123 of the speed reduction gear train is caused to engage with the inside-tooth gear part 183a of the lens driving frame 183. Then, the two screws 7T are passed through the screw passage holes 122s and 122r of the speed reduction gear box 122, and are screwed into the screw holes 181s and 181r of the fixed ring 181, so that the speed reduction gear box 122 and focusing motor 121 are fastened to the back end part of the fixed ring 181 (FIGS. 23 and 24).

Furthermore, the FPC supporting plate 103 with which the lens barrel control FPC 102A is integrated is inserted into the fixed frame 91 from the rear of the frame, and the attachment part 103b of the FPC supporting plate 103 is mounted in the supporting plate attachment recess 91z in the back end part of the fixed frame 91. Screws 7U are passed through the screw passage holes 103c and 103d of the attachment part 103b, and are screwed into the screw holes 91u of the fixed frame 91, so that the attachment part 103b is fastened to the fixed frame 91 (FIGS. 23 and 24). As a result of the fastening of this attachment part 103b, the lens barrel control FPC 102A is accommodated and fastened in the back end part of the fixed frame 91. Specifically, this FPC is held on the inner circumferences of the fixed ring 181 (constituting a fixed frame) and fixed frame 91.

The FPC connector terminals are connected to the respective connector terminals mounted on the lens barrel control FPC 102A in the state prior to the attachment of the back end cover 31. Specifically, the connector terminal 13d of the distance encoder FPC 13 is connected to the distance encoder FPC connector 107. The connector terminal 75a of the diaphragm FPC 75 is connected to the diaphragm FPC connector 109. The connector terminal 18a of the distance PI FPC 18 is connected to the distance PI connector 110.

Then, the back end cover 31 in a state in which the O-ring 5E is mounted in the ring groove of the engaging contact part 31p is inserted into the back end part of the fixed frame 91 to the rear of the intermediate frame 16, and the engaging contact part 31p of the back end cover 31 is engaged with the engaging contact part 16p on the back end of the intermediate frame 16, so that the engaging contact part 16p and engaging contact part 31p are caused to make contact while compressing the O-ring 5E. In this case, the engaging contact part 31p also contacts the back end surface of the scale ring 21. Screws 7E that are passed through the screw passage holes 31v and 31w of the back end cover 31 are screwed into the screw holes 91v and 91w of the fixed frame 91, so that the back end cover 31 is fastened to the fixed frame 91 (FIG. 24).

As a result of the back end cover 31 being fastened to the fixed frame 91 as described above, the distance ring 14 and intermediate frame 16, and the scale ring 21 inside the intermediate frame 16, are held in a state in which these members are clamped in the direction of the optical axis O by the fixed frame 91 and back end cover 31, so that the positions of these members in the direction of the optical axis O is restricted. However, the distance ring 14 and scale ring 21 are in a state that allows rotation; only the intermediate frame 16 is in a state in which the position of the member is also restricted in the direction of rotation.

Subsequently, the mount contact member 111 which is mounted on the lens barrel control FPC 102A is mounted in the lens mount 36, and the lens mount 36 is attached to the back end surface of the fixed frame 91.

The lens mount 36 is also a member that is used in common with the lens mount used in the first lens barrel 10 (FIG. 21). The cover rear frame 94 that is fastened to the lens mount 36 is provided with a tubular part 94a that can engage with the outer circumference of the third group frame 172, a third group frame relief recess 94c, a cut-out part 94b used for the relief of the mount contact member, and screw passage holes 94e that are formed in the flange part.

When the lens mount 36 is to be attached to the back end surface of the fixed frame 91, the mount contact member 111 is engaged with the contact mounting recess 36b of the lens mount 36 in the same manner as in the first lens barrel 10, and screws 7G that are passed through the screw passage holes 36f of the lens mount 36 are screwed into the screw holes 111b (FIG. 23) of the mount contact member 111, so that the mount contact member 111 is fastened to the lens mount 36. Then, screws 7F are passed through the screw passage holes 36d of the lens mount 36, and are screwed into the screw holes 91x in the back end surface of the fixed frame 91, so that the lens mount 36 is fastened to the back end surfaces of the fixed frame 91 and back end cover 31.

In the attachment of the lens mount 36 as well, as in the case of the first lens barrel 10, in order to adjust the flange-backing amount of the optical system of the optical unit 2A installed inside the fixed frame to the desired distance, one or a plurality of spacing washers (spacers) 35 that have an appropriate thickness are selected and placed on the back end surfaces of the fixed frame 91 and back end cover 31, and the lens mount 36 is fastened in a state in which the spacing washers 35 are interposed.

Furthermore, in the attachment of the lens mount 36, the lens mount 36 is mounted on the fixed frame 91 in a state in which a sealing ring 6B constituting a packing material is inserted between the outer circumference of the lens mount 36 and the back end surface step part of the back end cover 31.

Subsequently, the tubular part of the cover rear frame 94 is inserted into the opening part 36a of the lens mount 36, and the screws 7H are passed through the screw passage holes 94e and screwed into the screw holes 36e of the lens mount 36, so that the cover rear frame 94 is attached to the lens mount 36.

As a result of the mounting of the abovementioned lens mount 36 and cover rear frame 94, the assembly of the second lens barrel 10A comprising the external mounting unit 1A, optical unit 2A, control unit 3A and the like is completed.

Next, the supported states and movement operations of the respective frame members constituting the optical unit 2A of the abovementioned second lens barrel 10A will be described.

The fixed ring 181 is connected to the fixed frame 91 at the back end part so as to form an integral unit. Furthermore, the moving frame unit 140 that holds the respective lens frame units can advance and retract in the direction of the optical axis O in a state in which rotation is restricted by the direct-advance keys 142 of the first group frame 152 that is guided in a direct-advance motion by the fixed ring 181. When the cam ring 182 is rotationally driven via the lens driving frame 183, the moving frame unit 140 is caused to advance or retract by the cam grooves 182c of the cam ring 182.

The first and second group frame units 150 and 160 that support the first group lens 151, second group lens 161 and diaphragm vanes 166 are fastened to and supported by the moving frame 141, and can advance or retract in the direction of the optical axis O together with the moving frame unit 140.

The third group frame unit 170 that holds the third group lens 171 is supported by the guide rods 155 and 173 so that this unit can advance and retract along the direction of the optical axis O. When the cam ring 182 is rotationally driven via the lens driving frame 183, the third group frame unit 170 is caused to advance or retract in the direction of the optical axis O by the cam grooves 182e of the cam ring 182.

When the distance ring 14 is rotated via the rubber ring 15, the amount of this rotation and direction of this rotation are detected by the pair of distance PIs 19. The rotational amount output is transmitted to the side of the lens barrel control FPC 102A via the distance PI FPC 18, and the focusing motor 121 is rotationally driven so as to form a focus at the distance corresponding to the rotational amount output. Meanwhile, in cases where focusing distance data is taken into the lens barrel control FPC 102A from the side of the mounted camera body via the lens mount contact part 111a, the focusing motor 121 is rotationally driven by a specified amount in the necessary direction on the basis of this focusing distance data. The amount of rotation of the focusing motor 121 is detected by the motor PI 112, and is transmitted to the side of the lens barrel control FPC 102A.

When the focusing motor 121 is rotationally driven, the lens driving frame 183 is rotationally driven, and the cam ring 182 rotates by a specified amount. As a result of the rotation of the cam ring 182, the first and second group frame units 150 and 160 and the third group frame unit 170 supported on the moving frame 141 respectively move to the respective focusing positions in the direction of the optical axis O. Furthermore, as a result of the rotation of the lens driving frame 183, the scale ring 21 is caused to rotate (via the connecting arm 93) to a position that indicates the focal position of the object. At the same time, the rotational position signal of the scale ring 21 is transmitted to the side of the lens barrel control FPC 102A via the distance encoder FPC 13, and is further transmitted to the side of the camera body via the lens mount contact part 111a.

When diaphragm driving is performed in the second lens barrel 10A, a diaphragm signal is taken into the lens barrel control FPC 102A via the lens mount contact part 111a, and is converted into a diaphragm driving motor driving signal. The abovementioned diaphragm driving motor driving signal is transmitted to the diaphragm driving motor 74 via the diaphragm FPC 75, and the diaphragm vanes 166 are rotationally driven via the diaphragm driving plate 165 (FIG. 19). The fully-open position (reset position) signal of the diaphragm driving plate 165 is detected by the diaphragm PI 79, and is taken into the lens barrel control FPC 102A via the diaphragm FPC 75.

Thus, in the lens barrel system of the present embodiment, a distance ring 14 intermediate frame 16, scale ring 21 and back end cover 31, as well as slit plates, contact members FPC encoder patterns, PIs, O-rings, packing and the like that are mounted on these members, can be used in common in a first lens barrel 10 and second lens barrel 10A that are of different types (i. e., different specifications). As a result of this common use, a great merit is obtained: namely, the number of different types of parts that are required in the lens barrel system can be reduced, so that the cost of the lens barrel can be reduced, and the control of parts can be simplified.

The abovementioned first lens barrel 10 and second lens barrel 10A were a lens barrel with an adjustable focal length and a lens barrel with a fixed focus. However, the abovementioned common use of respective constituent members can also be applied to lens barrels of different types in which both of the lens barrels have an adjustable focal length, or in which both of the lens barrels have a fixed focus. Furthermore, the abovementioned constituent members that are used in common may be one or a plurality of members selected from a set comprising the distance ring 14, intermediate frame 16, scale ring 21 (excluding at least the display such as a scale or the like), and back end cover 31.

The lens barrel system of the present invention may be used as a lens barrel system comprising a plurality of lens barrels that allow the realization of common use of constituent members in lens barrels of different types (specifications).

The present invention is not limited to the respective embodiments described above; furthermore, in the working stage, various modifications can be worked without departing from the spirit of the present invention. Furthermore, inventions of various stages are included in the respective embodiments described above, and various inventions may be extracted by appropriately combining a plurality of the disclosed constituent conditions.

For example, in cases where the problems described in the section regarding problems to be solved by the invention can be solved even if several constituent conditions are deleted from the overall constructions indicated in the respective embodiments, such constructions in which these constituent conditions have been deleted can be extracted as inventions.

What is claimed is:

1. A lens barrel with an adjustable focus, comprising:
   a fixed frame covering a lens system;
   a distance ring which is engaged with the outer circumference of the fixed frame from one end in the direction of an optical axis, and which can rotate about the optical axis;
   an outer circumferential cover which is engaged with the outer circumference of the fixed frame from the one end in the direction of the optical axis, which is prevented from rotating, and which prevents the distance ring from moving in the direction of the optical axis; and
   a back end cover which is disposed on the back end part of the lens barrel, and restrains the outer circumferential cover from the one end in the direction of the optical axis so that the outer circumferential cover does not move in the direction of the optical axis.

2. The lens barrel with an adjustable focus according to claim 1, further comprising:
   an operating member used to alter the focal length, which is fit over the outer circumferential part of the lens barrel, and has a zoom ring that can rotate;
   wherein the distance ring, the outer circumferential cover, the zoom ring and the back end cover are disposed on the outer circumference of the fixed frame from one end in the direction of the optical axis, and form the external appearance of the outer circumference of the lens barrel.

3. The lens barrel with an adjustable focus according to claim 2, further comprising:
   a distance scale display ring which displays a focal position of the object on the side of the object field corresponding to the position of the focusing lens between the outer circumference of the fixed frame and the inner circumference of the outer circumferential cover.

4. The lens barrel with an adjustable focus according to claim 1, further comprising:
   a distance scale display ring which displays a focal position of an object on the side of the object field corresponding to a position of the focusing lens between a outer circumference of the fixed frame and the inner circumference of the outer circumferential cover.

5. The lens barrel according to claim 4, further comprising:
   a distance encoder board which is disposed on the fixed frame; and
   an electrical armature which is disposed on the distance scale display ring, and makes sliding contact with the distance encoder board.

6. The lens barrel according to claim 1, further comprising:
   an encoder plate which is disposed on the distance ring, the encoder plate having light-transmitting parts and light-blocking parts that alternate in the circumferential direction of the distance ring;
   a photodetector which is disposed on the fixed frame, and detects the movement of a encoder plate; and
   a control unit which receives the output of the photodetector, and performs driving control for the focusing of the lens system in the zoom lens system of the lens barrel.

7. A lens barrel with an adjustable focus, comprising:
   a fixed frame;
   a first frame member engaged with the fixed frame from one end thereof in the direction of an optical axis and disposed on the outer circumference of the fixed frame, this first frame member forming a part of the external appearance of the lens barrel, and rotating about the optical axis;
   a second frame member engaged with the fixed frame from one end thereof in the direction of the optical axis and disposed on the outer circumference of the fixed frame, this second frame member forming a part of the external appearance of the lens barrel; and
   a movement preventing member which prevents the movement of the first frame member and the second frame member in the direction of the optical axis, this movement preventing member being disposed in the vicinity of the one end on the outer circumference of the fixed frame from the one end of the fixed frame in the direction of the optical axis, and forming a part of the external appearance of the lens barrel.

8. The lens barrel with an adjustable focus according to claim 7, further comprising a third frame member which is engaged with the fixed frame from one end thereof in the direction of the optical axis, and is disposed on the outer circumference of the fixed frame, this third frame member forming a part of the external appearance of the lens barrel, and rotating about the optical axis.

9. The lens barrel according to claim 7, wherein the first frame member and second frame member are respectively a distance ring and an outer circumferential cover.

10. The lens barrel according to claim 8, wherein the third frame member is a zoom ring.

11. A lens barrel system, comprising:
    a first fixed frame containing an optical unit of a first lens barrel;
    a second fixed frame which has an external diameter that is the same as the external diameter of the first fixed frame, and contains an optical unit of a second lens barrel that differs from the first optical unit; and
    a distance ring which is a part that can be used in common in the first lens barrel and the second lens barrel for the focus adjustment of the first lens barrel and the focus adjustment of the second lens barrel, and which is rotatably engaged with a outer circumference of the first fixed frame and a outer circumference of the second fixed frame.

12. A lens barrel system, comprising:
a first fixed frame containing an optical unit of a first lens barrel;
a second fixed frame which has an external diameter that is the same as the external diameter of the first fixed frame, and which contains an optical unit of a second lens barrel that differs from the first optical unit; and
a distance scale display ring, which is a part that can be used in common in the first lens barrel and the second lens barrel, which can rotate about the outer circumference of the first fixed frame and the outer circumference of the second fixed frame, and which displays object focal positions on the object field side corresponding to positions of respective focusing lens systems of the first lens barrel and the second lens barrel.

13. The lens barrel system according to claim 12, wherein the distance scale display ring mounted on the first lens barrel and the distance scale display ring mounted on the second lens barrel have the same part shape but different display scales.

14. The lens barrel system according to claim 12, further comprising:
a display ring holding ring which has windows used to display the distance scales of the distance scale display ring, and which is a part that can be used in common in the first lens barrel and second lens barrel, this display ring holding ring being disposed around the external diameter of the first fixed frame and around the external diameter of the second fixed frame, and rotatably supporting the distance scale display ring.

15. Two lens barrel systems with mutually different specifications, comprising:
a first lens barrel including a first fixed frame that contains an optical unit;
a second lens barrel including a second fixed frame with the same diameter as the first fixed frame, which contains an optical unit that differs from the first optical unit; and
a first frame member, this first frame member being a part that can be used in common in the first lens barrel and the second lens barrel, and being rotatably engaged with the outer circumference of the first fixed frame and the outer circumference of the second fixed frame.

16. The lens barrel system according to claim 15, further comprising:
a second frame member which is a part that can be used in common in the first lens barrel and second lens barrel, this part being engaged with the outer circumferences of the respective fixed frames of the first lens barrel and second lens barrel so that the first frame member does not move in the direction of an optical axis.

17. The lens barrel system according to claim 16, wherein the first frame member and the second frame member are respectively a distance ring and an outer circumferential cover,
the distance ring is a part that can be used in common in the first lens barrel and second lens barrel for an adjustment of focus of the first lens barrel and an adjustment of the focus of the second lens barrel, and can be rotatably engaged with the outer circumference of the first fixed frame and the outer circumference of the second fixed frame from the direction of the optical axis, the outer circumferential cover is a part that can be used in common in the first lens barrel and second lens barrel, and is engaged with the outer circumferences of the respective fixed frames of the first lens barrel and second lens barrel so that the distance ring does not move in the direction of the optical axis.

* * * * *

UNITED STATES PATENT AND TRADEMARK OFFICE
CERTIFICATE OF CORRECTION

PATENT NO.       : 6,995,926 B2
APPLICATION NO.  : 10/939310
DATED            : February 7, 2006
INVENTOR(S)      : Shigeo Hayashi It is certified that error appears in the above-identified patent and that said Letters Patent is hereby corrected as shown below:

Column 42, line 3 (claim 4, line 5) change "the" to --a--.

Column 42, line 67 (claim 11, line 9) change "the" (third occurrence) to --a--.

Column 44, line 28 (claim 17, line 8) delete "the" (first occurrence).

Signed and Sealed this

Twenty-sixth Day of August, 2008

JON W. DUDAS
*Director of the United States Patent and Trademark Office*